(12) United States Patent
Wu et al.

(10) Patent No.: US 8,140,381 B1
(45) Date of Patent: Mar. 20, 2012

(54) SYSTEM AND METHOD FOR FORECASTING PRICE OPTIMIZATION BENEFITS IN RETAIL STORES UTILIZING BACK-CASTING AND DECOMPOSITION ANALYSIS

(75) Inventors: Howard Yihzan Wu, Belmont, CA (US); Sean Kervin, Denver, CO (US); Jason Lee Gunnink, Arlington, VA (US); Suzanne Noel Valentine, Redwood City, CA (US); Paritosh Desai, Santa Clara, CA (US)

(73) Assignee: DemandTec, Inc., San Mateo, CA (US)

( * ) Notice: Subject to any disclaimer, the term of this patent is extended or adjusted under 35 U.S.C. 154(b) by 927 days.

(21) Appl. No.: 11/858,526

(22) Filed: Sep. 20, 2007

Related U.S. Application Data

(63) Continuation-in-part of application No. 09/741,959, filed on Dec. 22, 2000, now Pat. No. 7,302,410.

(51) Int. Cl.
  *G06Q 10/00* (2006.01)
(52) U.S. Cl. .................................................. 705/7.35
(58) Field of Classification Search .................. 705/7.35
  See application file for complete search history.

(56) References Cited

U.S. PATENT DOCUMENTS

| | | | |
|---|---|---|---|
| 5,377,095 A * | 12/1994 | Maeda et al. ..................... | 705/10 |
| 5,822,736 A * | 10/1998 | Hartman et al. .................. | 705/20 |
| 6,029,139 A * | 2/2000 | Cunningham et al. .......... | 705/10 |
| 6,078,893 A * | 6/2000 | Ouimet et al. ................... | 705/10 |
| 6,308,162 B1 * | 10/2001 | Ouimet et al. ................. | 705/7.36 |
| 6,553,352 B2 * | 4/2003 | Delurgio et al. ............... | 705/400 |
| 6,910,017 B1 * | 6/2005 | Woo et al. ..................... | 705/7.29 |
| 6,993,494 B1 * | 1/2006 | Boushy et al. .................. | 705/10 |
| 7,006,981 B2 * | 2/2006 | Rose et al. ...................... | 705/10 |
| 7,020,617 B2 * | 3/2006 | Ouimet ............................. | 705/7 |
| 7,035,809 B2 * | 4/2006 | Miller et al. ..................... | 705/8 |
| 7,085,734 B2 * | 8/2006 | Grant et al. ..................... | 705/20 |
| 7,092,896 B2 * | 8/2006 | Delurgio et al. ................ | 705/10 |
| 7,092,918 B1 * | 8/2006 | Delurgio et al. ............... | 705/400 |
| 7,130,811 B1 * | 10/2006 | Delurgio et al. ................ | 705/10 |
| 7,133,848 B2 * | 11/2006 | Phillips et al. ................ | 705/400 |
| 7,171,376 B2 * | 1/2007 | Ramakrishnan ................ | 705/10 |
| 7,191,157 B1 * | 3/2007 | Abe ............................... | 705/400 |
| 7,244,481 B2 * | 7/2007 | Vicik et al. .................... | 428/34.8 |
| 7,249,031 B2 * | 7/2007 | Close et al. ..................... | 705/20 |
| 7,251,589 B1 * | 7/2007 | Crowe et al. .................. | 702/189 |

(Continued)

OTHER PUBLICATIONS

DemandTec Announces Beta Customer Longs Drugs Stores Testing Leading Demand Managemetn Service PR Newswire, May 16, 2001.*

(Continued)

*Primary Examiner* — Scott L Jarrett
(74) *Attorney, Agent, or Firm* — Kang Lim

(57) ABSTRACT

A system and method for merchandising decomposition analysis (MDA), useful with stores, is provided. Econometric models are generated for product sales and are used to set pricing. Price setting may include optimizing prices. Point of sales data is collected from the stores, and benefits forecasts are generated and displayed. Benefit forecasts includes generating compliance, generating optimization benefit and generating level benefits. Generating optimization benefit includes at least one of differential benefit analysis, authorized benefit analysis and testable benefit analysis. The differential benefit analysis includes old/new cost method, cost neutral method and ignore cost method. Benefit forecasts generally include determining pre- and post-optimization price of the products, determining pre- and post-optimization costs, generating pre- and post-optimization forecasted units, calculating forecasted pre- and post-optimization profit, generate raw profit benefit, and calibrate raw profit benefit.

22 Claims, 49 Drawing Sheets

U.S. PATENT DOCUMENTS

| | | | |
|---|---|---|---|
| 7,251,615 B2 * | 7/2007 | Woo | 705/10 |
| 7,287,000 B2 * | 10/2007 | Boyd et al. | 705/10 |
| 7,302,410 B1 * | 11/2007 | Venkatraman et al. | 705/35 |
| 7,330,839 B2 * | 2/2008 | Srinivasan et al. | 705/400 |
| 7,379,890 B2 * | 5/2008 | Myr et al. | 705/10 |
| 7,467,095 B2 * | 12/2008 | Ouimet | 705/7 |
| 7,523,047 B1 * | 4/2009 | Neal et al. | 705/10 |
| 7,672,866 B2 * | 3/2010 | Venkatraman et al. | 705/10 |
| 7,680,685 B2 * | 3/2010 | Ouimet et al. | 705/7.31 |
| 7,689,456 B2 * | 3/2010 | Schroeder et al. | 705/7.31 |
| 7,742,929 B1 * | 6/2010 | Adams | 705/1.1 |
| 7,835,936 B2 * | 11/2010 | Ouimet et al. | 705/7.31 |
| 2003/0110066 A1 * | 6/2003 | Walser et al. | 705/7 |
| 2003/0130883 A1 * | 7/2003 | Schroeder et al. | 705/10 |
| 2003/0220830 A1 * | 11/2003 | Myr | 705/10 |
| 2005/0096950 A1 * | 5/2005 | Caplan et al. | 705/7 |
| 2005/0096963 A1 * | 5/2005 | Myr et al. | 705/10 |
| 2005/0256778 A1 * | 11/2005 | Boyd et al. | 705/26 |
| 2007/0112618 A1 * | 5/2007 | Krneta | 705/10 |
| 2008/0065463 A1 * | 3/2008 | Rosenberg et al. | 705/10 |
| 2009/0144101 A1 * | 6/2009 | Malov | 705/7 |

OTHER PUBLICATIONS

DemandTec Launches New Product in Breakthrough Retail Marketing Management Suite PR Newswire, Jun. 26, 2001.*

DemandTec 3 Software Selected by RadioShack to Optimize Prices At All Stores Nationwide PR Newswire, Mar. 25, 2003.*

Kay, Emily, Optimize pricing to Maximize Profits FrontLine Today, Sep. 2003.*

Abraham, Magid M. et al., Promoter: An Automate Promotion Evaluation System Marketing Science, vol. 6, No. 2, Spring 1987.*

Price Wars How do you choose the right software for tracking and setting prices in retail stores Ziff Davis Smart business, vol. 15, No. 4, May 1, 2002.*

Sliwa, Carol, Retailers Explore Price Optimization Computerworld, vol. 37, No. 3, Jan. 20, 2003.*

Forrester Finds Retail Price Optimization Solutions Still Emerging Business Wire, Aug. 31, 2004.*

Breskin, Ira, Special Report: Retail Solutions—Profit Optimization Software Helps Bolster Gross Margins SUpplyChainBrain.com, Apr. 2004.*

Khimetrics Leads Retail Revenue Management Industry With First Comprehensive Pricing and Forecasting Solution PR Newswire, Jan. 14, 2004.*

Montgomery, Alan L., The Implementation Challenge of Pricing Decision Support Systems for Retail Managers Mar. 26, 2004.*

Sullivan, Laurie, Fine-Tuned Pricing: Revenue-management software promises markdown magin and promotional prowess. Does it Delivery, InformationWeek, vol. 1052, Aug. 1-25, 2005.*

Magid, M. Abraham et al., Promoter: An Automated Promotion Evaluation System Informs, vol. 6, No. 2, Spring 1987.*

Decomposing the sales promotion bump with store data Marketing Science, Jun. 22, 2004.*

Leonard, Michael, Promotional Analysis and Forecasting Demand Planning: A Practical Time Series Approach SAS Institute, Apr. 2002.*

Van Heerde, Harald J. et al., Decomposing the Promotional Revenue Bump for Loyalty Program Members Versus Nonmembers American Marketing Association, Nov. 2005.*

KhiMetrics Launches New Promotion Optimization Capability to Help Retailers Navigate the $90 Billion Promotions Market PR Newswire, Nov. 21, 2002.*

Revenue Management—Understanding and Applying an Effective Strategy for the Retail Industry LakeWestGroup, Jan. 2001.*

Dekimpe, Marnik G. et al., Measuring short- and long-run promotional effectiveness on scanner data using persistence modeling Applied Stochastic Models in Business and Industry, vol. 21, 2005.*

Accenture Precision Pricing Accenture, 2003.*

DemandTec Launches Breakthrough Pricing Optimization Services to Double Retailer Profits, http://demandtech.hardingmarketing.com, PR Newswire, May 3, 2001, 1 page.

Longs Drugs Selects DemandTec Price™ Software to Guide Pricing, http://demandtech.hardingmarketing.com, PR Newswire, Oct. 16, 2001, 1 page.

DemandTec Introduces DemandTec 3 for Retail, http://demandtech.hardingmarketing.com, PR Newswire, Feb. 4, 2002, 1 page.

DemandTec 3™ for Retail Available Today, http://demandtech.hardingmarketing.com, PR Newswire, May 6, 2002, 1 page.

DemandTec 3 Software Selected by RadioShack to Optimize Prices at All Stores Nationwide, http://demandtech.hardingmarketing.com, PR Newswire, Mar. 23, 2003, 1 page.

DemandTec Delivers Analytics Application for Demand Based Management, http://demandtech.hardingmarketing.com, PR Newswire, May 2, 2003, 1 page.

* cited by examiner

SYSTEM AND METHOD FOR FORECASTING PRICE OPTIMIZATION BENEFITS IN RETAIL STORES UTILIZING BACK-CASTING AND DECOMPOSITION ANALYSIS

CROSS REFERENCE TO RELATED APPLICATIONS

This is a continuation-in-part of co-pending U.S. application Ser. No. 09/741,959 filed on Dec. 22, 2000, entitled "Econometric Optimization Engine", which is hereby fully incorporated by reference.

BACKGROUND OF THE INVENTION

This invention relates generally to Merchandising Decomposition Analysis (MDA) system and method to provide fast and efficient analysis of benefits for price optimization systems. More particularly, the present invention relates to a method for analyzing benefits resulting from changes in price setting compared with pre-optimization benefits.

For businesses, prices of various products needs to be set. These prices may be set with the goal of maximizing profit or demand or for a variety of other objectives. Traditionally price setting may be performed by experienced business managers, by comparison to competitors' pricing, to maintain sales goals or through complex price optimization systems.

For pricing optimization systems there may be a myriad of factors considered for the generation of demand models. As a result, the function for forecasting demand may be very complex. Additionally, costs may be fixed or variable and may be dependent on demand. As a result, the function for forecasting costs may be very complex. For a chain of stores with tens of thousands of different products, forecasting costs and determining a function for forecasting demand are difficult.

Additionally, after pricing optimizations have been performed it is currently difficult at best for businesses to attribute benefits of the optimization. Such benefits analysis is useful for the planning of future business goals, as well as providing assurance that the price optimization is performing acceptably.

Currently benefits analysis may be performed manually by comparing previous sales data with current sales data. However, such a general approach does not accurately identify benefit sources, or account for additional variables such as seasonality and promotional effects. As such current benefits methodologies are highly subjective and rely upon inaccurate comparisons. Such benefits analyses are wholly inadequate to base business decisions upon as they do not correctly characterize the price optimization benefits.

For the typical business, the above systems are still too inaccurate, unreliable, and intractable in order to be utilized effectively for benefits analysis of price optimization. Businesses, particularly those involving large product sets, would benefit greatly from the ability to have accurate benefits analysis.

It is therefore apparent that an urgent need exists for an improved system and method for merchandising decomposition analysis for benefits analysis that is both accurate and efficient. This solution would replace current benefit analysis techniques with a more accurate system; thereby increasing effectiveness in downstream business planning.

SUMMARY OF THE INVENTION

To achieve the foregoing and in accordance with the present invention, a method and system for merchandising decomposition analysis is provided. Such a system is useful for a business to analyze the benefits of pricing optimization, and attribute those benefits accurately to sources. Such an analysis may be utilized by the business for price management and investor decisions.

One advantage of the present invention is that the merchandising decomposition analysis is capable of accurately determining benefits of price optimizations quickly and efficiently while accounting for a myriad of effects such as seasonality and promotions.

The present invention is useful in association with stores and comprises generating econometric models for product sales of products sold by the stores, setting prices of the products, collecting Point Of Sales (POS) data from the stores, generating benefit forecasts of the price setting, and displaying the generated benefit forecasts. The price setting optimizes profit by utilizing the generated econometric models.

The benefit forecasts include compliance, optimization benefit and level benefits. Level benefits include product level benefits, category level benefits, line level benefits, brand level benefits, demand group level benefits and geographical level benefits. Moreover, optimization benefit includes differential benefit analysis, authorized benefit analysis and testable benefit analysis.

Differential benefit analysis includes comparative cost analysis, cost neutral analysis and ignore cost analysis.

The comparative cost analysis includes determining pre-optimization price of the products, determining pre-optimization cost of the products, generating pre-optimization forecasted units, calculating forecasted pre-optimization profit, determining post-optimization cost of the product, generating post-optimization forecasted units, calculating forecasted post-optimization profit, generating raw profit benefit, and calibrate raw profit benefit by iteratively excluding effects, wherein the econometric models include the effects. The forecasted units are predictions of volume of sales of the products at the pre- or post-optimization price, and are generated by utilizing the price and the econometric models. Profit is determined by subtracting cost from price and multiplying the result by the forecasted units.

The cost neutral analysis comprises determining pre-optimization price of the products, determining pre-optimization cost of the products, determining post-optimization cost of the products, generating relative price, generating pre-optimization forecasted units, calculating forecasted pre-optimization profit, determining post-optimization price of the products, generating post-optimization forecasted units, calculating forecasted post-optimization profit, generating raw profit benefit, and calibrating raw profit benefit by iteratively excluding effects, wherein the econometric models include the effects. Again, the forecasted units are predictions of volume of sales of the products at the pre- or post-optimization price, and are generated by utilizing the price and the econometric models. Profit is determined by subtracting cost from price and multiplying the result by the forecasted units. The relative price is generated by multiplying the pre-optimization price by the ratio of post-optimization cost to pre-optimization cost.

The ignore cost analysis includes determining pre-optimization price of the products, determining post-optimization cost of the products, generating pre-optimization forecasted units, calculating forecasted pre-optimization profit, determining post-optimization price of the products, generate post-optimization forecasted units, calculating forecasted post-optimization profit, generating raw profit benefit, and calibrating raw profit benefit by iteratively excluding effects, wherein the econometric models include the effects.

The authorized benefit analysis includes determining pre-optimization price of the products, determining post-optimization cost of the products, generating pre-optimization forecasted units, generating authorized product pricing window, calculating forecasted pre-optimization profit, determining post-optimization price of the products, generating post-optimization forecasted units, calculating forecasted post-optimization profit, generating non compliance effect, generating raw profit benefit, and calibrating raw profit benefit by iteratively excluding effects and non compliance effect. The authorized product pricing window is the period of time during which prices are expected to change in order to reflect the setting of prices to optimized prices in stores. The non compliance effect is the benefit attributed to the difference between the post-optimization price and the optimized price detected during the authorized product pricing window.

The testable benefit analysis includes selecting a test store and a control store; implementing post-optimization price in test store while maintaining pre-optimization price of the products in the control store, determining post-optimization cost of the products, generate pre-optimization forecasted units, calculating forecasted pre-optimization profit, generating post-optimization forecasted units, calculating forecasted post-optimization profit, generating raw profit benefit, and calibrating raw profit benefit by iteratively excluding effects, where the econometric models include the effects.

These and other features of the present invention may be practiced alone or in any reasonable combination and will be discussed in more detail below in the detailed description of the invention and in conjunction with the following figures.

BRIEF DESCRIPTION OF THE DRAWINGS

In order that the present invention may be more clearly ascertained, one embodiment will now be described, by way of example, with reference to the accompanying drawings, in which.

DETAILED DESCRIPTION OF THE INVENTION

The present invention will now be described in detail with reference to several embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

The present invention relates generally to Merchandising Decomposition Analysis (MDA) system and method to provide fast and efficient analysis of benefits for price optimization systems. More particularly, the present invention relates to a method for analyzing benefits resulting from changes in price setting compared with pre-optimization benefits. To facilitate the discussion price optimization procedures will be discussed. Particular emphasis will be taken as to the methodology of causality modeling and coefficient generation by the econometric engine. These same models are then utilized by the Merchandising Decomposition Analysis engine along with historic and current sales data to provide comprehensive and efficient benefit analysis.

I. Overview of Pricing Optimization

Figure 1:
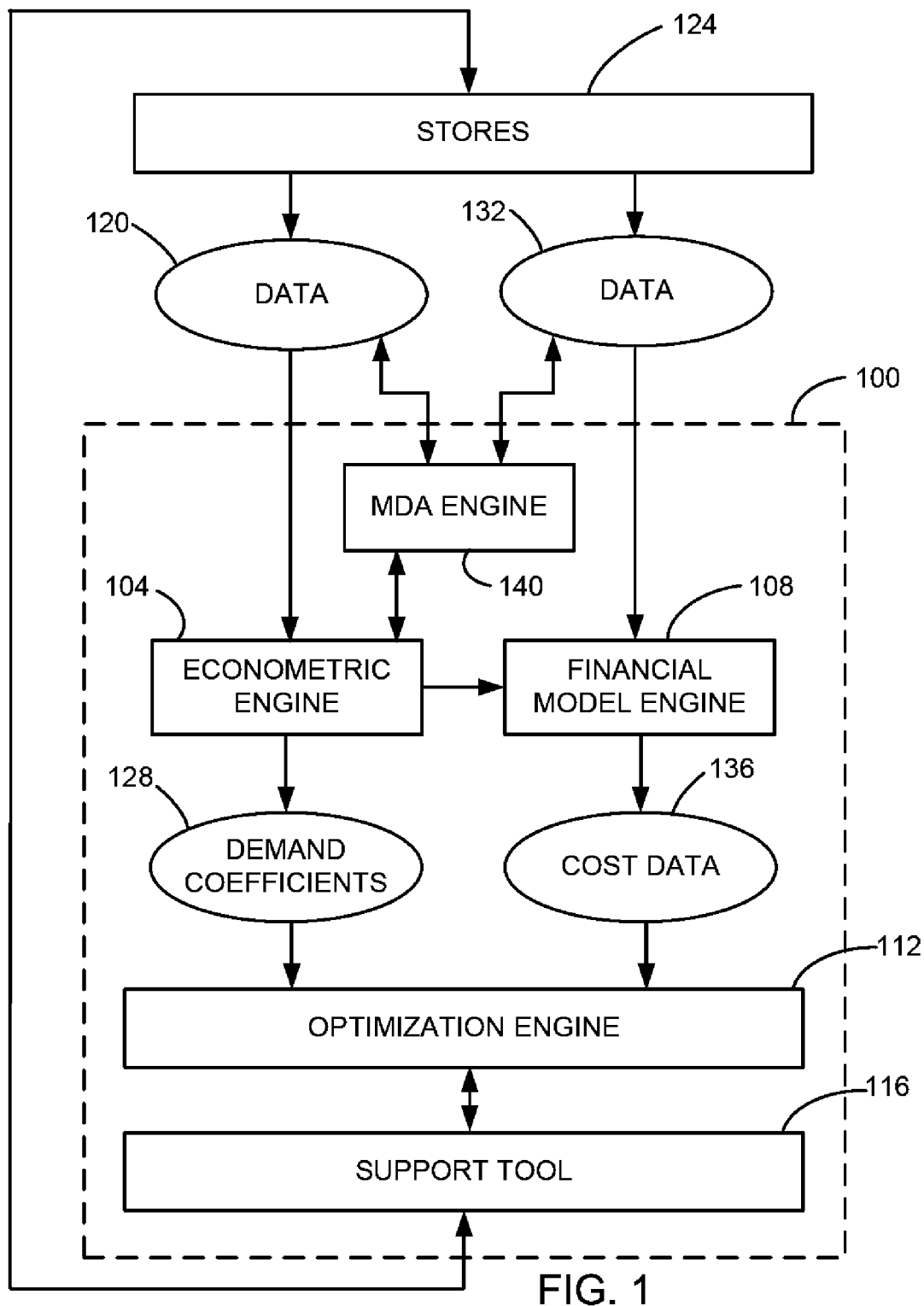
FIG. 1 is a high level schematic view of an embodiment of the invention.

To facilitate discussion, FIG. 1 shows a schematic view of a price optimizing and MDA system 100. The price optimizing and MDA system 100 comprises an econometric engine 104, a financial model engine 108, an optimization engine 112, and a support tool 116. Additionally, a MDA Engine 140 may exist within the price optimizing and MDA system 100 to provide benefits analysis. While MDA Engine 140 may not be required to effectuate the optimization process, MDA Engine 140 is shown to provide logical context for the connectivity of MDA Engine 140 within the price optimizing and MDA system 100.

The econometric engine 104 is connected to the optimization engine 112, so that the output of the econometric engine 104 is an input of the optimization engine 112. The financial model engine 108 is connected to the optimization engine 112, so that the output of the financial model engine 108 is an input of the optimization engine 112. The optimization engine 112 is connected to the support tool 116 so that output of the optimization engine 112 is provided as input to the support tool 116 and output from the support tool 116 may be provided as input to the optimization engine 112. The econometric engine 104 may also exchange data with the financial model engine 108. MDA Engine 140 is coupled to the econometric engine 104 and the financial model engine 108. MDA Engine 140 may receive econometric models and cost models from the econometric engine 104 and the financial model engine 108 respectively. Additionally MDA Engine 140 may receive data 120 and 132 from the stores 124.

Figure 2:
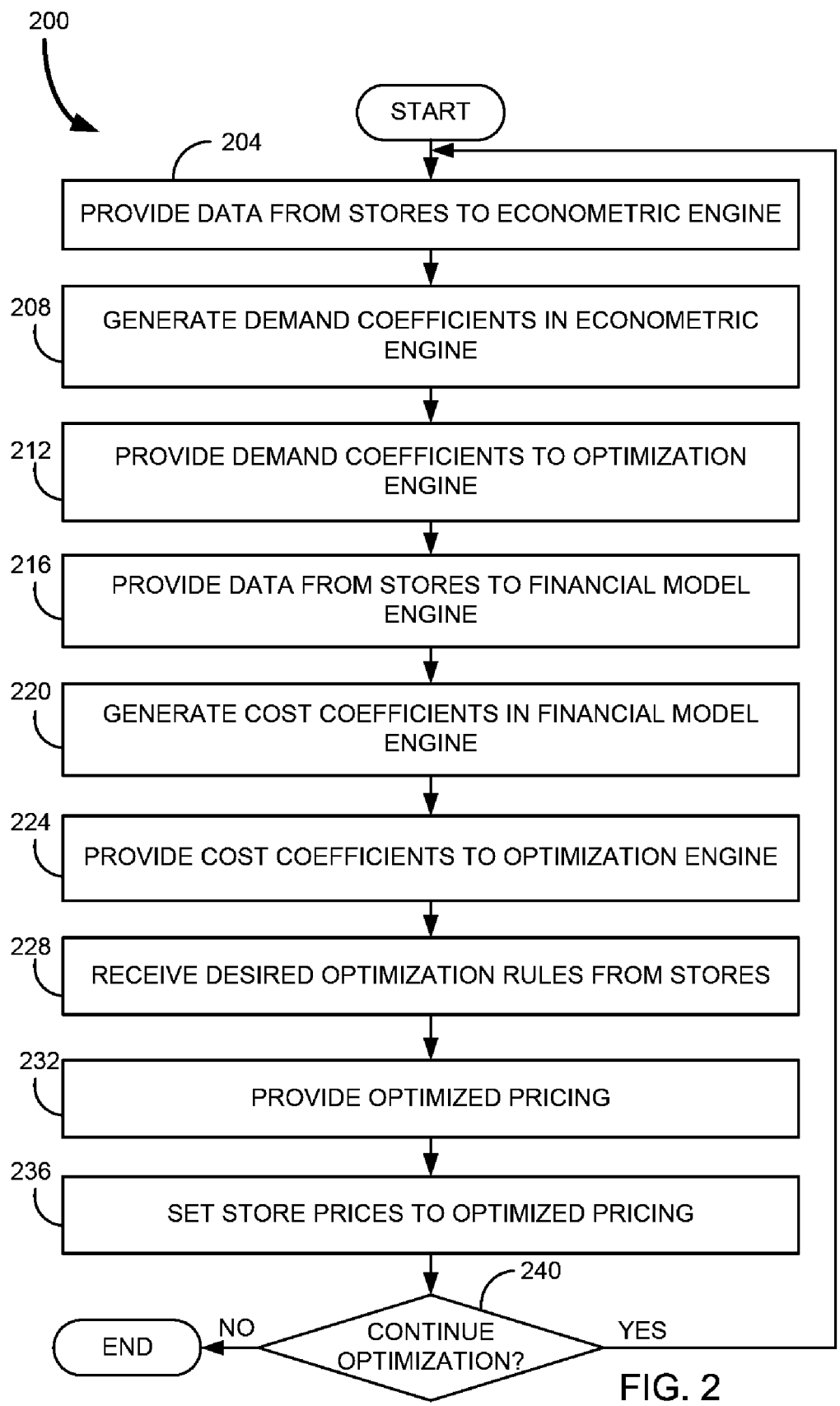
FIG. 2 is high level flow chart of the invention disclosed in FIG. 1.

FIG. 2 is a high level flow chart of a process that utilizes the price optimizing and MDA system 100. The operation of the optimizing system 100 will be discussed in general here and in more detail further below. Data 120 is provided from the stores 124 to the econometric engine 104 (step 204). Generally, the data 120 provided to the econometric engine 104 may be point-of-sale information, product information, and store information. The econometric engine 104 processes the data 120 to provide demand coefficients 128 (step 208) for a set of algebraic equations that may be used to estimate demand (volume sold) given certain marketing conditions (i.e. a particular store in the chain), including a price point. The demand coefficients 128 are provided to the optimization engine 112. Additional processed data from the econometric engine 104 may also be provided to the optimization engine 112. The financial model engine 108 may receive data 132 from the stores 124 (step 216) and processed data from the econometric engine 104. The data 132 received from the stores is generally cost related data, such as average store labor rates, average distribution center labor rates, cost of capital, the average time it takes a cashier to scan an item (or unit) of product, how long it takes to stock a received unit of product and fixed cost data. The financial model engine 108 may process the data to provide a variable cost and fixed cost for each unit of product in a store.

The processing by the econometric engine 104 and the processing by the financial model engine 108 may be done in parallel. Cost data 136 is provided from the financial model engine 108 to the optimization engine 112 (step 224). The optimization engine 112 utilizes the demand coefficients 128 to create a demand equation. The optimization engine is able to forecast demand and cost for a set of prices to calculate net profit. The stores 124 may use the support tool 116 to provide optimization rules to the optimization engine 112 (step 228). The optimization engine 112 may use the demand equation, the variable and fixed costs, and the rules to compute an optimal set of prices that meet some or all the rules (step 232).

For example, if a rule specifies the maximization of profit, the optimization engine would find a set of prices that cause the largest difference between the total sales and the total cost of all products being measured. If a rule providing a promotion of one of the products by specifying a discounted price is provided, the optimization engine may provide a set of prices that allow for the promotion of the one product and the maximization of profit under that condition.

The phrases "optimal set of prices" or "preferred set of prices" are defined as a set of computed prices for a set of products where the prices meet all of the rules. The rules normally include an optimization, such as optimizing profit or optimizing volume of sales of a product and constraints such as a limit in the variation of prices. The optimal (or preferred) set of prices is defined as prices that define a local optimum of an econometric model which lies within constraints specified by the rules When profit is maximized, it may be maximized for a sum of all measured products. Such maximization, may not maximize profit for each individual product, but may instead have an ultimate objective of maximizing total profit.

The optimal (preferred) set of prices may be sent from the optimization engine 112 to the support tool 116 so that the stores 124 may use the user interface of the support tool 116 to obtain the optimal set of prices. Other methods may be used to provide the optimal set of prices to the stores 124. The price of the products in the stores 124 are set to the optimal set of prices (step 236), so that a maximization of profit or another objective is achieved.

Each component of the price optimizing and MDA system 100 will be discussed separately in more detail below.

II. Econometric Engine

Figure 3:
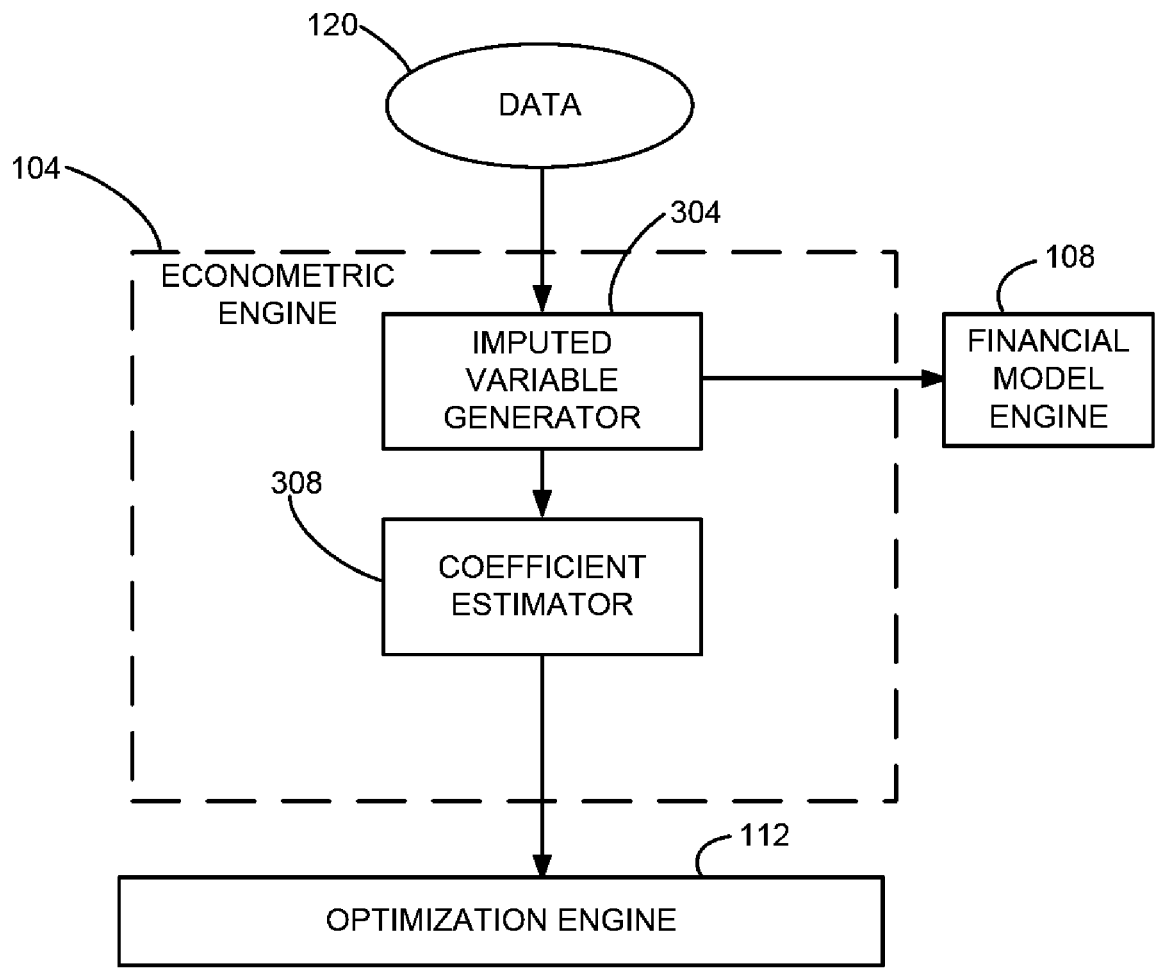
FIG. 3 is a more detailed schematic view of the econometric engine disclosed in FIG. 1.

FIG. 3 is a more detailed view of the econometric engine 104. The econometric engine comprises an imputed variable generator 304 and a coefficient estimator 308. The data 120 from the stores 124 is provided to the imputed variable generator 304. The data 120 may be raw data generated from cash register data, which may be generated by scanners used at the cash registers.

A. Imputed Variable Generator

The present invention provides methods, media, and systems for generating a plurality of imputed econometric variables. Such variables are useful in that they aid businesses in determining the effectiveness of a variety of sales strategies. In particular, such variables can be used to gauge the effects of various pricing or sales volume strategies.

Figure 10:
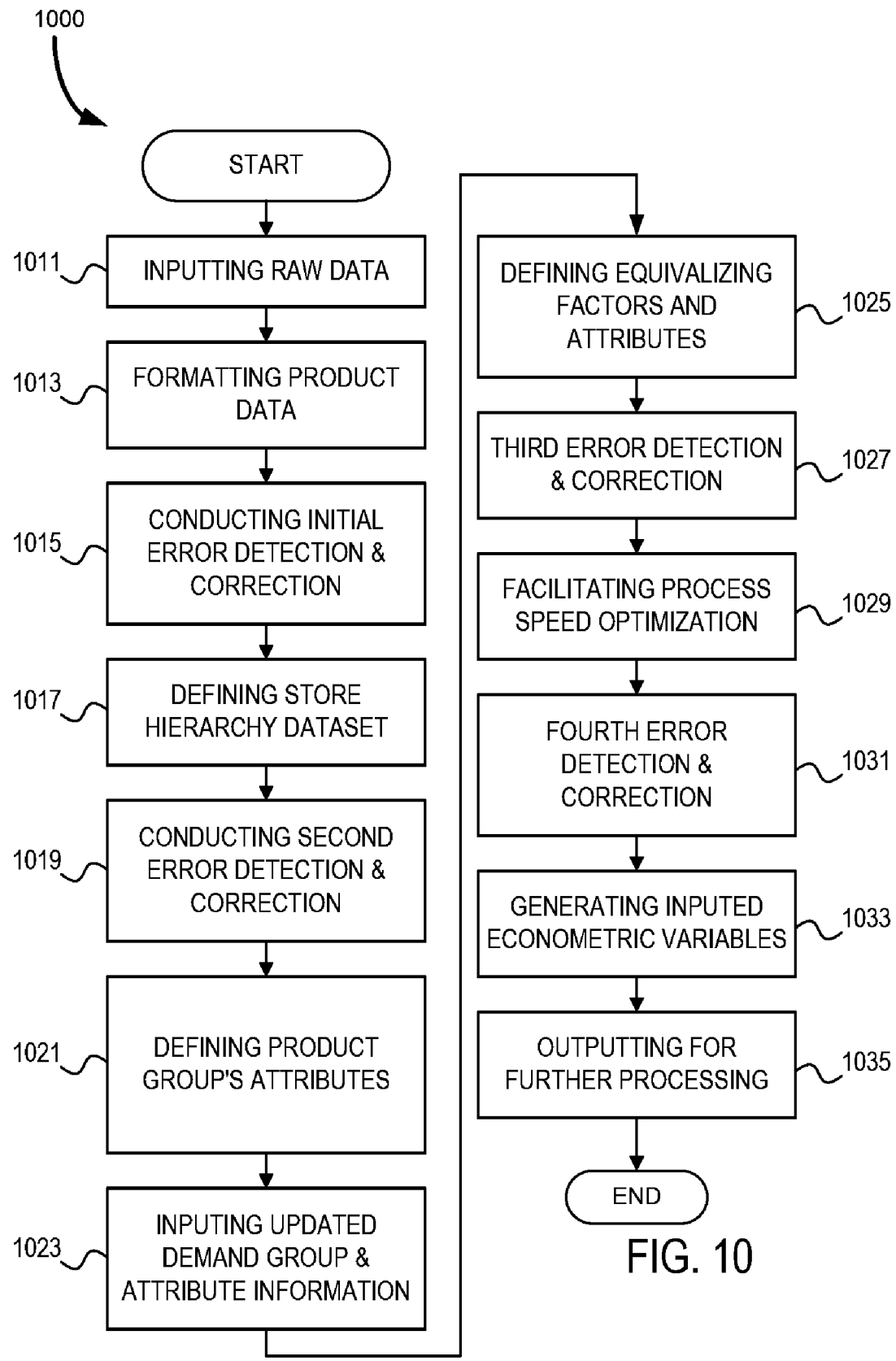
FIG. 10 is a flow chart depicting a process flow by which raw econometric data can be input, subject to "cleansing", and used to create an initial dataset which can then be used to generate imputed econometric variables in accordance with one embodiment of the present invention.

FIG. 10 illustrates a flowchart 1000 which describes steps of a method embodiment for data cleansing imputed econometric variable generation in accordance with the principles of the present invention. The process, generally described in FIG. 10, begins by initial dataset creation and data cleaning (Steps 1011-1031). This data set information is then used to generate imputed econometric variables (Step 1033) which can be output to and for other applications (Step 1035). Additional disclosure regarding the Imputed Variable Generator may be found in U.S. application Ser. No. 09/742,472, filed Dec. 20, 2000, entitled "Imputed Variable Generator", which is hereby fully incorporated by reference.

1. Initial Dataset Creation And Cleaning

The process of dataset creation and cleaning (that is to say the process of identifying incompatible data records and resolving the data incompatibility, also referred to herein as "error detection and correction") begins by inputting raw econometric data (Step 1011). The raw econometric data is then subject to formatting and classifying by UPC designation (Step 1013). After formatting, the data is subject an initial error detection and correction step (Step 1015). Once the econometric data has been corrected, the store information comprising part of the raw econometric data is used in defining a store data set hierarchy (Step 1017). This is followed by a second error detecting and correcting step (Step 1019). This is followed by defining a group of products which will comprise a demand group (i.e., a group of highly substitutable products) and be used for generating attribute information (Step 1021). Based on the defined demand group, the attribute information is updated (Step 1023). The data is equivalized and the demand group is further classified in accordance with size parameters (Step 1025). The demand group information is subjected to a third error detection and correction step (Step 1027). The demand group information is then manipulated to facilitate decreased process time (Step 1029). The data is then subjected to a fourth error detection and correction step (Step 1031), which generates an initial cleansed dataset. Using this initial cleansed dataset, imputed econometric variables are generated (Step 1033). Optionally, these imputed econometric variables may be output to other systems for further processing and analysis (Step 1035).

The process begins by inputting raw econometric data (Step 1011). The raw econometric data is provided by a client. The raw econometric data includes a variety of product information. In some embodiments, the raw econometric data may specify the store from which the data is collected, the time period over which the data is collected and include a UPC (Universal Product Code) for the product, and provide a UPC description of the product. Also, the raw econometric data needs to include product cost (e.g., the wholesale cost to the store), number of units sold, and either unit revenue or unit price. Ordinarily, the UPC description also identifies the product brand, UOM (Unit of Measure), and product size. Such information can be very detailed or less so. For example, brand can simply be Coca-Cola®, or more detailed e.g., Cherry Coca-Cola®. A UOM is, for example, ounces (oz.), pound (lb.), liter (ltr), or count (CT). Size reflects the number of UOM's e.g., eight (8) oz or two (2) ltr. Also, the general category of product or department identification is input. A category is defined as a set of substitutable or complementary products, for example, "Italian Foods". Such categorization can be proscribed by the client, or defined by generally accepted product categories. Additionally, such categorization can be accomplished using look-up tables or computer generated product categories.

Also, a more complete product descriptor is generated using the product information described above and, for example, a UPC description of the product and/or a product description found in some other look-up table (Step 1013). This information is incorporated into a product format. This product format provides a more complete picture of the product, but this information is stored in a separate database which is not necessarily processed using the invention. This information provides a detailed description of the product which can be called up as needed.

The data is then subjected to a first error detection and correction process (Step 1015). Typically, this step includes the removal of all duplicate records and the removal of all records having no match in the client supplied data (typically scanner data). An example of records having no match are records that appear for products that the client does not carry or stock in its stores. These records are detected and deleted.

Data subsets concerning store hierarchy are defined (Step 1017). This means stores are identified and categorized into various useful subsets. Typical subsets include (among other categorizations) stores segregated by, for example, zip codes, cities, states, specific geographical regions, rural environs, urban environs, associations with other stores (e.g., is this store part of a mall) or categorized by specific stores. A wide variety of other subsets may also be used. These subsets can be used to provide information concerning, among other things, regional or location specific economic effects.

The data is then subjected to a second error detection and correction process (Step 1019). This step cleans out certain obviously defective records. Examples include, but are not limited to, records displaying negative prices, negative sales volume, or negative cost. Records exhibiting unusual price information are also removed. Such unusual prices can be detected using cross store price comparisons (between similarly situated stores), for example, an average price for a product in the stores of a particular geographic region can be determined by averaging the prices for all such products sold in the subject stores. The standard deviation can also be calculated. Prices that lie at greater than, for example, two (2) standard deviations from the mean price will be treated as erroneous and such records will be deleted. These tools can be applied to a variety of product parameters (e.g., price, cost, sales volume).

This is followed by defining groups of products and their attributes and exporting this information to a supplementary file (e.g., a text file)(Step 1021). This product information can then be output into a separate process which can be used to define demand groups or product attributes. For example, this supplemental file can be input into a spreadsheet program (e.g., Excel®) which can use the product information to define "demand groups" (i.e. groups of highly substitutable products). Also, further product attribute information can be acquired and added to the supplementary file. Such attributes can comprise, for example, branding information, manufacturer, size, flavor or form (e.g., cherry soda) just to name a few. Such information can be gleaned from multiple sources e.g., UPC product catalogues, the client, product look-up tables, or other sources. The advantage of such supplementary files is that they maintain complete product information (including information not required by the processes of the present invention) which can be accessed when needed. In addition, updated demand group and attribute information can then be input as received (Step 1023). By maintaining a supplementary file containing large amounts of data, a more streamlined (abbreviated) dataset may be used in processing. This effectively speeds up processing time by deleting non-critical information from the dataset.

The data is further processed by defining an "equivalizing factor" for the products of each demand group in accordance with size and UOM parameters (Step 1025). This equivalizing factor can be provided by the client or imputed. An example of determining an imputed equivalizing factor follows. Product size and UOM information are obtained, for example, from the product description information. Typical examples of such size and UOM information is, 20 oz. (ounce), 6 CT (count), or 1 ltr (liter). A further advantageous aspect of the present invention is that, even if such size or UOM information is incomplete or not provided, it can also be imputed. An equivalizing factor can be imputed by using, for example, the median size for each UOM. Alternatively, some commonly used arbitrary value can be assigned. Once this information is gathered, all product prices and volume can be "equivalized". In one example, a demand group (a group of highly substitutable products) is chosen having, for example, "soft drinks" as its subject category. And by further example, the soft drink product comes in 8, 12, 16, 24, 32, and 64 ounce sizes. The median size (or for that matter, any arbitrarily determined size) can then be used as the base size to which all other sizes are to be equivalized. For example, using the 8, 12, 16, 24, 32, and 64-ounce sizes discussed above, an arbitrary base size can be determined as, for example, 24 ounces. Then the 24-ounce size is determined as the equivalizing factor. Some of the uses of the equivalizing factors are detailed in the discussions below. Chiefly, the purpose of determining an equivalizing factor is to facilitate comparisons between different size products in a demand group. For example, if 16 is determined as the equivalizing factor for the above group of soft drinks, then an 8 oz. soft drink is equivalized to one half of a 16 oz. unit. In a related vein, a 32 oz. soft drink is equivalized to two (2) 16 oz. units.

Additionally, size information can be used to define further product attributes. For example, if the size is in the bottom tertile of sizes for that product, it will be classified as "Small" size. Correspondingly, if the size is in the middle tertile of sizes for that product, it will be classified as "Medium" size, and if the size is in the top tertile of sizes for that product, it will be classified as "Large" size. Such categorization can define product attributes such as small (8- and 12-ounce sizes), medium (16- and 24-ounce sizes), and large (32- and 64-ounce sizes) sizes.

The data is then subjected to a third error detection and correction process, which detects the effects of closed stores and certain other erroneous records (Step 1027). Keeping in mind that one advantage of the present invention is that very little client input is required to achieve accurate results, the inventors contemplate error correction without further input (or very little input) from the client. In accord with the principles of the invention, stores that demonstrate no product movement (product sales equal to zero) over a predetermined time period are treated as closed. Those stores and their records are dropped from the process. In a preferred embodiment, the predetermined time period is three (3) months.

With continued reference to FIG. 10, Step 1027, the third error detection and correction also includes analysis tools for detecting the presence of erroneous duplicate records. The data is examined, in particular checking records for, date, product type, store at which the product was sold (or just "store"), price, units (which refers variously to units sold or unit sales volume), and causal variables. Causal variables are those factors which influence sales volume (a variable which can cause an increase in product sales e.g., coupons, sales promotion ads, sale prices, sale price on some complementary product, enhanced sales displays, more advantageous sales location within a store, etc.). Analysis is performed to remove the discrepant records such that only one of the records is kept as part of the analyzed data and that causal information for a particular time period is recorded.

Using the following illustrative table:

| Record Number | Date | Store | Product | Units | Price | Causal Variable |
| --- | --- | --- | --- | --- | --- | --- |
| 1 | 12/5 | Y | D | 10 | 1.99 | 1 |
| 2 | 12/5 | Y | D | 10 | 1.99 | 1 |
| 3 | 12/12 | Y | D | 10 | 1.99 | 1 |
| 4 | 12/12 | Y | D | 15 | 1.89 | 2 |
| 5 | 12/19 | Y | D | 12 | 1.99 | 1 |
| 6 | 12/26 | Y | D | 9 | 1.99 | 1 |

For example, using record #1, the date of record is 12/5, the store is store "Y", the product is product type "D", units sold for that date are 10 at a price of 1.99. The causal variable is usually abbreviated with a code symbol (e.g., numbers). Here, "1" is a symbol for no causal variable, i.e., normal sales conditions. Whereas, examining, for example, record #3 includes a causal variable (code symbol 2) which, for example, will represent an advertisement concerning product "D".

Discrepant records are identified and corrected. For example, if two records have the same exact values (such as record #1 and record #2), it is assumed that one such record is an erroneous duplicate and only one record is kept as part of the analyzed dataset, for example, only record #1 is retained.

If two records with the same date, product id, and store id have multiple records with different causals, they are combined into a single record, with the two prices maintained in separate dataset variables, units summed across the two records, and the causal variables representing something other than a normal state being represented by new dataset variables.

The following table shows an updated version of the above table. Record 2 was deleted because it is identical to Record 1. Records 3 and 4 were combined into a single record (i.e., combined into a single Record 3) with new causal variables defined for Advertisement and Advertisement Price. Records 5 and 6 did not change because there was no duplicate information.

| Record Number | Date | Store | Product | Units | Regular Price | Advertisement | Advertisement Price |
| --- | --- | --- | --- | --- | --- | --- | --- |
| 1 | 12/5 | Y | D | 25 | 1.99 | No | . |
| 3 | 12/12 | Y | D | 25 | 1.99 | Yes | 1.89 |
| 5 | 12/19 | Y | D | 12 | 1.99 | No | . |
| 6 | 12/26 | Y | D | 9 | 1.99 | No | . |

A further correction can be made for records having the same date and causal value but have differing prices or differing number of units sold. First, a data discrepancy needs to be detected. For example, if a record on a specific date in the same store for the same product and causal state has two different values for units, this is a discrepancy. Correction can be accomplished by, first calculating the average number of units sold over all dates in the modeled time interval. The discrepant records are compared with the average value. The record having the unit value closest to the calculated average units is kept and the other is discarded. The same general process can be followed for records having discrepancies as to price (i.e., the record having the price closest to average price is kept). If both price and units are determined to have a discrepancy, the record having the price and unit values closest to the average price and average units is kept.

After all the duplicate records are eliminated, the data is reconstructed. The data can be reviewed again to insure all duplicates are removed. Optionally, an output file including all discrepancies can be produced. In the event that it becomes necessary, this output file can be used as a follow-up record for consulting with the client to confirm the accuracy of the error detection and correction process.

Additionally, reduced processing times may be achieved by reformatting the data (Step 1029). For example, groups of related low sales volume products (frequently high priced items) can optionally be aggregated as a single product and processed together. Additionally, the data may be split into conveniently sized data subsets defined by a store or groups of stores which are then processed together to shorten the processing times. For example, all stores in the state of California can be processed together, then all the stores in Texas, etc.

Next the process includes determining the nature of missing data records in a fourth error detection and correction step (Step 1031). The missing data records are analyzed again before finally outputting a cleansed initial dataset. For example, data collected over a modeled time interval is analyzed by introducing the data into a data grid divided into a set of time periods. The time periods can be preset, computer determined, or user defined. The time periods can include, but are not limited to, months, weeks, days, or hours. One preferred embodiment uses time periods of one week. The data grid so constructed is analyzed. For the time periods (e.g., weeks) having no records a determination needs to be made. Is the record missing because:

a. there were no sales that product during that week (time period);

b. the product was sold out and no stock was present in the store during that time period (this situation is also referred to herein as a "stock-out');

c. the absence of data is due to a processing error.

Figure 11:
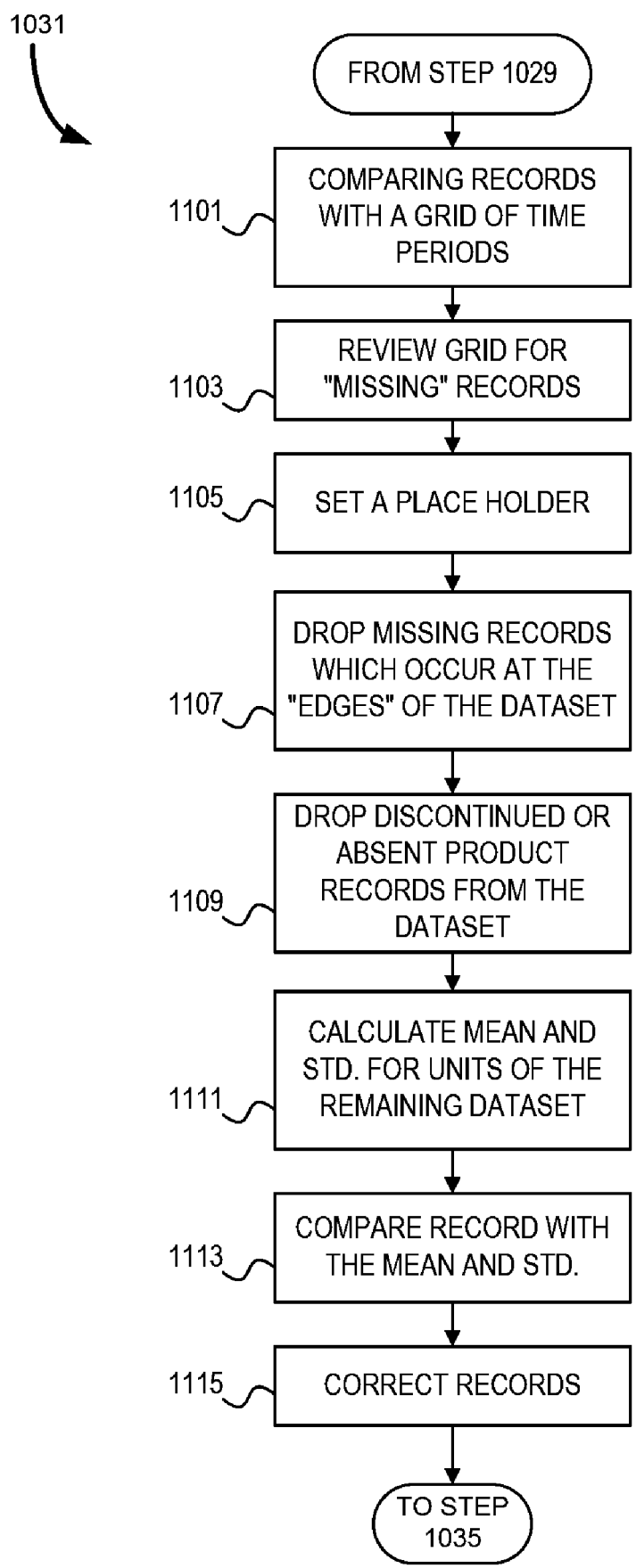
FIG. 11 is a flow chart depicting a process flow depicting a process by which partially cleansed econometric data is subject to further error detection and correction in accordance with one embodiment of the present invention.

FIG. 11 depicts a process flow embodiment for determining the nature of missing data records in a fourth error detection and correction step in accordance with the principles of the present invention. The records are compared to a grid of time periods (Step 1101). The grid is reviewed for missing records with respect to a particular store and product (Step 1103). These missing records are then marked with a placeholder (Step 1105). Missing records at the "edges" of the dataset do not significantly affect the dataset and are deleted (Step 1107). Records for discontinued products or products recently introduced are dropped for those time periods where the product was not carried in the Store (Step 1109). The remaining dataset is processed to determine an average value for units (sold) and a STD for units (Step 1111). Each missing record is compared to the average units (Step 1113) and based on this comparison, a correction can be made (Step 1115).

Referring again to FIG. 11, in Step 1101, the data records are matched with a grid of time periods (shown here as weeks, but which can be any chosen time period). The grid can cover an entire modeled time interval, for example, as shown below, the six weeks 1/7-2/14 (shown here as weeks 1, 2, 3, 4, 5, and 6). Each product in each store (here store "Z") is gridded this way. For example:

| Grid | Date | Store | Product | Units | Price |
| --- | --- | --- | --- | --- | --- |
| 1 | 1/7 | Z | Y | 10 | 1.99 |
| 2 | 1/14 | Z | Y | 12 | 2.19 |
| 3 | | | | | |
| 4 | 1/28 | Z | Y | 8 | 1.99 |

-continued

| Grid | Date | Store | Product | Units | Price |
|------|------|-------|---------|-------|-------|
| 56 | 2/7 | Z | Y | 10 | 1.99 |

Review of the grid (Step 1103) shows that records are "missing" for dates 1/21 and 2/14 (i.e., grid 3 and grid 6). Placeholders are set in the records defined by grid 3 and grid 6 (Step 1105). For example, an easily detectable or arbitrarily large value can be put in the price column of the grid, e.g. 999. Alternatively, a simple X can be placed as a placeholder in the price column. In the present example, "X's" can be placed in the price columns of grid 3 and grid 6.

If the first or last grid in the dataset (here grid 1 or grid 6) has few or no observations, those records are deleted from the dataset (Step 1107). For purposes of the above analysis, a grid having "few" observations is defined as a grid having 50% fewer observations than is normal for the grids in the middle of the dataset. Here, for example, the record for grid 6 (the last week) is deleted because no records are present for that week. Also, using client-supplied stocking information, products which have been discontinued during the modeled time interval do not have their grids filled out for the discontinued time period (Step 1109). Also, products which are introduced during the modeled time interval have their time grid filled out only for those time periods occurring after the product introduction date. Thus, certain data aberrations are removed from the modeled dataset, permitting more accurate modeling.

The mean units (sold) and the STD for units are then calculated (Step 1111). For example, in dataset depicted above, the mean is 10 units. The missing record is then compared with the mean value (Step 1113). Here, a missing record (grid 3) is assigned an initial unit value=0. If the value of zero units lies within one (1) STD of the calculated mean, it is assumed that an actual value of zero units is feasible and that record is treated as if the record is valid (unit volume=0). However, if zero lies at greater than one STD from the mean, it is assumed that the value of zero units is due to a "stock-out". In such case, it is assumed that had product been present in the store an average number of units would have been sold. Therefore, the zero unit value for that record is replaced by a unit value equal to the calculated mean unit value, thereby correcting for the "stock-out". In this case, units for grid 3 will be corrected to calculated mean units (i.e., 10).

The product histories of the dataset can also be examined. If the subject product was introduced or discontinued as a salable item at the subject store during the modeled time interval, the grid is not filled out (with either zero or average values) for those time periods where the product was not offered for sale in the subject store. In this way missing records do not corrupt the dataset.

Further aspects of the fourth error detection and correction include a detection and elimination of outlying price data points (outliers). A satisfactory way of accomplishing this begins with a calculation of the mean price for each product within a given store, as determined over the modeled time interval. Once a mean price and STD are determined, all price data for the modeled time interval is examined. If it is determined that a price record lies within three (3) STD from the mean price it is deemed accurate and not an outlier. However, prices lying outside three (3) STD are treated as outliers. These outliers are assigned adjusted prices. The adjusted prices have the value of the immediately preceding time period (e.g., the previous day's or week's price for that product within the store). This adjusted price data is again checked for outliers (using the original mean and STD). Again, outliers are checked against the original mean and STD and again price adjusted if necessary. This usually removes all the remaining outliers. However, the process may optionally continue, iteratively, until there are no further outliers.

The net result of execution of the process Steps 1011-1031 disclosed hereinabove is the generation of a cleansed initial dataset which can be used for its own purpose or input into other econometric processes. One such process is the generation of imputed econometric variables.

2. Generation of Imputed Econometric Variables

The foregoing steps (1011-1031) concern cleansing the raw econometric data to create an error detected and error corrected ("cleansed") initial dataset. The cleansed initial dataset created in the foregoing steps can now be used to generate a variety of useful imputed econometric variables (Step 1033). These imputed econometric variables are useful in their own right and may also be output for use in further processing (Step 1035). One particularly useful application of the imputed econometric variables is that they can be input into an optimization engine which collects data input from a variety of sources and processes the data to provide very accurate economic modeling information.

a. Imputed Base Price

Figure 12A:
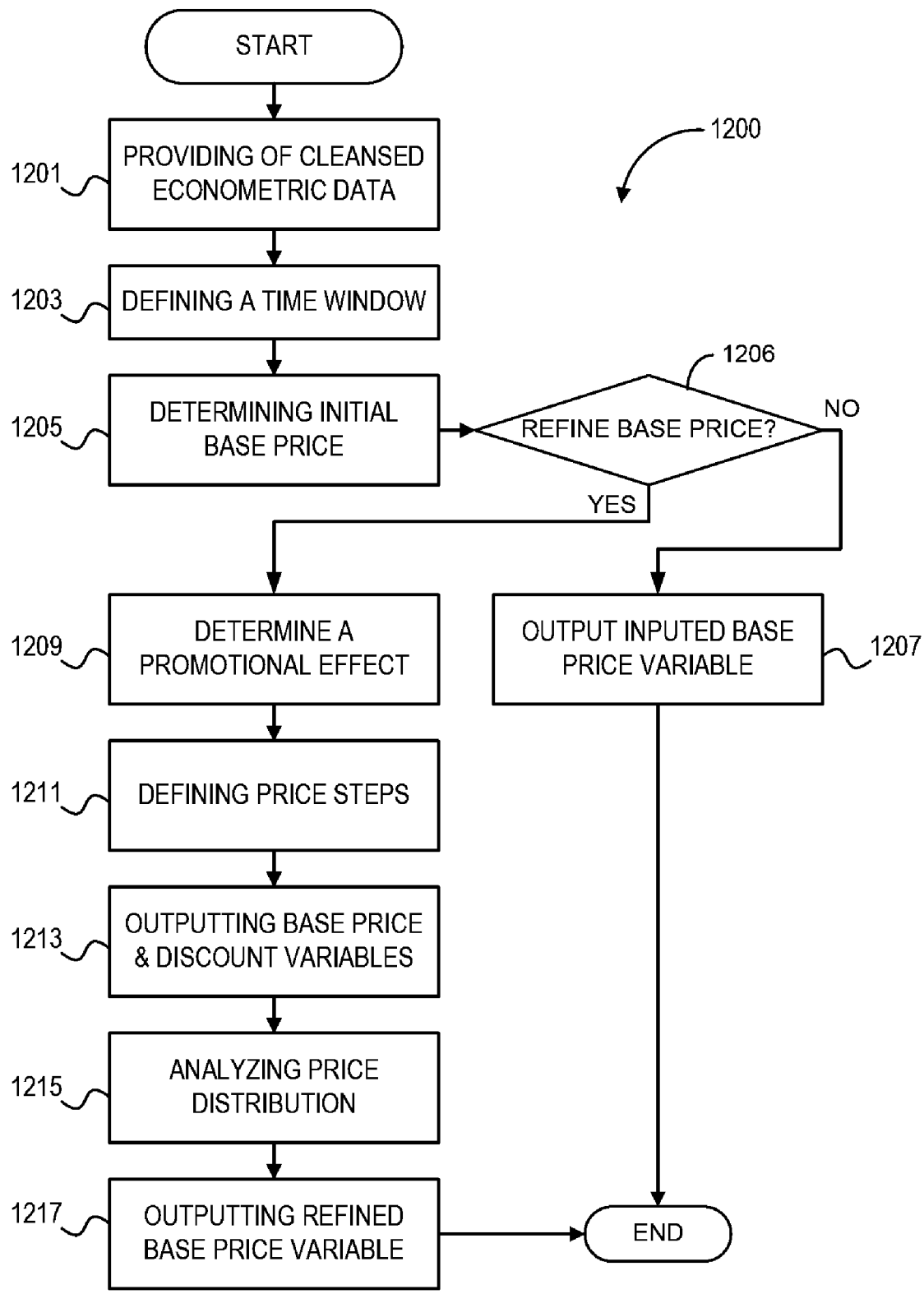
FIG. 12A is a flow chart depicting a process flow by which an imputed base price variable can be generated in accordance with one embodiment of the present invention.

One imputed econometric variable that can be determined using the initial dataset created in accordance with the foregoing, is an imputed base price variable (or base price). FIG. 12A is a flowchart 1200 outlining one embodiment for determining the imputed base price variable. The process begins by providing the process 1200 with a "cleansed" initial dataset (Step 1201), for example, the initial dataset created as described in Steps 1011-1031 of FIG. 10. The initial dataset is examined over a defined time window (Step 1203). Defining a time window (Step 1203) includes choosing an amount of time which frames a selected data point allowing one to look forward and backward in time from the selected data point which lies at the midpoint in the time window. This is done for each data point in the dataset, with the time window being defined for each selected data point. The time frame can be user selected or computer selected. The time window includes T time periods and the time period for the selected data point. One preferred set of T time periods is eight (8) weeks. It is contemplated that time windows of greater or lesser size can be selected. Referring to a preferred example, the selected (or current) data point is centered in the time window having T/2 time periods before the selected data point and T/2 time periods after the selected data point. In the present example, the time window includes the four weeks preceding the selected data point and the four weeks after the selected data point.

Figure 12B:
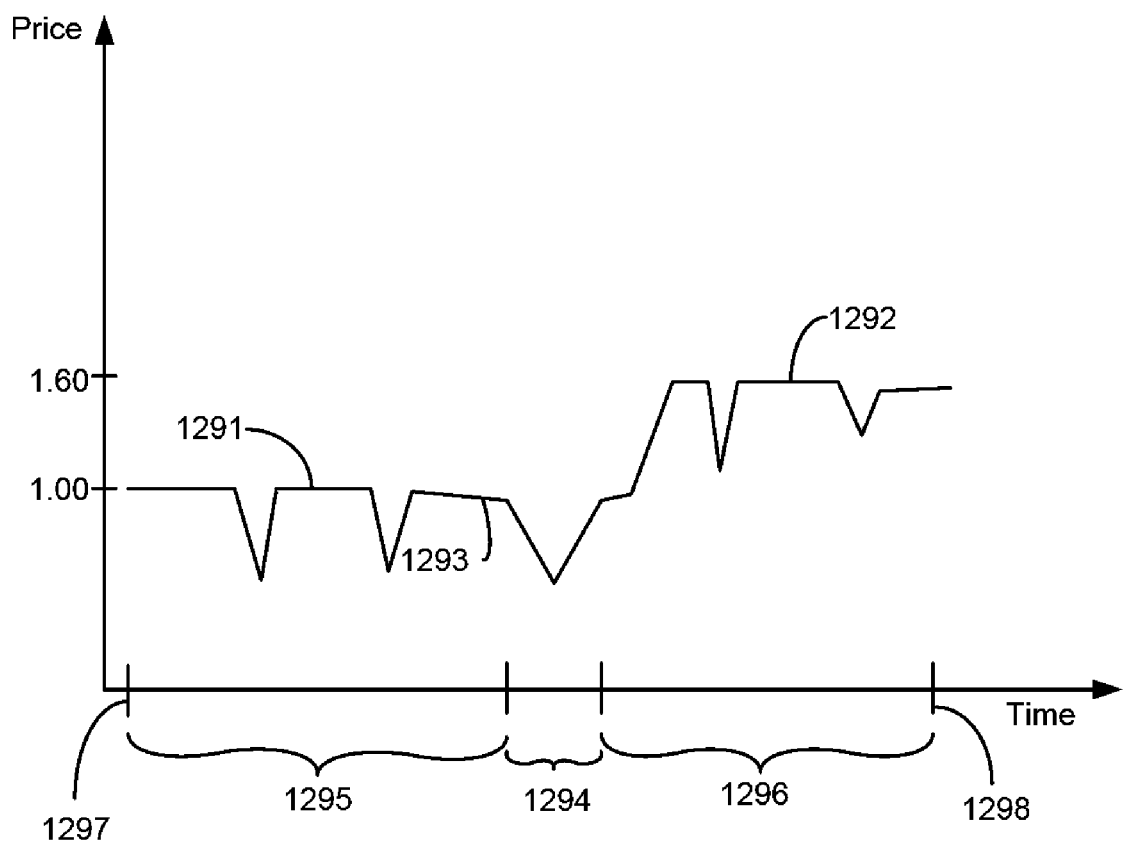
FIG. 12B is a price time diagram which illustrates an aspect of generating an imputed base price variable in accordance with one embodiment of the present invention.

Referring to FIG. 12B, the selected data point 1294 referred to as "X" (shown as a single week) is framed by a time period of −T/2 1295 (shown here as 4 weeks) before the data point "X" 1294 and a time period of +T/2 1296 (shown here as 4 weeks) after the data point "X" 1294. The time window comprising all the time (i.e., −T/2, X, T/2) between points a and b shown at 1297 and 1298 respectively.

Referring again to FIG. 12A, once the time window is defined, an "initial base price" is determined (Step 1205). This can be accomplished by the following process. With reference to FIG. 12B, two price maxima are determined ($M_1$, $M_2$) 1291 and 1292 respectively, one for each of the T/2 time periods before and after the current data point. The lesser value of the two maxima (here $M_1$) comprises the initial base price. The actual price (in selected data point "X" 1294) is compared with this initial base price (here, $M_1$). If initial base price is higher than the actual price (as shown in the pictured example), then the "initial base price" is reset to reflect the price for the previous time period. In the pictured example, the lesser maxima $M_1$ is $1.00, the actual price during the data point "X" 1294 is less than $1.00 so the initial base price is reset to the price of the previous time period 1293 referred to as "P" (here $1.00).

Alternatively, the initial base price can be determined using other methods. For example, the average price of the product over the −T/2 time period (4 weeks) preceding the data point X may be used as the initial base price. Whatever method used, the initial base price is generated for each time period of the modeled time interval. One by one, each data point in the modeled time frame is examined and an initial base price is determined for each time period (e.g., "X") in the modeled time interval.

The initial base price values generated above provide satisfactory values for the imputed base price variable which may be output (Step 1207) and used for most purposes. However, optional Steps 1209-1217 describe an approach for generating a more refined imputed base price variable. Step 1206 may inquire whether to perform generation of a more refined imputed base price variable.

In generating a more refined imputed base price variable, the effect of promotional (or discount) pricing is addressed (Steps 1209-1217). This may be calculated by specifying a discount criteria (Step 1209); defining price steps (Step 1211); outputting an imputed base price variable and an imputed discount variable (Step 1213); analyzing the base price distribution (Step 1215); and outputting a refined base price variable (Step 1217).

Data records are evaluated over a series of time periods (e.g., weeks) and evaluated. The point is to identify price records which are discounted below a base price. By identifying these prices and not including them in a calculation of base price, the base price calculation will be more accurate. Therefore, a discount criterion is defined and input as a variable (Step 1209). A preferred criterion is 2%. Therefore, records having prices which are discounted 2% below the previously determined initial base price are treated as records having "promotional prices". These records are temporarily deleted from the dataset. The remaining records, having zero or small discounts, are treated as "non-promoted" records. So the price of each product for the "non-promoted" time periods (weeks) is averaged over all time periods (weeks) in the modeled time interval. The average non-promoted price is referred to as a base price.

Figure 12C:
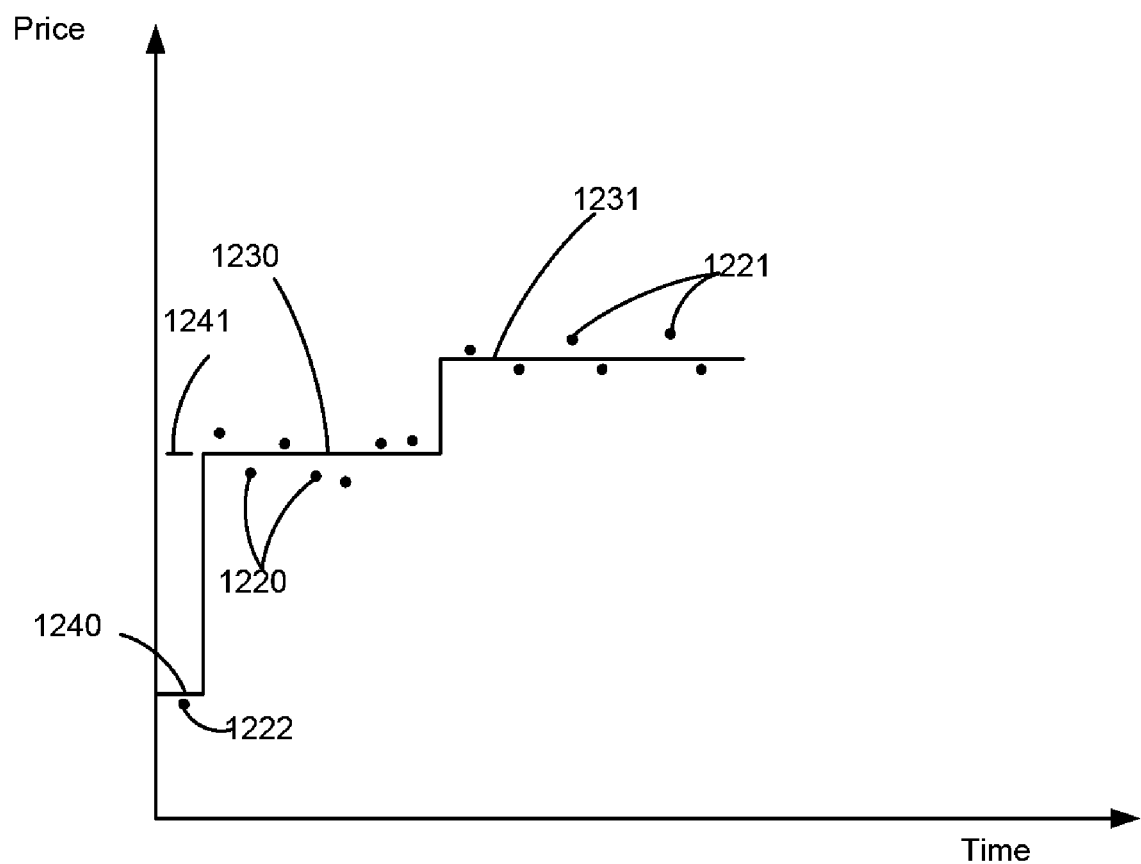
FIG. 12C is a price time diagram which illustrates an aspect of generating an imputed base price step function in accordance with one embodiment of the present invention.

Further analysis is used to define base price "steps" (Step 1211). This process can be more readily illustrated with references to FIG. 12C which shows a distribution of base price data points 1220, 1221, 1222 and their relationship to a projected step function 1230, 1231, 1240, 1241 plotted on a graph of price over time. Base price data points 1220, 1221, 1222 are evaluated. Steps 1230, 1231 are roughly defined such that the base price data points 1220, 1221 lie within a small percent of distance from the step 1230, 1231 to which they are associated (e.g., 2%). This can be accomplished using, for example, a simple regression analysis such as is known to those having ordinary skill in the art. By defining the steps 1230, 1231, the average value for base price over the step is determined. For example, price data points 1220 are averaged to determine the base price of step 1230. Also, price data points 1221 are averaged to determine the base price of step 1231. Thus, the average of the base prices in a step is treated as the refined base price for that step.

Further refining includes an analysis of the first step 1240. If the first step 1240 is short (along the time axis) and considerably lower than the next step 1230, it is assumed that the first step 1240 is based on a discounted price point 1222. As such, the value of the next step 1230 is treated as the base price for the time period of the first step 1241 (represented by the dashed line).

At this point, absolute discount (ΔP) and base price (BP) are used to calculate percent discount (ΔP/BP) for each store product time period. Percent discounts that are less than some value (e.g. 1%) are treated as being no discount and corrected to ΔP/BP=0. The above determined base price variable and percent discount variable are then output (Step 1213).

This base price is subjected to further analysis for accuracy using cross-store checking (Step 1215). This can be accomplished by analyzing the base price data for each product within a given store. A curve is generated for each product. This curve defines the price distribution for each product. The $80^{th}$ percentile for base price is then calculated for the analyzed product (i.e., the base price point below which 80% of the analyzed product (over the modeled time interval) is priced). This is referred to as the "in store $80^{th}$ percentile" for that product. A calculation is then made of the average $80^{th}$ percentile for price of the analyzed product across all stores (the cross-store $80^{th}$ percentile). Each store's prices are then merged with each other store to calculate the average $80^{th}$ percentile for base price over all stores.

The stores are then analyzed product by product. If the base price for a store is greater than two (2) standard deviations from the cross-store average $80^{th}$ percentile for base price and if the in-store $80^{th}$ store percentile is more than 50% different from the cross-store $80^{th}$ percentile, this store is flagged as an outlier for the analyzed product.

| Store | Product | In Store $80^{th}$ % | Cross-Store $80^{th}$ % | Flagged |
|---|---|---|---|---|
| Y | A | 1.99 | 1.99 | No |
| Y | B | 2.09 | 1.99 | No |
| Y | C | 0.29 | 1.99 | Yes |
| Y | D | 1.89 | 1.99 | No |

Figure 12D:
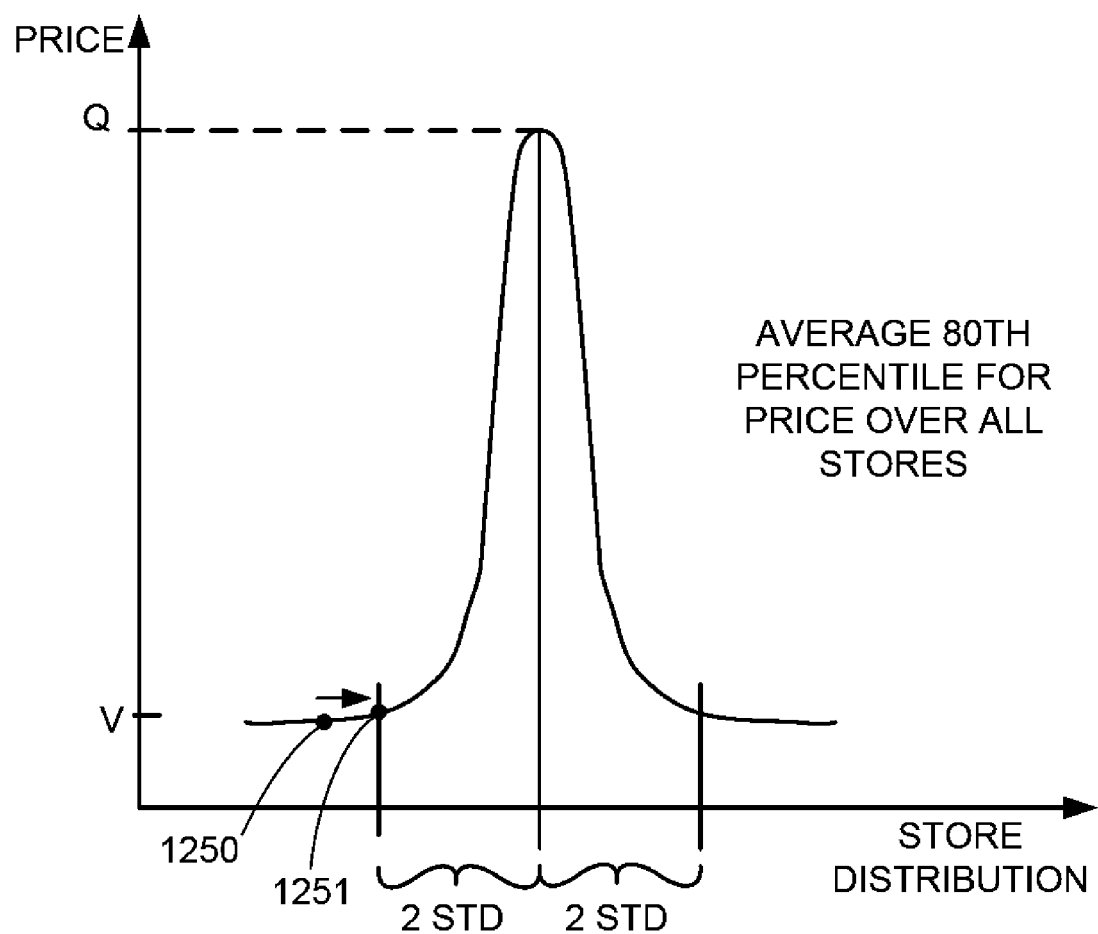
FIG. 12D is a diagram which illustrates an error correction aspect of base price imputation in accordance with one embodiment of the present invention.

The outlier store's base price is adjusted for the analyzed product such that it lies only two (2) standard deviations away from the average cross-store $80^{th}$ percentile for base price over all stores. This is illustrated in FIG. 12D. The average $80^{th}$ percentile price over all stores is shown as "Q". If a flagged store has a base price for an analyzed product beyond two (2) STD from the mean, as shown by data point 1250, that data point is corrected by moving the data point to the "edge" at two (2) STD (as shown by the arrow) from the mean. That point 1251 is shown having a new base price of V.

Thus, the forgoing process illustrates an embodiment for determining an imputed base price variable.

b. Imputed Relative Price Variable

Figure 13:
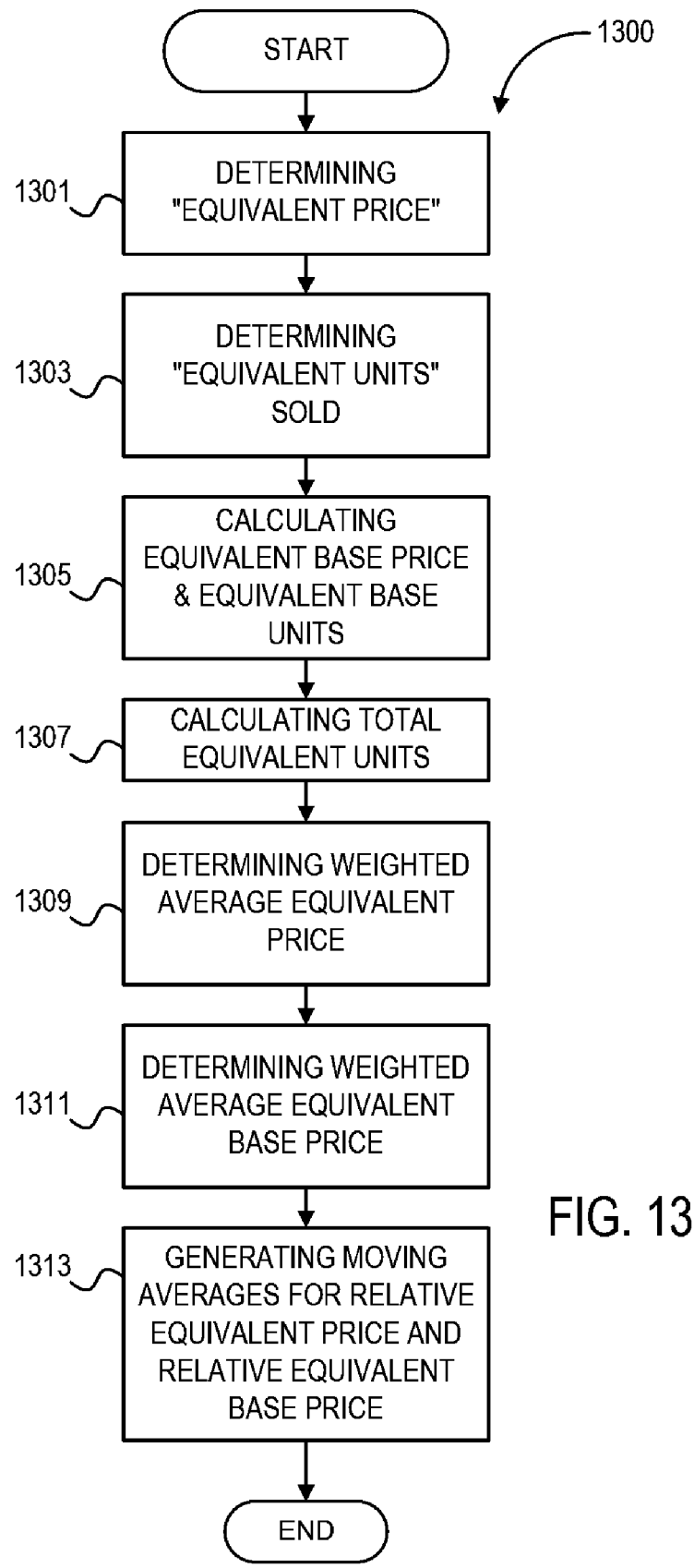
FIG. 13 is a flow chart depicting a process flow by which an imputed relative price variable can be generated in accordance with one embodiment of the present invention.

Reference is now made to the flowchart 1300 of FIG. 13 which illustrates an embodiment for generating relative price variables in accordance with the principles of the present invention. In the pictured embodiment, the process begins with a calculation of an "equivalent price" for each product sold for each store (Step 1301). The following example will use soda to illustrate an aspect of the present invention. An example dataset is shown below:

| Product | Size | Equivalent Factor | Actual Price | Units | Equivalent Units | Equivalent Price |
|---------|------|-------------------|--------------|-------|------------------|------------------|
| A | 8 | 16 | 1.00 | 500 | 250 | 2.00 |
| B | 16 | 16 | 2.00 | 300 | 300 | 2.00 |
| C | 32 | 16 | 3.00 | 100 | 200 | 1.50 |

Using this data, relative price may be calculated. As disclosed earlier, an equivalizing factor is defined. For this example, let the equivalizing factor be 16. Using the equivalizing factor, an equivalent price can be calculated (Step 1301).

$$\text{Equivalent Price} = \text{Actual Price} \cdot \left( \frac{\text{Equivalizing factor}}{\text{size}} \right)$$

Thus for A: Equivalent Price $= \$1.00 \left( \frac{16}{8} \right) = \$2.00$

B: $\$2.00 \left( \frac{16}{16} \right) = \$2.00$

C: $\$3.00 \left( \frac{16}{32} \right) = \$1.50$ the results of these calculations are shown in the "Equivalent Price" column of the table above.

Next equivalent units sold ("units") can be calculated (Step 1303).

$$\text{Equivalent Units} = \text{units} \cdot \left( \frac{\text{size}}{\text{equivalizing factor}} \right)$$

Thus for A: Equivalent Price $= 500 \left( \frac{8}{16} \right) = 250$

B: $300 \times \left( \frac{16}{16} \right) = 300$

C: $100 \times \left( \frac{32}{16} \right) = 200$

In a similar vein, equivalent base price and equivalent base units are calculated (Step 1305) using the imputed values for base price (for example, as determined in Steps 1201-1207) and for base units (also referred to as base volume which is determined as disclosed below).

For each Store, each demand group, and each date, the total equivalent units is determined (Step 1307). For example, using the dataset above (assuming that the data is from the same store), a total of 750 (i.e., 250+300+200) equivalent units were sold.

Defining A, B, and C as products in a demand group, the equivalent values for the demand group are depicted below:

| Product | Equivalent Units | Equivalent Price |
|---------|------------------|------------------|
| A | 250 | $2.00 |
| B | 300 | $2.00 |
| C | 200 | $1.50 |

A weighted calculation of relative equivalent price is then made (Step 1309). For example, such relative price value is determined as follows:

Equivalent price is divided by a weighted denominator. The weighted denominator is calculated by multiplying equivalent units for each product times the equivalent units sold. For each product, only the values of other products are used in the calculation. This means excluding the product being analyzed. For example, if products A, B, and C are being analyzed in turn, when product A is analyzed the value for A is excluded from the denominator. Using the above data, the relative price of A ($rel_A$) is determined as follows:

$$rel_A = \frac{equiv.priceofA}{\left[ \frac{(equiv.unitsofB)(Equiv.priceofB) + (equiv.unitsofC)(equiv.priceofC)}{totalequivalentunits - equivalentunitsofA} \right]}$$

$$= \frac{2}{\left[ \frac{(300)(200) + (200)(1.50)}{(250 + 300 + 200) - 250} \right]}$$

$$= 1.111$$

$$rel_B = \frac{2}{\left[ \frac{(250)(2.00) + (200)(1.50)}{750 - 300} \right]}$$

$$= 1.125$$

$$rel_C = \frac{1.50}{\left[ \frac{(250)(2.00) + (300)(2.00)}{750 - 200} \right]}$$

$$= 0.75$$

To insure that all members of a demand group are counted at least at some minimal level, if equivalent units=0, a value of "1" is added to all units. In an example where equivalent units were A=0; B=5; C=11, the units would be revalued as A=1; B=6; C=12, and the calculations as disclosed above would be conducted. Also, where the number of products in a demand group is equal to one, the weighted average equivalent price for the single product is equal to the equivalent price for that product. If a value for equivalent price is missing, the equivalent price for the previous record is used for equivalent price.

Also, a weighted average equivalent base price is calculated using the method disclosed hereinabove. The only difference being that instead of using the actual equivalent price, the calculated base price values per equivalent are used (Step 1311). Using the previously disclosed techniques, a moving average is generated for relative actual equivalent price and relative equivalent base price (Step 1313).

This moving average is generally calculated by first defining a time period window framing each analyzed date (e.g., four weeks, two weeks prior, two weeks after). This framing time period is specified as an input. Second, for each date in the time period window, a weighted average of actual equivalent price and a weighted average of equivalent base price are calculated. For time period windows where there are insufficient days preceding the analyzed date (e.g., if the time window requires two week's worth of data but only one week is available), imputed values are provided for base price or actual price. Such imputed values are just the average value for base price or actual price, respectively. Third, once the time period window is defined, calculations are made defining average relative actual equivalent price and average relative equivalent base price over the time period window, thereby defining a moving average for both relative actual equivalent price and relative equivalent base price. This, is repeatedly done with the window being moved incrementally through the dataset thereby obtaining a moving average.

Thus a variety of imputed relative price variables can be generated (e.g., relative equivalent price, relative equivalent base price. etc.).

c. Imputed Base Volume Variable

Figure 14A:
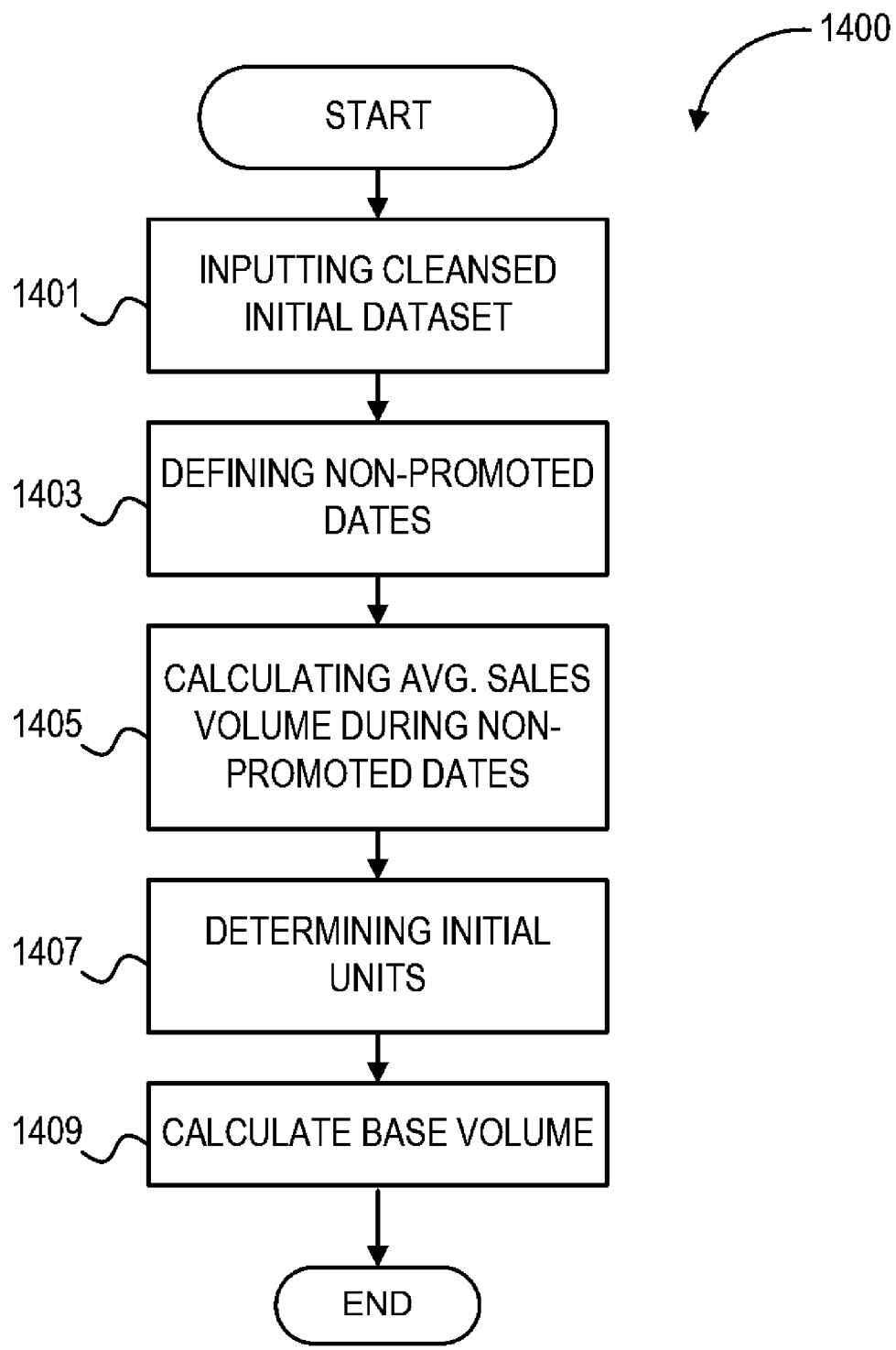
FIG. 14A is a flow chart depicting a process flow by which an imputed base unit sales volume variable can be generated in accordance with one embodiment of the present invention.

A flowchart 1400 shown in FIG. 14A illustrates one embodiment for generating an imputed base volume variable. Base volume refers to the volume of product units sold in the absence of discount pricing or other promotional effects. Base volume is also referred to herein as simply "base units". The determination of base volume begins by receiving the cleansed initial dataset information for each product and store (Step 1401). The initial dataset information is processed to determine "non-promoted dates" (Step 1403). For example, using the percent discount (ΔP/BP) information generated above, product records having a percent price discount that is less than some predetermined discount level (e.g., 2%) are treated as non-promoted products for the time periods where the percent discount is less than the predetermined discount level (e.g., 2%). These records are used to generate a data subset defining the dates where the products are not significantly price discounted i.e., "non-promoted dates". This data subset is also referred to herein as the non-promoted data subset.

Using the non-promoted data subset, an average value for "units" and a STD is calculated (i.e., an average value for product unit sales volume for each product during the non-promoted dates is calculated) (Step 1405). The average units are rounded up to the nearest integer value, this value shall be referred to as the "non-promoted average units".

An initial value for base units ("initial base units") is now determined (1407). This value is determined for all dates in the dataset, not just the non-promoted dates. For those records having a percent price discount that is less than the predetermined discount level (e.g., 2%) the actual units sold are treated as "initial base units". However, where such records (those the 2% or less discount) also have an actual value for units sold which is greater than 1.5 STD from the non-promoted average unit value (as calculated above), then the actual value for units sold is not used. Instead, it is replaced with the non-promoted average unit value in calculating "initial base units". For the other records (those having a percent price discount that is equal to or greater than the predetermined discount level (e.g., 2%)), the previously calculated non-promoted average unit value is used for "initial base units".

Figure 14B:
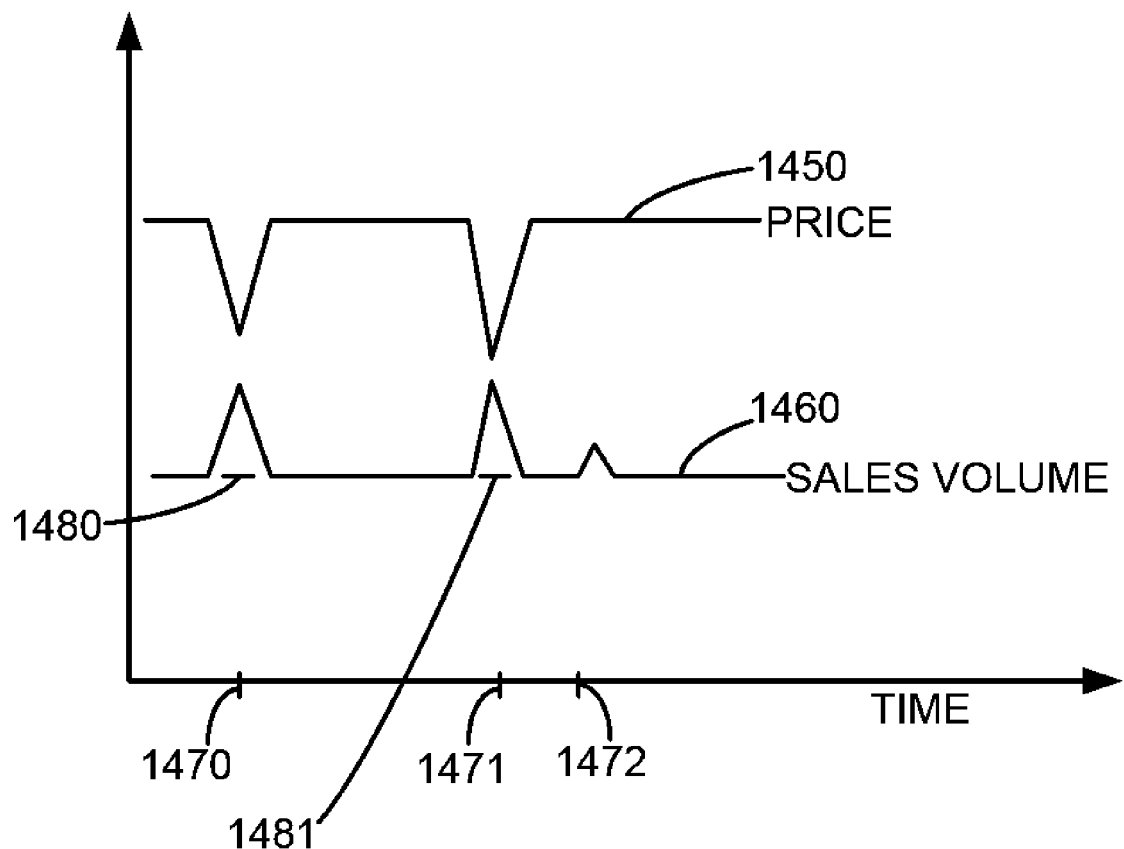
FIG. 14B is a diagram used to illustrate the comparative effects of sales volume increase and price discounts.

This principle can be more readily understood with reference to FIG. 14B. The price behavior 1450 can be compared with sales behavior 1460. Typically, when the price drops below a certain level, sales volume increases. This can be seen at time periods 1470, 1471. This can be reflective of, for example, a 2% or greater price discount. This is to be expected, and as a result, these sales records should not affect calculations of "base volume". In such a case, the actual units sold (more than usual) are not included in a base volume determination. Rather, those records are replaced with the average volume value for the non-promoted dates (the non-promoted average unit value, shown with the dotted lines 1480, 1481). However, where a sales volume increases during a period of negligible discount (e.g., less than 2%), such as shown for time period 1472, the actual units sold (actual sales volume) are used in the calculation of base volume. However, if the records show a sales volume increase 1472 which is too large (e.g., greater than 1.5 standard deviations from the non-promoted average unit value), it is assumed that some other factor besides price is influencing unit volume and the actual unit value is not used for initial base units but is replaced by the non-promoted average unit value.

A calculated base volume value is now determined (Step 1409). This is accomplished by defining a time window. One preferred window is four (4) weeks, but the time window may be larger or smaller. For each store and product, the average value of "initial base units" is calculated for each time window. This value is referred to as "average base units". This value is calculated for a series of time windows to generate a moving average of "average base units". This moving average of the average base units over the modeled time interval is defined as the "base volume variable".

d. Supplementary Error Detection and Correction

Figure 15A:
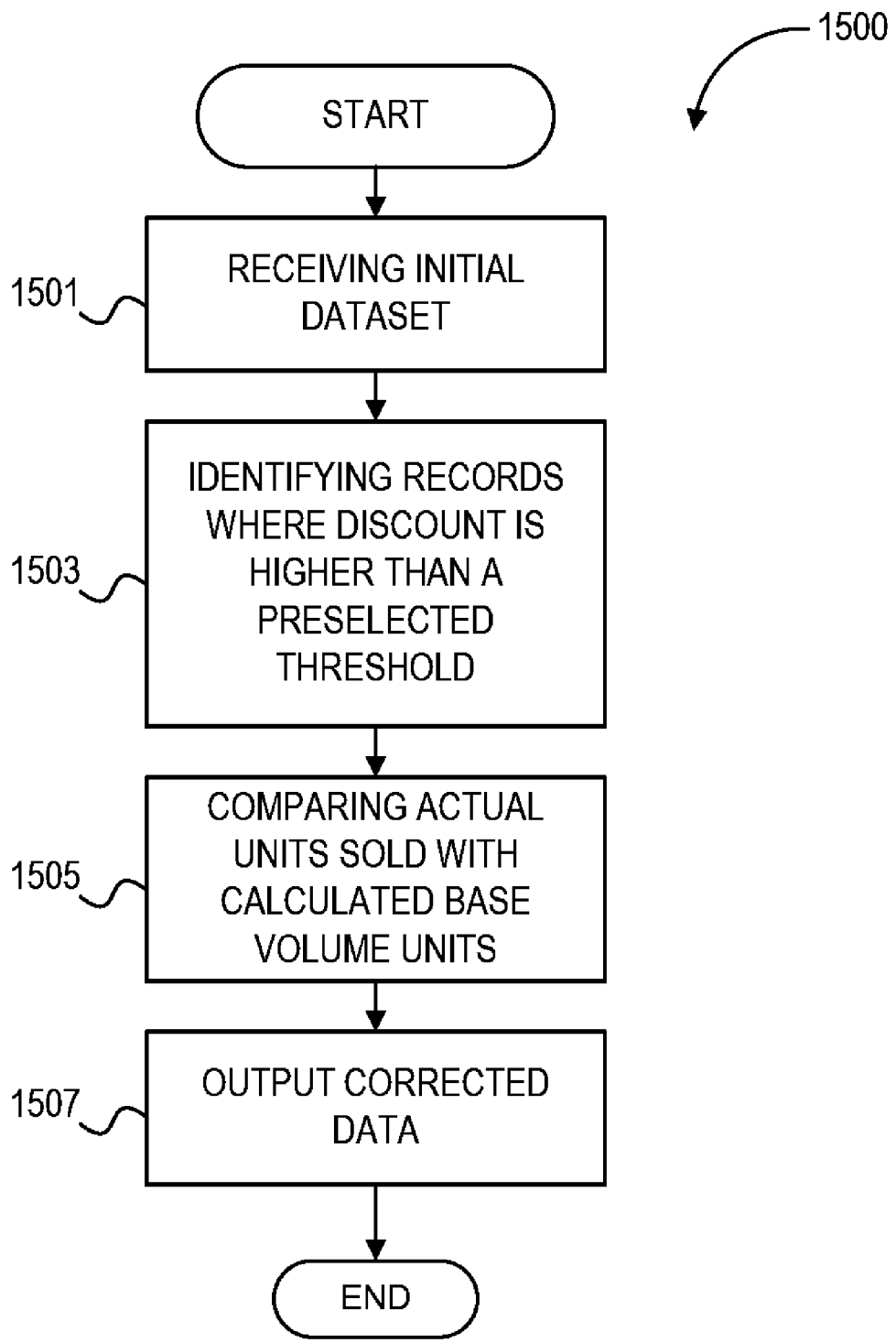
FIG. 15A is a flow chart depicting a process flow by which supplementary error detection and correction in accordance with an embodiment of the present invention.

Based on previously determined discount information, supplementary error detection and correction may be used to correct price outliers. A flowchart 1500 illustrated in FIG. 15A shows one embodiment for accomplishing such supplementary error detection and correction. Such correction begins by receiving the cleaned initial dataset information for each product and store (Step 1501). In addition the previously calculated discount information is also input, or alternatively, the discount information (e.g., ΔP/BP) can be calculated as needed. The initial dataset and discount information is processed to identify discounts higher than a preselected threshold (e.g., 60% discount) (Step 1503). For those time periods (e.g., weeks) having price discounts higher than the preselected threshold (e.g., greater than 60%), a comparison of actual units sold to calculated base volume units (as calculated above) is made (Step 1505).

Figure 15B:
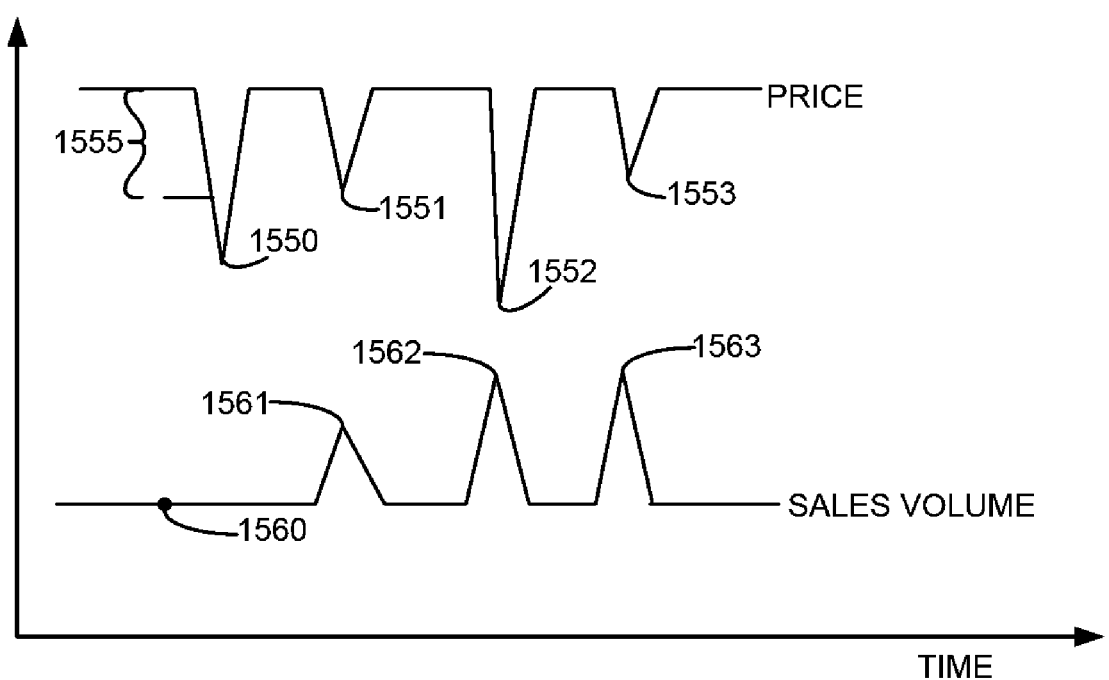
FIG. 15B is a diagram used to illustrate the comparative effects of sales volume increase and price discounts.

The concepts are similar to that illustrated in FIG. 14B and may be more easily illustrated with reference to FIG. 15B. The principles of this aspect of the present invention are directed toward finding unexplained price aberrations. For example, referring to FIG. 15B, price discounts are depicted at data points 1550, 1551, 1552, and 1553. Also, corresponding sales increases are depicted by at data points 1561, 1562, and 1563. The data point 1550 has a discount greater than the threshold 1555 (e.g., 60%). So an analysis is made of data point 1550.

If the number of actual units sold (shown as 1560) lies within two (2) STD of the calculated base volume, then it is assumed that the actual price 1550 is actually an erroneous record and the actual value 1560 is replaced with the calculated base price.

Figure 16:
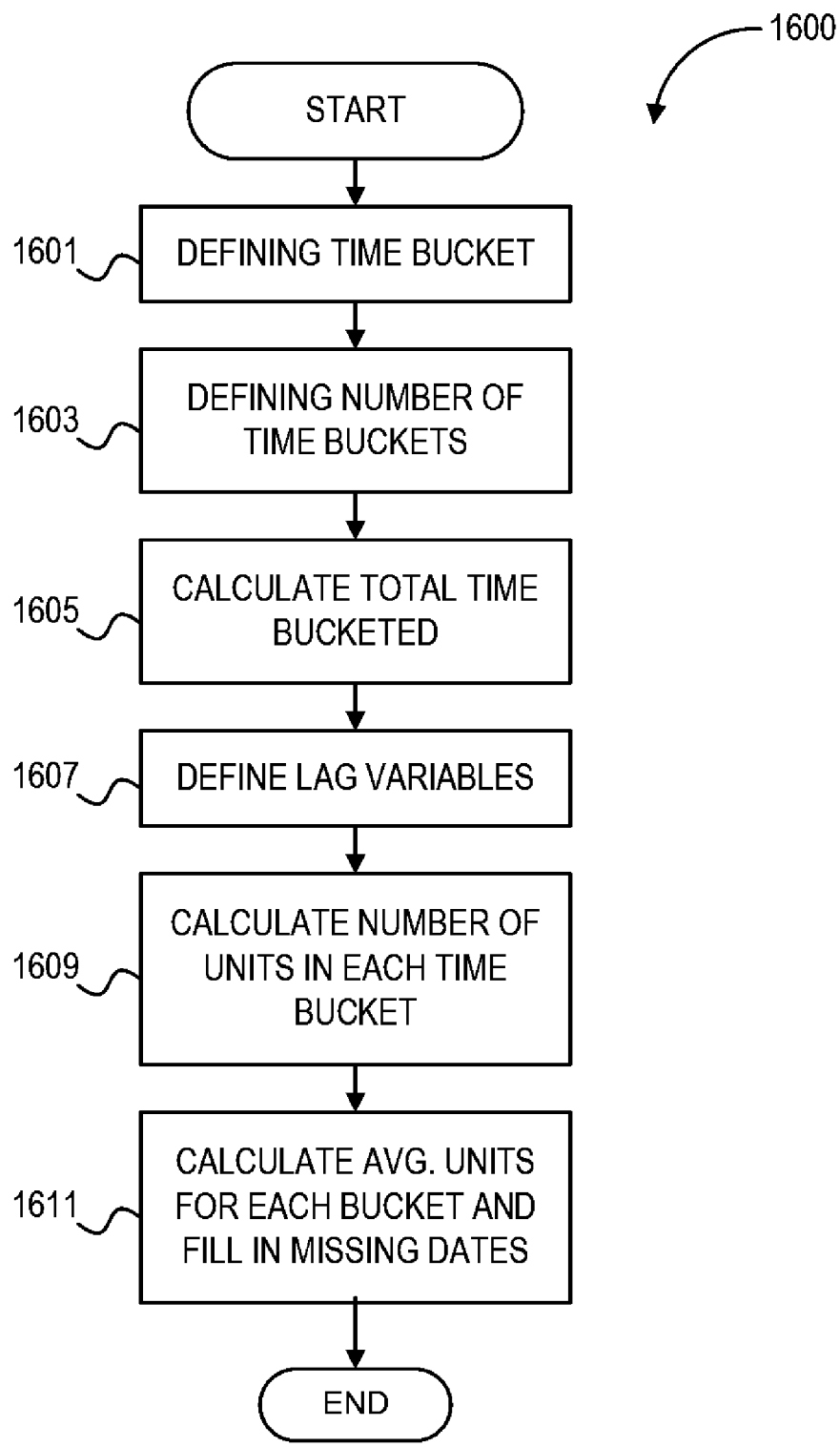
FIG. 16 is a flow chart depicting a process flow by which an imputed stockpiling variable can be generated in accordance with an embodiment of the present invention.

However, if the number of actual units sold is greater than two (2) STD from the calculated base volume, it is assumed that the volume number is correct and the price is reset to reflect a discount of 60% and the price is recalculated based on the 60% discount. In short, the discount is capped at the chosen value (here 60%). Once the data is corrected, it can be output (step 1507).

e. Determining Imputed Variables which Correct for the Effect of Consumer Stockpiling With reference to FIG. 16, a flowchart 1600 illustrating a method embodiment for generating stockpiling variables is depicted. The pictured embodiment 1600 begins by defining the size of a "time bucket"(m), for example, the size (m) of the bucket can be measured in days (Step 1601). One embodiment uses a bucket of one (1) week or seven (7) days. Additionally, the number (τ) of time buckets to be used is also defined (Step 1603). The total amount of time "bucketed" (m×τ) is calculated (Step 1605).

"Lag" variables which define the number of product units sold ("units") in the time leading up to the analyzed date are defined (Step 1607). For example:

Lag1(units)=number of product units sold in one (1) time period (e.g., a day or week) before the analyzed date;

Lag2(units)=number of product units sold in two (2) time periods (e.g., a day or week) before the analyzed date;

...

Lagt(units)=number of product units sold in t time periods (e.g., a day or week) before the analyzed date.

Then the total number of product units sold is calculated for each defined time bucket (Step 1609). For example:

Bucket1=sum of units sold during the previous m days;

Bucket2=sum of units sold from between the previous m+1 days to 2m days;

Bucket3=sum of units sold from between the previous 2 m+1 days to 3m days;

...

Bucket($\tau$)=sum of units from between the previous ($\tau$-1) m+1 days to ($\tau$)m days.

Correction can be made at the "front end" of the modeled time interval. For example, the data can be viewed as follows:

|  | Week 1 | Week 2 | Week 3 | Week 4 | Week 5 | Week 6 | Week 7 |
|---|---|---|---|---|---|---|---|
| Bucket 1 | — | Week 1 | Week 2 | Week 3 | Week 4 | Week 5 | Week 6 |
| Bucket 2 | — | — | Week 1 | Week 2 | Week 3 | Week 4 | Week 5 |
| Bucket 3 | — | — | — | Week 1 | Week 2 | Week 3 | Week 4 |
| Bucket 4 | — | — | — | — | Week 1 | Week 2 | Week 3 |

If working near the front end of a dataset, units from previous weeks cannot always be defined and in their place an averaged value for bucket sum can be used (Step 1611). For example, referring to Bucket 1, there is no Bucket 1 data for Week 1. As a result, the Bucket 1 data for weeks 2-7 are averaged and that value is put into Week 1 of Bucket 1. Similarly, with reference to Bucket 2, Week 1 and Week 2 are missing a value for Bucket 2, Weeks 1-3 are missing a value for Bucket 3, and Weeks 1-4 are missing a value for Bucket 4. The average values are generated for the missing values from weeks. For example, for Bucket 2, an average value for Weeks 3-7 is generated. This average value is used to fill out the missing dates of Bucket 2 (Weeks 1-2). Similarly, for Bucket 3, the average value for Weeks 4-7 are averaged and used to fill out the missing dates (Weeks 1-3). The same principle applies to Bucket 4. These Buckets define variables which are used to model the impact of promotional activity in previous time periods. The Buckets are used as variables in models which can be used to determine if there is a relationship between sales volume between a previous time as compared with a current time. The idea is to detect and integrate the effects of consumer stockpiling on into a predictive sales model.

f. Day of the Week Analysis

Figure 17:
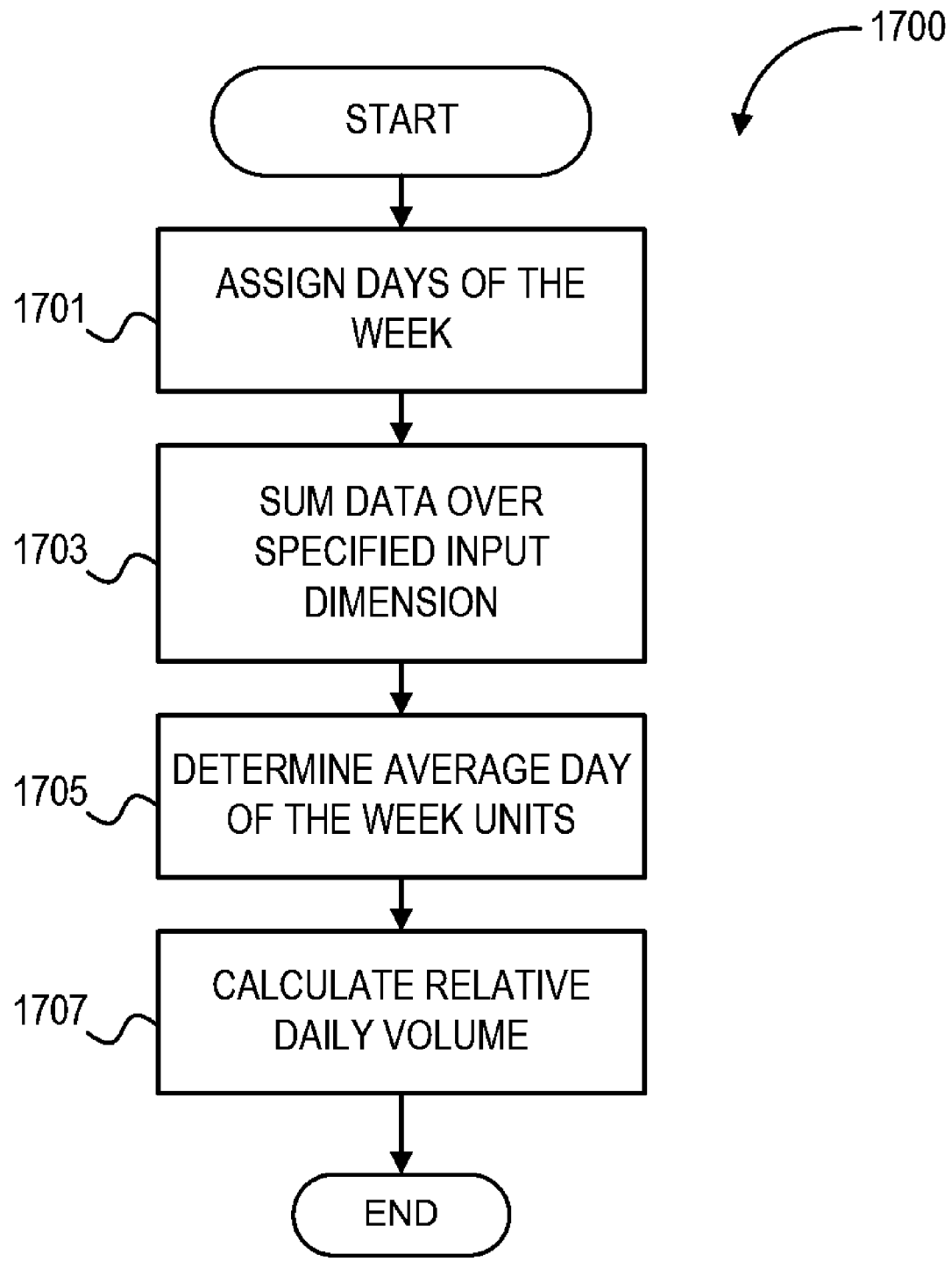
FIG. 17 is a flow chart depicting a process flow by which an imputed day-of-week variable can be generated in accordance with an embodiment of the present invention.

With reference to FIG. 17, a flowchart 1700 illustrating one embodiment for determining a Day of the Week variable is shown. It is necessary to have data on a daily basis for a determination of Day of the Week effects. In accordance with the principles of the present invention the embodiment begins by assigning the days of the week numerical values (Step 1701). A first date in the dataset is assigned. This can be arbitrarily assigned, but typically the first date for which data is available is selected as the "first date". This date is assigned Day of Week="1". The next six days are sequentially assigned Days of the Week=2, 3, 4, 5, 6, 7, respectively. This process continues with the next consecutive days data starting over again with Day of Week="1", continuing throughout all the days of the modeled time interval.

Once categorized by day of the week the product units (sold) are summed for a specified dimension or set of dimensions. Dimension as used herein means a specified input variable including, but not limited to, Product, Brand, Demand Group, Store, Region, Store Format, and other input variable which may yield useful information (Step 1703). For example, if Region is the specified dimension (e.g., all the stores in Los Angeles, Calif.), all of the unit volume for selected products in the Los Angeles stores is summed for each Day of Week (i.e., 1, 2, 3, 4, 5, 6, and 7).

For each Day of Week and each dimension specified, the average units (sold) are determined (Step 1705). For each date, a "relative daily volume" variable is also determined (Step 1707). For example, relative daily volume for a given Store is provided by (total Store daily units)/(average Store daily units). Such calculation can be accomplished for any input variable.

One numeric example can be shown as follows. A store sells 700 units of X over a given modeled time interval. Average daily units=700/7=100. If sales for all of the Friday's of the modeled time interval amount to 150 units, it can be shown that, for that Store, Friday's relative daily volume is 1.5, i.e., more than average. This information may prove valuable to a client merchant and can comprise an input variable for other econometric models.

g. Imputed Seasonality Variable Generation

Figure 18:
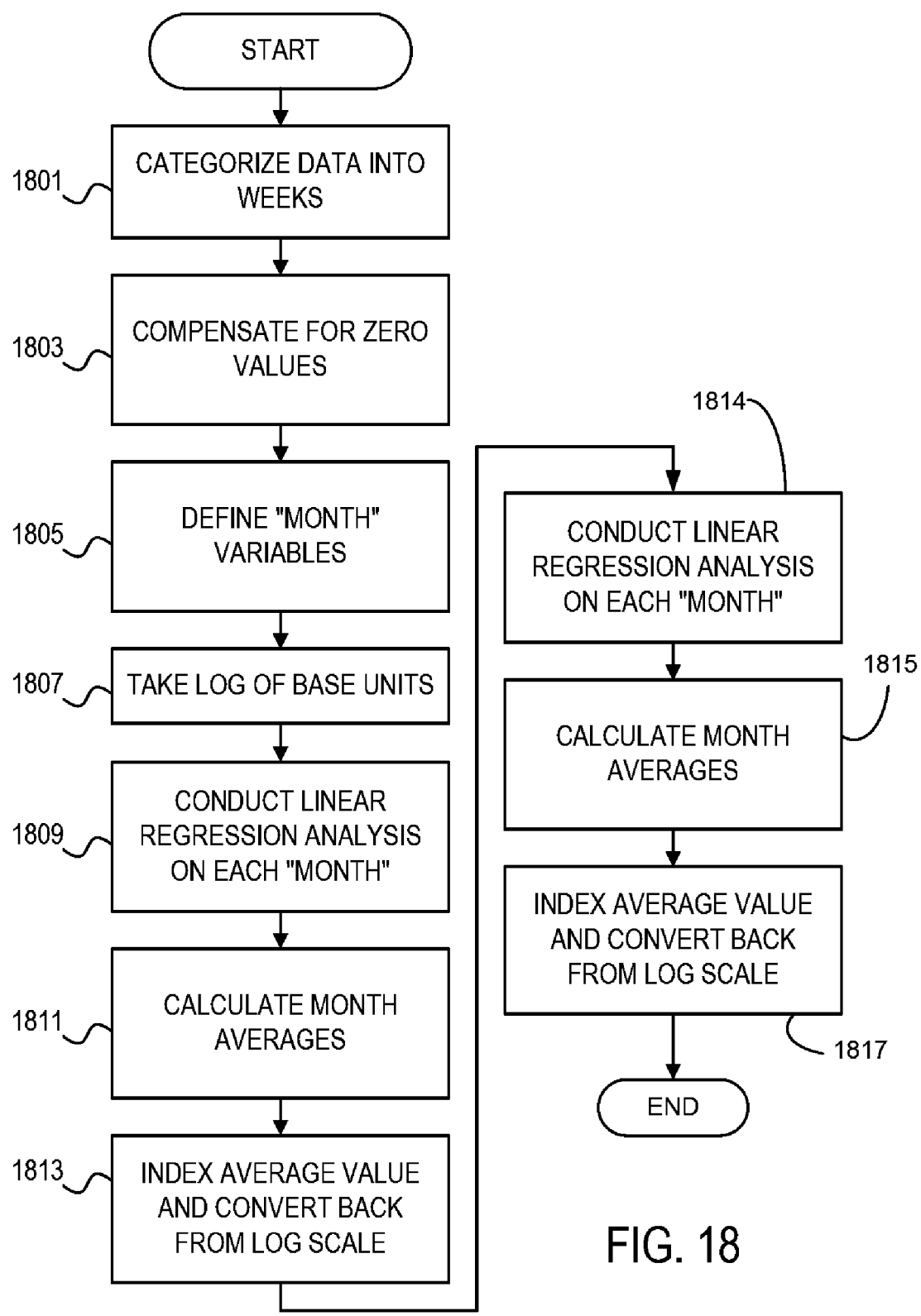
FIG. 18 is a flow chart depicting a process flow by which an imputed seasonality variable can be generated in accordance with an embodiment of the present invention.

Another useful imputed variable is an imputed seasonality variable for determining seasonal variations in sales volume. Referring to FIG. 18, a flowchart 1800 illustrating one embodiment in accordance with the present invention for determining an imputed seasonality variable is shown. The process begins with categorizing the data into weekly data records, if necessary (Step 1801). Zero values and missing records are then compensated for (Step 1803). "Month" variables are then defined (Step 1805). A logarithm of base units is then taken (Step 1807). Linear regressions are performed on each "Month" (Step 1809). "Months" are averaged over a specified dimension (Step 1811). Indexes are averaged and converted back from log scale to original scale (Step 1813). The average of normalized estimates are calculated and used as Seasonality index (Step 1815). Individual holidays are estimated and exported as imputed seasonality variables (Step 1817).

The embodiment begins by categorizing the data into weekly data records. Chiefly, this comprises aggregating daily data into weekly groups (Step 1801). For missing sales records or records having zero volume values, insert average volume data (Step 1803).

A set of month variables is first defined (Step 1805). A series of models of base units are constructed using each defined month variable as the predictor.

The process of defining month variables is as follows:

1) Define the month variable
   a. Starting with Week 1, Day 1, assign a month number to each week (Month1)
   b. Assume 4 weeks per month
   c. Depending on the time frame of the dataset, there may be 12 or 13 months defined
2) Repeat definition of month variable three more times
   a. Advance Week 1 to the second week in the dataset
   b. Assign a month number to each week (Month2)
   c. Advance Week 1 to the third week in the dataset
   d. Assign a month number to each week (Month3)
   e. Advance Week 1 to the fourth week in the dataset
   f. Assign a month number to each week (Month4)

| Week | Month1 | Month2 | Month3 | Month4 |
|------|--------|--------|--------|--------|
| 1 | 1 | 12 | 12 | 12 |
| 2 | 1 | 1 | 12 | 12 |
| 3 | 1 | 1 | 1 | 12 |
| 4 | 1 | 1 | 1 | 1 |
| 5 | 2 | 1 | 1 | 1 |
| 6 | 2 | 2 | 1 | 1 |
| 7 | 2 | 2 | 2 | 1 |
| 8 | 2 | 2 | 2 | 2 |
| ... | ... | ... | ... | ... |

The values determined for base units are now processed. By taking the log of base units the effect of extreme variations in base units can be reduced (Step 1807). A linear regression is run on the log of base units for Month 1 (Step 1809). The regression models the log of base units as a function of Month 1 levels and Week number: (log(base units)=f(Month1, Week number)). The regression analysis is repeated using months Month2, Month3, and Month4 to determine, respectively log(base units)=f(Month2, Week number); log(base units)=f(Month3, Week number); and log(base units)=f(Month4, Week number).

3) The average value across the 12 (or 13) levels of the Month1-Month4 estimates within the specified dimension (e.g. demand group) is calculated.

4) The estimates are indexed to the average estimate value and the indexes are converted back to original scale:
  a. Seasindx1=exp(estimate of Month1−avg. estimate of Month1)
  b. Seasindx2=exp(estimate of Month2−avg. estimate of Month2)
  c. Seasindx3=exp(estimate of Month3−avg. estimate of Month3)
  d. Seasindx4=exp(estimate of Month4−avg. estimate of Month4)

5) The average of the four normalized estimates is output as the Final Seasonality index
  a. Seasindx=Avg. (Seasindx1, Seasindx2, Seasindx3, Seasindx4)
  b. The values for Seasindx will be centered around 1.0, and typically range from 0.7 to 1.3.

Figure 19A:
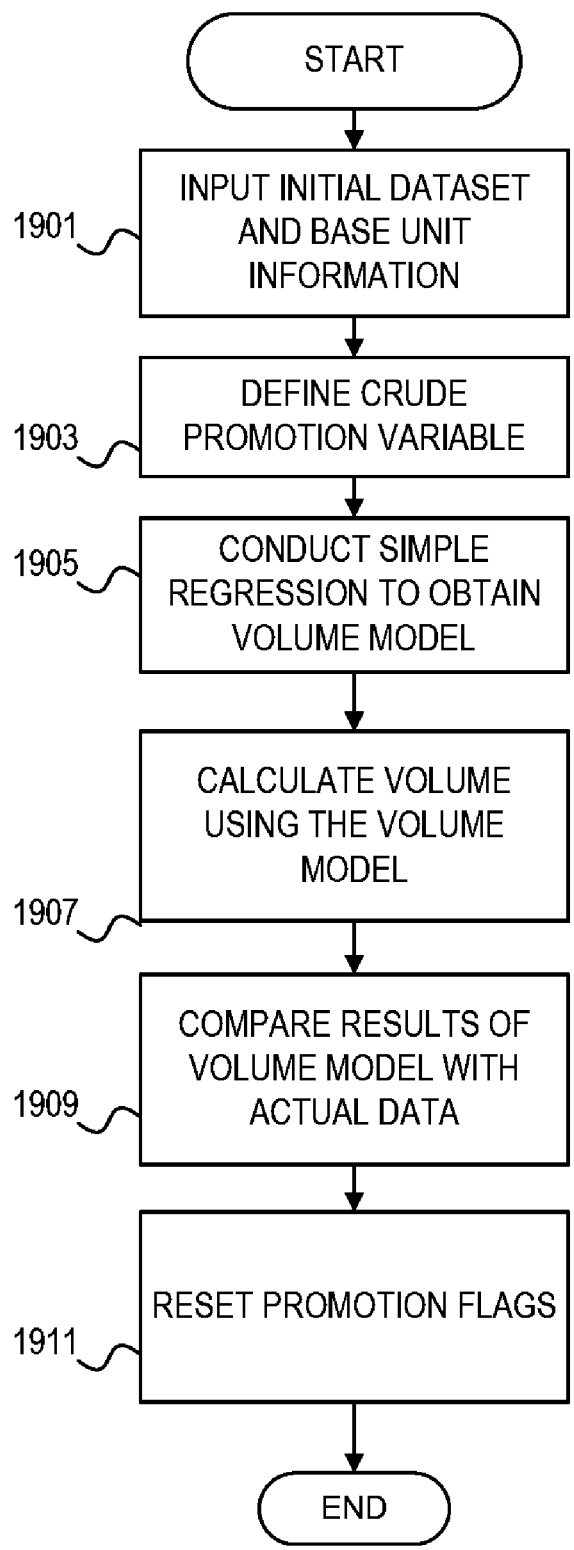
FIG. 19A is a flow chart depicting a process flow by which an imputed promotional effects variable can be generated in accordance with an embodiment of the present invention.

6) After estimating individual holidays, combine estimates with index prior to tool export h. Imputed Promotional Variable Another useful variable is a variable which can predict promotional effects. FIG. 19A provides a flowchart illustrating an embodiment enabling the generation of imputed promotional variables in accordance with the principles of the present invention. Such a variable can be imputed using actual pricing information, actual product unit sales data, and calculated value for average base units (as calculated above). This leads to a calculation of an imputed promotional variable which takes into consideration the entire range of promotional effects.

Figure 19B:
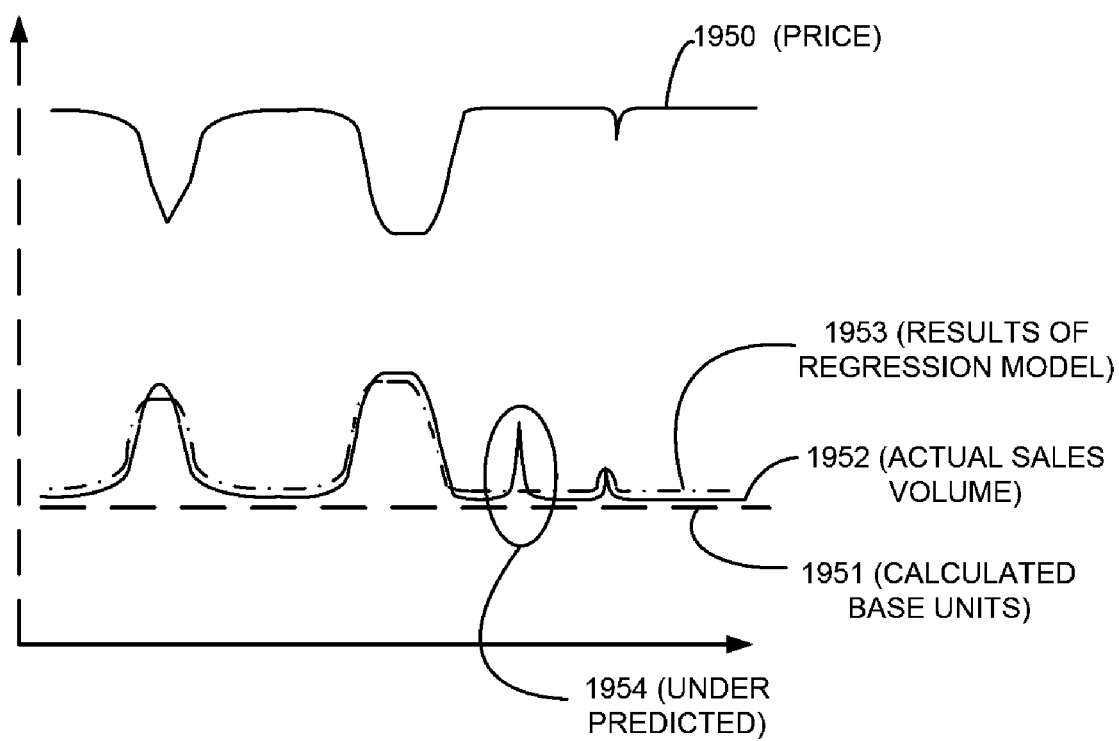
FIG. 19B is a diagram depicting the modeling effects of a promotional effects variable in accordance with an embodiment of the present invention.

FIG. 19B provides a useful pictorial illustration depicting a relationship between product price 1950, calculated average base units 1951, and actual units sold 1952 and the results of a simple regression model 1953 used to predict actual sales volume.

Referring back to FIG. 18A, the process begins by inputting the cleansed initial dataset and the calculated average base units information (Step 1901). A crude promotional variable is then determined (Step 1903). Such a crude promotional variable can be defined using promotion flags. These promotion flags may be set by an analysis of the unit sales for each date. If the actual unit sales (1952 of FIG. 19B) are greater than two (2) STD's from the average base units value (1951 of FIG. 19B) for the same date, then the price is examined. If the price for the same date has zero discount or a small discount (e.g., less than 1%) and no other promotional devices (other than discount) are involved (based on promotional information provided by the client), then the promotional flag is set to "1". For all other dates, if the above-mentioned conditions are not met the promotional flag is set to "0" for those dates. This set of "0's" or "1's" over the modeled time period defines a crude promotional variable. A simple regression analysis, as is known to those having ordinary skill in the art, (e.g., a mixed effects regression) is run on sales volume to obtain a model for predicting sales volume (Step 1905). This analysis will be designed to estimate the impact on sales volume of: price discount; the crude promotion variable; and other client supplied promotion including, but not limited to, advertisements, displays, and couponing. Using the model a sample calculation of sales volume is performed (Step 1907). The results of the model 1953 are compared with the actual sales data 1952 to further refine the promotion flags (Step 1909). If the sales volume is underpredicted (by the model) by greater than some selected percentage (e.g., 30-50%, preferably 30%) the promotion flag is set to "1" to reflect the effects of a probable non-discount promotional effect. For example, if we refer to the region shown as 1954, and the predicted sales volume is 60 units but the actual sales volume was 100 units, the model has underpredicted the actual sales volume by 40%, greater than the preselected level of 30%. Therefore, for that date the promotion flag is set to "1". This will reflect the likelihood that the increase in sales volume was due to a non-discount promotional effect. Since the remaining modeled results more closely approximate actual sales behavior, the promotion flags for those results are not reset and remain at "0" (Step 1911). The newly defined promotion flags are incorporated into a new model for defining the imputed promotional variable.

i. Imputed Cross-Elasticity Variable

Figure 20:
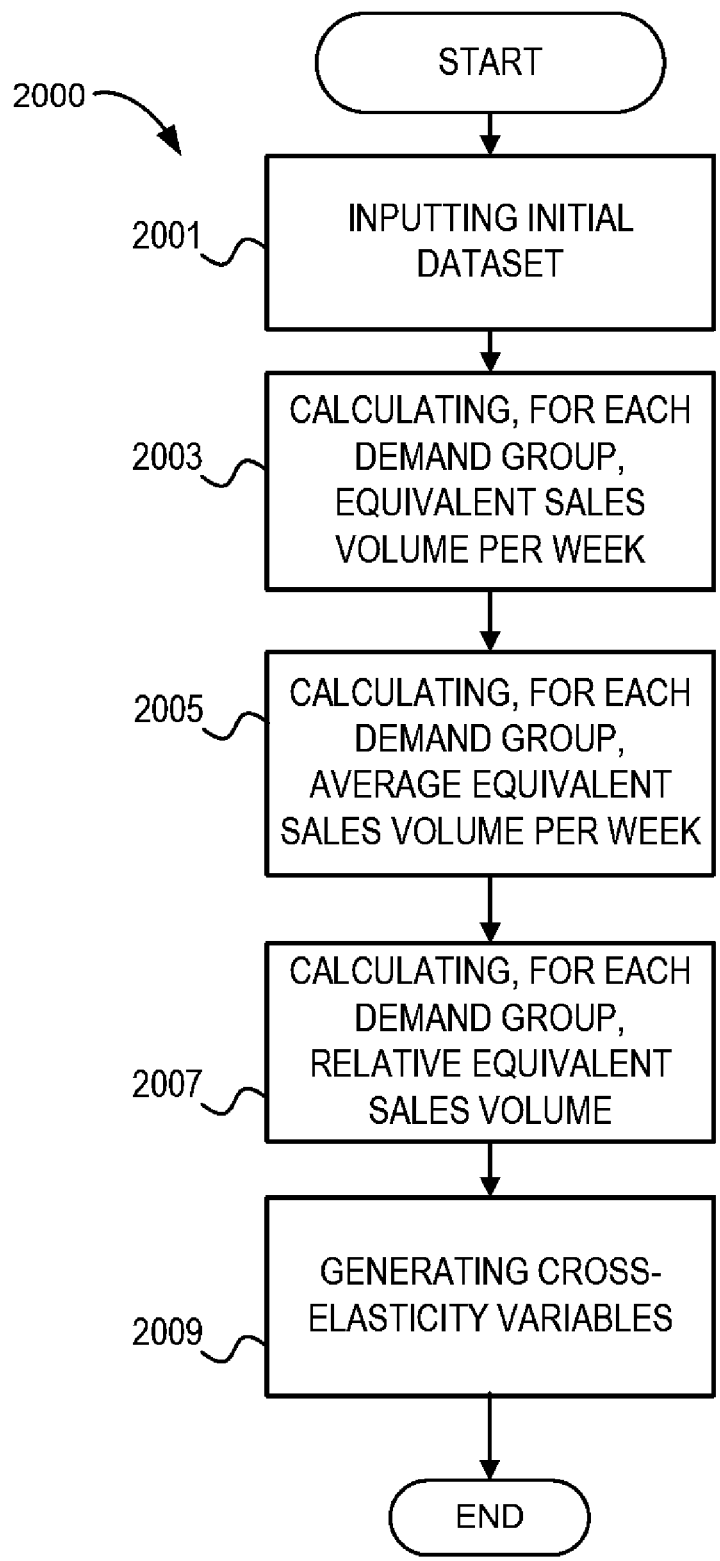
FIG. 20 is a flow chart depicting a process flow by which an imputed cross-elasticity variable can be generated in accordance with one embodiment of the present invention.

Another useful variable is a cross-elasticity variable. FIG. 20 depicts a flowchart 2000 which illustrates the generation of cross-elasticity variables in accordance with the principles of the present invention. The generation of an imputed cross-elasticity variable allows the analysis of the effects of a demand group on other demand groups within the same category. Here, a category describes a group of related demand groups which encompass highly substitutable products and complementary products. Typical examples of categories are, among many others, Italian foods, breakfast foods, or soft drinks.

An embodiment for generating cross-elasticity variables in accordance with the principles of the present invention will be illustrated with reference to the following example. The subject category is an abbreviated soft drink category defined by demand groups for diet soft drinks (diet), regular cola soft drinks (reg), caffeine free soft drinks (caff-free), and root beer soft drinks (RB).

The initial dataset information is input into the system (Step 2001). For each demand group the total equivalent sales volume for each store is calculated for each time period (for purposes of this illustration the time period is a week) during the modeled time interval (Step 2003). For each week and each demand group, the average total equivalent sales volume for each store is calculated for each week over the modeled time interval (Step 2005). For each demand group the relative equivalent sales volume for each store is calculated for each week (Step 2007). This may be calculated for each store for each week in accordance with the formula below:

Relative Demand Group Equivalent Sales Volume=Total Equivalent Sales Volume For a Specific Week divided by Average Total Equivalent Sales Volume as Determined For All Weeks in The Modeled Time Interval.

The purpose of the cross-elasticity variable is to quantify the effects of sales of one demand group upon the sales of another demand group. Therefore, when examining a first demand group, the sales of other demand groups within the same category are treated as variables which affect the sales of the first demand group. As such, the relative demand group equivalent sales volume for the other demand groups is quantified and treated as a variable in the calculation of sales volume of the first demand group, thereby generating cross-elasticity variables (Step 2009). This can be illustrated more easily with reference to the partial dataset illustrated in Tables A and B. These tables reflect one week's data (week 1).

TABLE A

| WEEK | PRODUCT | DEMAND GROUP | RELATIVE DEMAND GROUP EQUIVALENT VOLUME |
|---|---|---|---|
| 1 | A | Diet | $\frac{VolA + VolB + VolC}{avg.(VolA + VolB + VolC)}$ |
| 1 | B | Diet | $\frac{VolA + VolB + VolC}{avg.(VolA + VolB + VolC)}$ |
| 1 | C | Diet | $\frac{VolA + VolB + VolC}{avg.(VolA + VolB + VolC)}$ |
| 1 | D | Regular | $\frac{VolD + VolE + VolF}{avg.(VolD + VolE + VolF)}$ |
| 1 | E | Regular | $\frac{VolD + VolE + VolF}{avg.(VolD + VolE + VolF)}$ |
| 1 | F | Regular | $\frac{VolD + VolE + VolF}{avg.(VolD + VolE + VolF)}$ |
| 1 | G | Caff-free | $\frac{VolG + VolH + VolI}{avg.(VolG + VolH + VolI)}$ |
| 1 | H | Caff-free | $\frac{VolG + VolH + VolI}{avg.(VolG + VolH + VolI)}$ |
| 1 | I | Caff-free | $\frac{VolG + VolH + VolI}{avg.(VolG + VolH + VolI)}$ |
| 1 | J | RB | $\frac{VolJ + VolK + VolL}{avg.(VolJ + VolK + VolL)}$ |
| 1 | K | RB | $\frac{VolJ + VolK + VolL}{avg.(VolJ + VolK + VolL)}$ |
| 1 | L | RB | $\frac{VolJ + VolK + VolL}{avg.(VolJ + VolK + VolL)}$ |

TABLE B

| PRODUCT | DEMAND GROUP | $CE_{Diet}$ | $CE_{Regular}$ | $CE_{Caff\text{-}free}$ | $CE_{RB}$ |
|---|---|---|---|---|---|
| A | Diet | — | X | X | X |
| B | Diet | — | X | X | X |
| C | Diet | — | X | X | X |
| D | Regular | X | — | X | X |
| E | Regular | X | — | X | X |
| F | Regular | X | — | X | X |
| G | Caff-free | X | X | — | X |
| H | Caff-free | X | X | — | X |
| I | Caff-free | X | X | — | X |
| J | RB | X | X | X | — |
| K | RB | X | X | X | — |
| L | RB | X | X | X | — |

With reference to Table A it is shown that a calculation of Relative Demand Group Equivalent Volume for product A (a diet soda) is the total of all equivalent sales volume for the diet soda demand group for the time period (here week 1). This includes the sum of all equivalent sales volume for diet soda A, all equivalent sales volume for diet soda B, and all equivalent sales volume for diet soda C. This sum is divided by the average sum of equivalent sales volume for diet soda A, diet soda B, and diet soda C. This Relative Demand Group Equivalent Volume is a cross-elasticity coefficient ($CE_{diet}$) for products other than diet soda (here, regular soda, caffeine-free soda, and root beer). The same type of calculation is performed with respect to regular soda (reg) and, for that matter, Caffeine-Free (caff-free) and Root Beer (RB) as well. This yields four cross-elasticity coefficients ($CE_{diet}$, $CE_{reg}$, $CE_{caff\text{-}free}$, and $CE_{RB}$). Table B illustrates the relationship between each product, demand group, and the four cross-elasticity coefficients ($CE_{diet}$, $CE_{reg}$, $CE_{caff\text{-}free}$, and $CE_{RB}$). The cross-elasticity coefficients are used generate cross-elasticity variables for each product. In Table B the "-" means the indicated cross-elasticity coefficient is not applicable to the indicated product. An "x" means the indicated cross-elasticity coefficient is applicable to the indicated product. For example, if product D (Regular soft drink) is examined, beginning with Table A, the equation for Relative Demand Group Equivalent Volume (for product A) is shown. This equation also yields the cross-elasticity coefficient ($CE_{reg}$) for the demand group regular soda. Referring now to Table B, the row for product D is consulted. There are "x's" for the coefficients which apply to a determination of a cross-elasticity variable for product D. Thus, cross-elasticity for product D is a function of cross-elasticity coefficients $CE_{diet}$, $CE_{caff\text{-}free}$, and $CE_{RB}$. Therefore, the cross-elasticity variable for product D includes cross-elasticity coefficients $CE_{diet}$, $CE_{caff\text{-}free}$, and $CE_{RB}$.

The calculated imputed variables and data are outputted from the imputed variable generator 304 to the coefficient estimator 308. Some of the imputed variables may also be provided to the financial model engine 108.

B. Coefficient Estimator

The coefficient estimator 308 uses the imputed variables and data to estimate coefficients, which may be used in an equation to predict demand. In one embodiment of the invention, sales for a demand group (S) is calculated and a market share (F) for a particular product is calculated, so that demand (D) for a particular product is estimated by D=S·F. A demand group is defined as a collection of highly substitutable products. In some embodiments, the imputed variables and equations for sales (S) of a demand group and market share (F) are as follows:

1. Modeling Framework

The econometric modeling engine relies on a mixed-model framework, simultaneously utilizing information across all stores and products in a client category, where a category is defined as a collection of substitutable or complementary products. The mixed model methodology is also referred to as "Bayesian Shrinkage" Modeling, because by combining data from various stores and/or products, one can "shrink" individual parameter estimates towards the average estimate, dampening the extreme values that would result if traditional regression were used. A basic rationale for this approach is as follows.

In developing product-level volume models for each store within a chain, one may be presented with a wide range of historical data in terms of modeling sufficiency. For some stores and/or products, the history will be quite rich, with many price changes and a variety of promotion patterns. For other stores and/or products, the history will be quite sparse, with very few price changes and little promotional activity. To maximize the stability of estimated model parameters, one might consider developing a single regression model across stores and/or products. This model might have stable parameter estimates; however, it would not fully leverage the store and/or product variability, and the resulting model would likely not predict well for a particular store and/or product. On the other hand, one might consider developing individual regression models for each store and/or product, to utilize the specific information contained in the data history. While these models might fit and predict well for the stores and/or products with substantial price variability, models would not be estimable for stores and/or products without a rich data history.

A mixed-model framework addresses the need for both highly predictive models and the existence of an estimable model for each store and product. In a mixed-effect model, information (in the form of data history) is leveraged across all stores and products, and a single cohesive model is built. Stores and products with little or no information in their data history default to an "average" (fixed-effect) model. Likewise, stores and products with a wealth of information in their data history will end up with unique parameter estimates tailored to their response pattern, via estimation of non-zero store and/or product-specific adjustment factors (random effects) which are added to the fixed-effect portion of the model.

2. Modeling Framework Terminology

The equivalent price of a product is defined as the price of a standardized unit of measure, which may be calculated based on the product description and the spread of sizes/counts that apply to that description. Each individual product price is divided by this standardized unit of measure to obtain the equivalent price.

A demand group is defined as a set of products that are substitutes or near substitutes for each other. A product can belong to only one demand group. A product category consists of one or more demand groups. For this example, attention is restricted to a single category consisting of multiple demand groups.

Both models:

Subscript i: Demand group (primary). A demand group is a collection of highly substitutable products.

Subscript j: Demand group (secondary). A secondary demand group is another demand group in the same category as the primary demand group, where a category is defined as a collection of substitutable or complementary products.

Subscript k: Product, where products are items with common UPC numbers.

Subscript t: Time period, which may be days, weeks, or hours.

Subscript B: Baseline, which is a state of product if there was no promotion.

Subscript n: Number of time periods away from current time period.

$\epsilon$: Error term for regression equations, with appropriate subscripts per context.

3. Stage 1 (Sales) Model a. Sales Model Multipliers (Data Values, or Covariates) and Dependent Variables $S_{i,t}$: The equivalent sales of demand group i in period t in store s in dollars. Equivalent sales may be defined as sales of equivalent units of products being compared.

$S_{Bi,t}$: The equivalent baseline sales of demand group i in store s in period t.

$\overline{S}_{i,t}$: The equivalent sales of demand group i in store s averaged over periods leading up to period t.

$R_{i,t}$: The equivalent revenue of demand group i in period t.

$R_{Bi,t}$: The equivalent baseline revenue of demand group i in period t, which would be baseline sales times the baseline price.

$\overline{R}_{i,t}$: The equivalent revenue of demand group i averaged over periods leading up to period t.

$P_{i,t}$: The equivalent price of demand group i at store s in time period t, calculated as total equivalent revenue of demand group i divided by total equivalent sales in the period ($S_{i,t}/R_{i,t}$), and where the equivalent price is the price of an equivalent unit, such as a price per ounce.

$\overline{P}_{i,t}$: The average equivalent price of demand group i in store s for time period t, calculated as average total equivalent revenue of demand group i divided by average total equivalent sales ($\overline{S}_{i,t}/\overline{R}_{i,t}$).

$\overline{P}_{i,t}$: The average competitor (e.g. a competing store in the area) equivalent price of demand group i in store s for time period t, calculated as average competitor total equivalent revenue of demand group i divided by average competitor total equivalent sales.

$M_{i,t}$: The promotion level for demand group i in store s in period t.

$X_{i,t}$: The seasonality index for demand group i in store s in period t.

$TS_t$: The total dollar sales for the entire store in period t, computed using historical data.

$\overline{TS}_t$: The total dollar sales for the region in period t, computed using historical data. A region would be a grouping of stores possibly in a certain geographical area.

b. Sales Model Factors (Parameters to be Estimated)

$\gamma_i$: The price elasticity factor for demand group i measured with respect to the deviations of the weighted average price of the demand group from the past weighted average price of the group. It measures the sensitivity of sales of equivalized units of the demand group with respect to the group price.

$\nu_i$: The promotion factor for demand group i. This factor measures the sensitivity of the equivalent sales of the demand group to the general promotion level of the group.

$\psi_i$: The seasonality factor for demand group i. This factor measures the sensitivity of the equivalent sales of the demand group to seasonality.

$\kappa_i$: The seasonality-price interaction factor that measures the interaction of weighted average price deviations and seasonality for demand group i. The seasonality and the group price may interact with each other in a nonlinear way. This factor measures a degree of nonlinearity.

$\delta_{i,n}$: The time lag factor for demand group i and delay of n weeks. The time lag factor measures the level of forward buying or stockpiling activity by customers. Note that this is the only factor that is estimated at the demand group level rather than the store-demand group level.

$\phi_{i,j}$: The cross elasticity factor for demand group i and demand group j. This factor measures how sales of a demand group are affected by the sales of other demand groups in the same category.

$\eta_{i,t}$: The competitive price factor for demand group i measured with respect to the difference between the weighted average price of the demand group within the store and outside competitors. This factor measures the effect of competitive activity on the sales of products in a given demand group.

$\pi_i$: The traffic factor for demand group i. Sales may be affected by the overall traffic through a store. This factor quantifies the relationship.

$\theta_i$: The day-of-week (DOW) effect for demand group i. Each day of a week could have a different sales pattern. This factor quantifies the relationship.

$K_i$: The constant (intercept) associated with demand group i.

c. The Sales Model is:

$$\ln\left(\frac{\hat{S}_{i,t}}{S_{Bi,t}}\right) = \hat{K}_i + \hat{\gamma}_i \frac{P_{i,t}}{\overline{P}_{i,t}} + \hat{v}_i M_{i,t} +$$

$$\hat{\psi}_i X_{i,t} + \hat{\kappa}_i X_{i,t} \frac{P_{i,t}}{\overline{P}_{i,t}} + \sum_{n=1}^{\tau} \hat{\delta}_{i,n} \frac{\sum_{r=t-mn}^{t-m(n-1)-1} S_{i,r}}{\sum_{r=t-mn}^{t-m(n-1)-1} \overline{S}_{i,r}} +$$

$$\sum_{j \neq i} \hat{\phi}_{i,j} \frac{\hat{S}_{j,t}}{\overline{S}_{j,t}} + \hat{\eta}_{i,t}\left(\frac{\overline{P}_{i,t} - \overline{\overline{P}}_{i,t}}{\overline{\overline{P}}_{i,t}}\right) + \hat{\pi}_i \frac{TS_t}{\overline{TS}_t} + \hat{\theta}_i \frac{S_{i,t-7}}{\overline{S}_{i,t-7}}$$

Equation 1

In the above model (Equation 1), the dependent variable, demand group equivalent sales, is indexed (divided) by baseline demand group equivalent sales to provide a type of normalization. This normalizing allows easier comparison within a demand group and between demand groups. If a reasonable approximation of baseline demand group sales cannot be imputed, the dependent variable may alternatively be indexed by demand group equivalent sales averaged over a specified number of time periods prior to the current one ($\overline{S}_{i,t}$).

In the time lag term, $\tau$ represents the number of "time buckets" preceding a time period that will be included in the model, and m represents the size of the "time bucket," in number of time periods.

Inclusion of several covariates (day-of-week, store traffic, within-market competitive pricing) is contingent upon the time dimension and scope of available client data. Therefore, if data is reported on a weekly basis, so that there is no data according to day of the week, the day of the week parameters will not be included.

d. Sales Model Unbiasing Factor

In regression calculations, returning to the original scale after a logarithmic transformation creates a bias. To correct for this bias, the Baskersville's method is used which consists of adding an unbiasing factor to the equation. This factor is the mean square error ($\hat{\sigma}^2$) of the sales model divided by 2.

The equation for predicting demand group sales is thus:

$$\left(\frac{\hat{S}_{i,t}}{S_{Bi,t}}\right) = \exp\left(\hat{K}_i + \hat{\gamma}_i \frac{P_{i,t}}{\overline{P}_{i,t}} + \hat{v}_i M_{i,t} + \hat{\psi}_i X_{i,t} + \right.$$

$$\hat{\kappa}_i X_{i,t} \frac{P_{i,t}}{\overline{P}_{i,t}} \sum_{n=1}^{\tau} \hat{\delta}_{i,n} \frac{\sum_{r=t-mn}^{t-m(n-1)-1} S_{i,r}}{\sum_{r=t-mn}^{t-m(n-1)-1} \overline{S}_{i,r}} + \sum_{j \neq i} \hat{\phi}_{i,j} \frac{\hat{S}_{j,t}}{\overline{S}_{j,t}} +$$

$$\left.\hat{\eta}_{i,t}\left(\frac{\overline{P}_{i,t} - \overline{\overline{P}}_{i,t}}{\overline{\overline{P}}_{i,t}}\right) + \hat{\pi}_i \frac{TS_t}{\overline{TS}_t} + \hat{\theta}_i \frac{S_{i,t-7}}{\overline{S}_{i,t-7}} + \frac{\hat{\sigma}^2}{2}\right)$$

Equation 2

4. Stage 2 (Share) Model a. Share Model Multipliers (Data Values, or Covariates) and Dependent Variables $F_{i,k,t}$: The fraction of demand group i equivalent sales comprised by product k in time period t (market share of product k).

$\overline{F}_{i,\bullet,t}$: The average fraction of demand group i equivalent sales with respect to time period t. To allow linear modeling of the regression equation, this data value is used to provide centering.

$P_{bi,k,t}$: The equivalent base price of product k in demand group i in time period t.

$\overline{P}_{Bi,(k),t}$ The average equivalent base price of all products other than product k in demand group i for time period t.

$P_{R\ Bi,k,t}$: The relative equivalent base price of product k in demand group i for time period $$\left(= \frac{P_{Bi,k,t}}{\overline{P}_{Bi,(k),t}}\right).$$

$\overline{P}_{R\ Bi,\bullet,t}$: The average relative equivalent base price in demand group i for time period t.

$M_{p,i,k,t}$: The level of promotion type p (kind of promotion) for product k in demand group i in time period t. There can be up to $n_p$ promotion factors estimated in the model.

$\overline{M}_{p,i,\bullet,t}$: The average level of promotion type p in demand group i for time period t.

b. Share Model Factors (Parameters to be Estimated)

$\rho_{i,k}$: The relative base price elasticity factor for product k in demand group i.

$\sigma_{p,i,k}$: The promotion factor p for product k in demand group i. There can be up to $n_p$ promotion factors estimated in the model.

$\chi_{i,k,n}$: The time lag factor for product k in demand group i and delay of n weeks.

$\Lambda_{i,k}$: The constant (intercept) associated with product k in demand group I.

The model for predicting product share (market share) is:

$$\hat{F}_{i,k,t} = \frac{\exp\left\{\hat{\Lambda}_{i,k} + \hat{\rho}_{i,k}(P_{Ri,k,t}) + \sum_{p=1}^{n_p} \hat{\sigma}_{p,i,k}(M_{p,i,k,t}) + \sum_{n=1}^{\tau} \hat{\chi}_{i,k,n} \sum_{r=t-mn}^{t-m(n-1)-1}(F_{i,k,r})\right\}}{\sum_{l \in Dem_i} \exp\left\{\hat{\Lambda}_{i,l} + \hat{\rho}_{i,l}(P_{Ri,l,t}) + \sum_{p=1}^{n_p} \hat{\sigma}_{p,i,l}(M_{p,i,l,t}) + \sum_{n=1}^{\tau} \hat{\chi}_{i,k,n} \sum_{r=t-mn}^{t-m(n-1)-1}(F_{i,l,r})\right\}}$$

Equation 3

This model calculates demand for a product divided by demand for the demand group of the product.

The product intercept $\Lambda_{i,k}$ is not individually estimated in the model. Instead, each product is characterized according to product attributes, such as brand, size group (small/medium/large), form, flavor, etc. .... A store-specific estimate of the effect corresponding to each attribute level effects is obtained, and each product intercept is then constructed by summing over the applicable attribute level estimates.

Thus, $$\hat{\Lambda}_{i,k} = \sum_{a=1}^{n_a} \sum_{b=1}^{n_{b(a)}} \hat{\xi}_{a_b} \cdot I_{k,a_b},$$

where $\xi_{a_b}$ is the effect of attribute a, level b, and $I_{k,a_b}$ is an indicator variable for product $$k, = \begin{cases} 1, & \text{if product has level } b \text{ of } a \\ 0, & \text{else} \end{cases}$$

The attribute values may be used to predict sales of new products with various attribute combinations.

5. Linearization of Multinomial Logistic Equation

The multinomial logistic function that defines the market share equations for each product is nonlinear but there exist standard techniques to transform it to a linear function instead, which may make modeling easier. An example of a transformation to a linear function is as follows:

In this section the store index is ignored.

For a particular time period t:

$$\text{Let } F_{i,k} = \frac{\exp\left(\alpha_{i,k} + \sum_{p=1}^{P} \beta_p \cdot X_{pi,k} + \varepsilon_{i,k}\right)}{\sum_{j=1}^{k} \exp\left(\alpha_{i,j} + \sum_{p=1}^{P} \beta_p \cdot X_{pi,j} + \varepsilon_{i,j}\right)},$$

where $\alpha_i$ is the intercept for demand group i, $\beta$ are the covariates, and P is the number of covariates in the share model $$\log(F_{i,k}) = \alpha_{i,k} + \sum_{p=1}^{P} \beta_p \cdot X_{pi,k} + \varepsilon_{i,k} - \log\left(\sum_{j=1}^{k} \exp\left(\alpha_{i,j} + \sum_{p=1}^{P} \beta_p \cdot X_{pi,j} + \varepsilon_{i,j}\right)\right)$$

$$\text{Let } \log(\tilde{F}_i) = \frac{1}{k}\sum_{j=1}^{k} \log(F_{i,k}) =$$

$$\overline{\alpha}_i + \sum_{p=1}^{P} \beta_p \cdot \overline{X}_{pi} + \overline{\varepsilon}_i - \log\left(\sum_{j=1}^{k} \exp\left(\alpha_{i,j} + \sum_{p=1}^{P} \beta_p \cdot X_{pi,j} + \varepsilon_{i,j}\right)\right)$$

Thus, $\log\left(\frac{F_{i,k}}{\tilde{F}_i}\right) = \alpha_{i,k} + \sum_{p=1}^{P} \beta_p \cdot X_{pi,k} + \varepsilon_i -$ $$\log\left(\sum_{j=1}^{k} \exp\left(\alpha_{i,j} + \sum_{p=1}^{P} \beta_p \cdot X_{pi,j} + \varepsilon_{i,j}\right)\right) - \overline{\alpha}_i -$$

$$\sum_{p=1}^{P} \beta_p \cdot \overline{X}_{pi} - \overline{\varepsilon}_i + \log\left(\sum_{j=1}^{k} \exp\left(\alpha_{i,j} + \sum_{p=1}^{P} \beta_p \cdot X_{pi,j} + \varepsilon_{i,j}\right)\right) =$$

$$(\alpha_{i,k} - \overline{\alpha}_i) + \sum_{p=1}^{P} \beta_p(X_{pi,k} - \overline{X}_{pi}) + (\varepsilon_{i,j} - \overline{\varepsilon}_i)$$

To model share in a linear framework, we simply center all covariates and model $\log(F_{i,k})-\log(\tilde{F}_i)$, where $\tilde{F}_i$ is geometric mean of $F_{i,k}$:

$$\log(F_{i,k,t}) - \log(\tilde{F}_{i,\cdot,t}) = \Lambda_{i,k,t} + \rho_{i,k}(P_{Ri,k,t} - \overline{P}_{Ri,\cdot,t}) +$$

$$\sum_{p=1}^{n_p} \sigma_{p,i,k}(M_{p,i,k,t} - \overline{M}_{p,i,\cdot,t}) + \sum_{n=1}^{\tau} \chi_{i,k,n} \sum_{r=t-mn}^{t-m(n-1)-1}(F_{i,k,r} - \overline{F}_{i,\cdot,r})$$

C. Combined (Product Sales) Model

The model for predicting sales for product k in demand group i in time period t is thus given by:

$\hat{D}_{i,k,t} = \hat{F}_{i,k,t}\hat{S}_{i,t}$

III. Financial Model Engine

Figure 5:
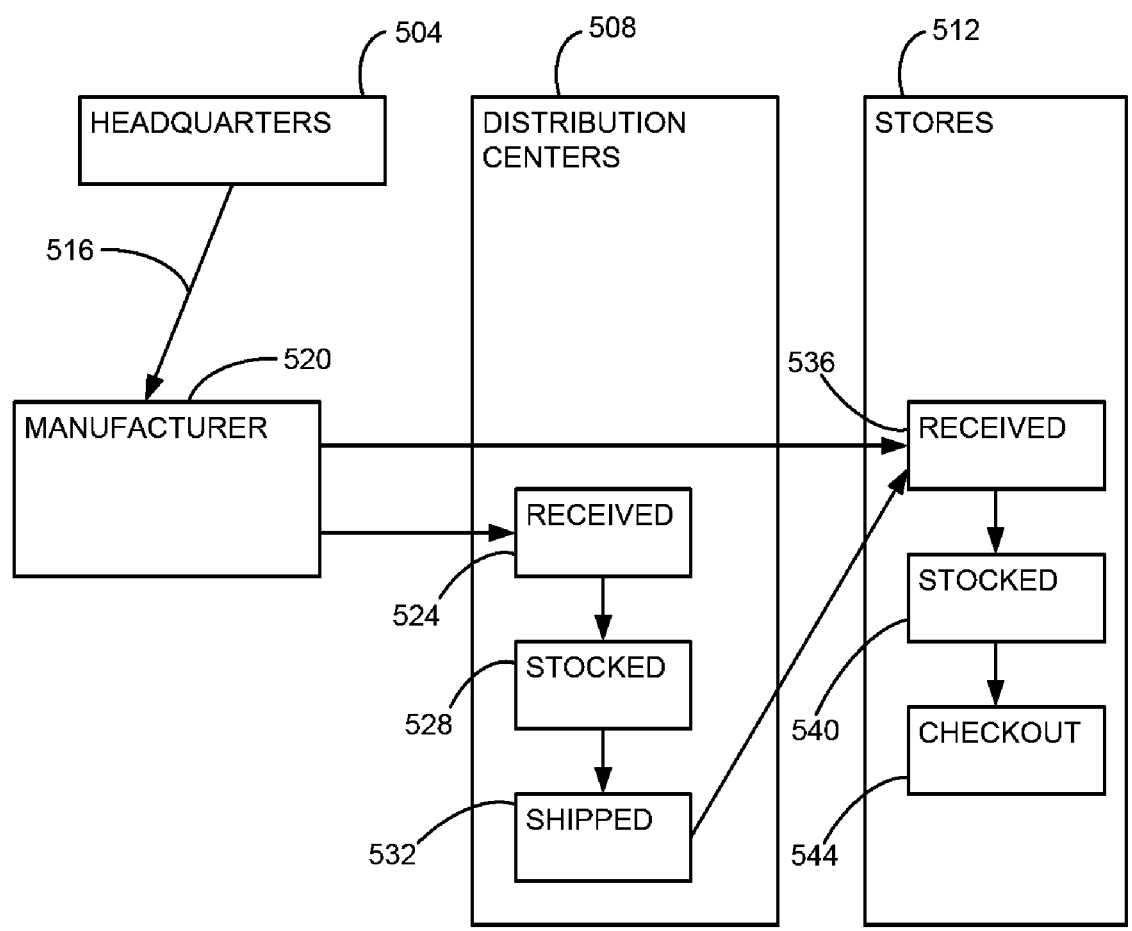
FIG. 5 is a block diagram to illustrate some of the transaction costs that occur in retail businesses of a chain of stores.
Figure 6:
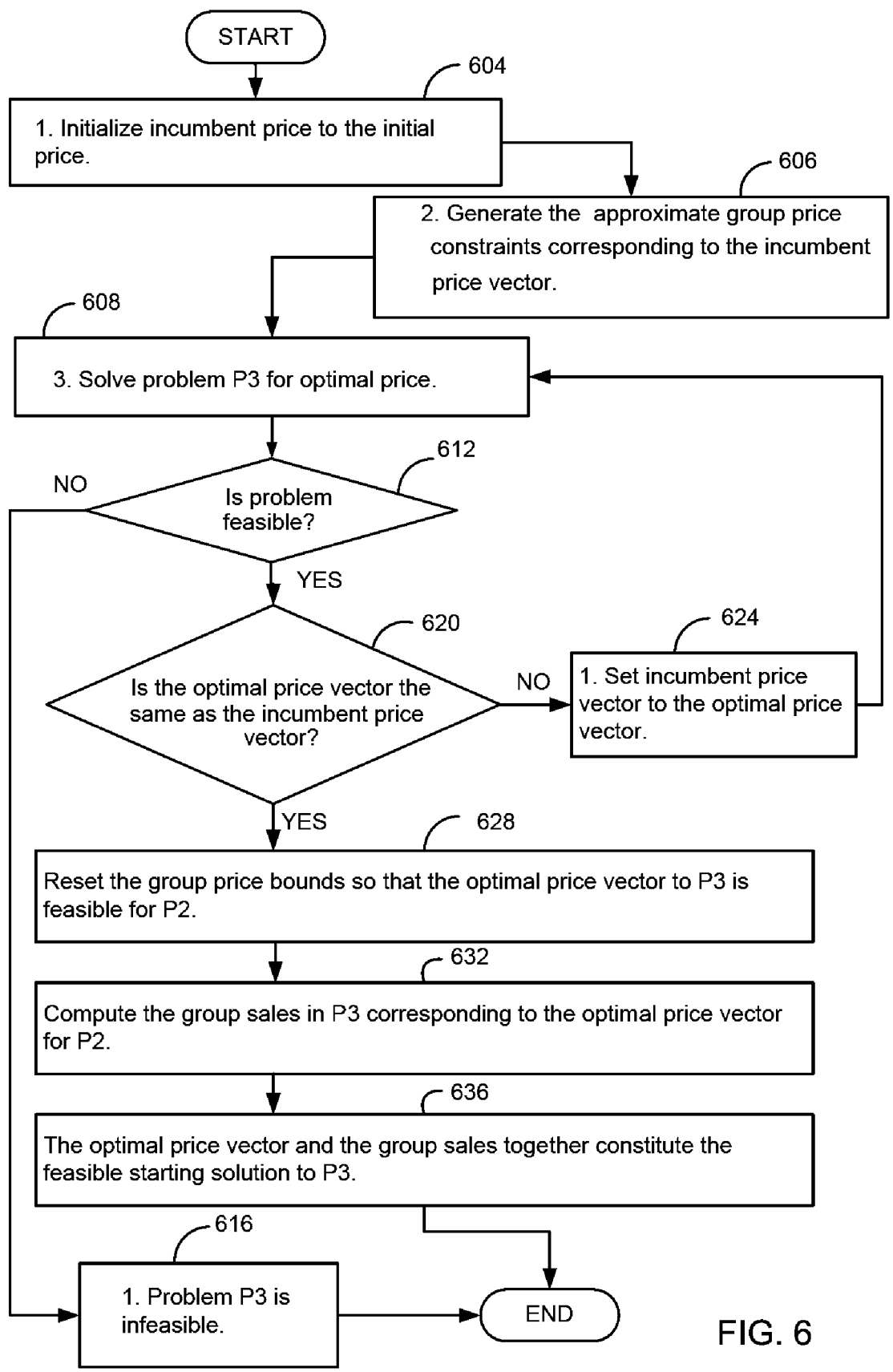
FIG. 6 is a flow chart of the preferred embodiment of the invention for providing an initial feasible solution for implementing embodiments of the present invention.

The financial model engine 108 receives data 132 from the stores 124 and may receive imputed variables (such as baseline sales and baseline prices) and data from the econometric engine 104 to calculate fixed and variable costs for the sale of each item. To facilitate understanding, FIG. 5 is a block diagram to illustrate some of the transaction costs that occur in retail businesses of a chain of stores. The chain of stores may have a headquarters 504, distribution centers 508, and stores 512. The headquarters 504 may place an order 516 to a manufacturer 520 for goods supplied by the manufacturer 520, which generates an order placement cost. The manufacturer 520 may ship the goods to one of the distribution centers 508. The receiving of the goods by the distribution center 508 generates a receiving cost 524, a cost for stocking the goods 528, and a cost for shipping the goods 532 to one of the stores 512. The store 512 receives the goods from one of the distribution centers 508 or from the manufacturer 520, which generates a receiving cost 536 and a cost for stocking the goods 540. When a customer purchases the item, the stores 512 incur a check-out cost 544. With the large number of retail chains, different purchasing and delivery processes may be used. Even within a single chain, different manufacturers may provide different invoicing and delivery procedures and costing system, which may be different than the processes illustrated in FIG. 5.

The financial model engine 108 should be flexible enough to provide a cost model for these different procedures. These different costs may have variable cost components where the cost of an item is a function of the amount of sales of the item and fixed cost components where the cost of an item is not a function of the amount of sales of the item. The financial model engine 108 uses these fixed and variable costs to determine $C_{s,i,k,t}$, where $C_{s,i,k,t}$ is a cost for a particular product (k) given a store (s), demand group (i), and a day (t). The financial model engine 108 uses industry data to provide standard estimates. For example, instead of measuring how long it takes to stock a box of an item, an industry data may be used to estimate this time. The standard estimates helps to reduce the amount of data that needs to be collected. In one embodiment of the invention, the stores may only need to supply labor costs of the stores and distribution centers, cost of capital, size of an item, and number of items in a case to allow a cost modeling. Likewise, the preferred embodiment may infer the amount of shelf-space an item utilizes from the cubic feet of the item, the volume of sales of the item, and how often the store is replenished with the item. By using these estimations, costs may be more easily calculated on a store level, instead of being averaged over all of the stores. This is because if large amounts of data are measured by hand, measuring such data for each store would be difficult. The tailoring of costs per store allows the maximization of profits for each store.

A detailed disclosure of cost modeling by the financial engine may be found on pages 75 to 95 of U.S. application Ser. No. 09/741,956 filed on Dec. 20, 2000, entitled "Econometric Engine", which is hereby fully incorporated by reference.

The Activity-based costing module computes variable and fixed costs for products at specific store locations. The ABC modeling component introduces the Distribution Center entity to track costing activities at retailers' distribution centers and regional stores.

The Fixed cost for each product given a store, demand group, and day, may be computed from a combination of costs for location and space per store.

Where $C_{s,i,k,t}$ is a cost for a particular product (k) given a store (s), demand group (i), and a day (t), $C_{s,i,k,t}$ may be calculated as:

$$C_{s,i,k,t} = \text{ProdLocVariableCost} + \text{ProdLocFixedCost}.$$

IV. Optimization Engine and Support Tool
A. Overview

Figure 4:
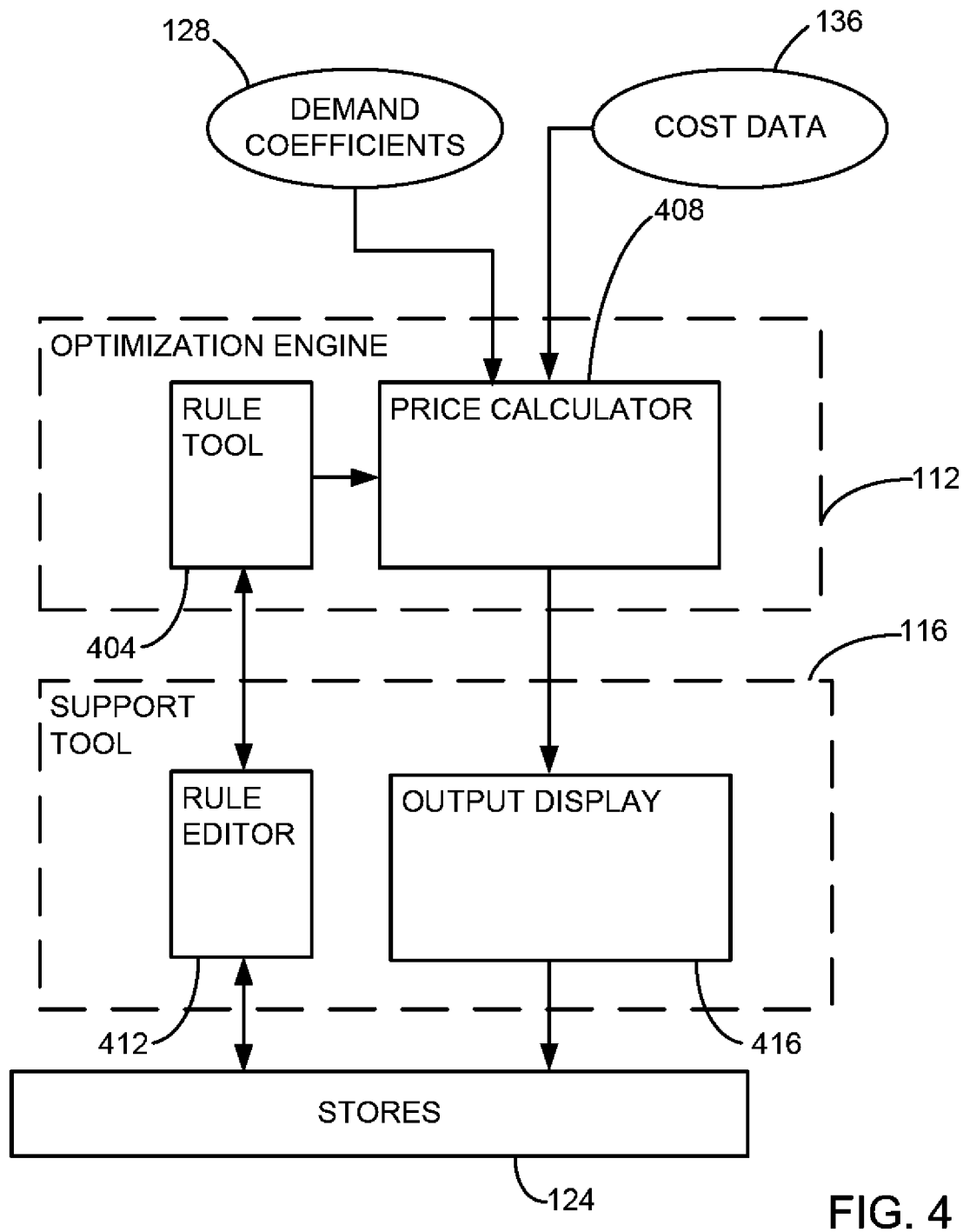
FIG. 4 is a more detailed schematic view of the optimization engine and support tool disclosed in FIG. 1.

FIG. 4 is a more detailed schematic view of the optimization engine 112 and the support tool 116. The optimization engine 112 comprises a rule tool 404 and a price calculator 408. The support tool 116 comprises a rule editor 412 and an output display 416.

In operation, the client (stores 124) may access the rule editor 412 of the support tool 116 and provides client defined rule parameters (step 228). If a client does not set a parameter for a particular rule, a default value is used. Some of the rule parameters set by the client may be constraints to the overall weighted price advance or decline, branding price rules, size pricing rules, unit pricing rules, line pricing rules, and cluster pricing rules. These rules will be discussed in more detail regarding the preferred embodiment of the invention. The client defined parameters for these rules are provided to the rule tool 404 of the optimization engine 112 from the rule editor 412 of the support tool 116. Within the rule tool 404, there may be other rules, which are not client defined, such as a group sales equation rule. The rule parameters are outputted from the rule tool 404 to the price calculator 408. The demand coefficients 128 and cost data 136 are also inputted into the price calculator 408. The client may also provide to the price calculator 408 through the support tool 116 a desired optimization scenario rules. Some examples of scenarios may be to optimize prices to provide the optimum profit, set one promotional price and the optimization of all remaining prices to optimize profit, or optimized prices to provide a specified volume of sales for a designated product and to optimize price. The price calculator 408 then calculates optimized prices. The price calculator 408 outputs the optimized prices to the output display 416 of the support tool 116, which allows the stores 124 to receive the optimized pricing (step 232). In preferred embodiments, the rules and optimizing algorithm are as follows:

B. An Embodiment of Optimization Module

The optimization engine uses the group sales equation and the market share equation previously defined in the section on the econometric engine to predict group sales and product market share, respectively. These two are then combined to predict product sales at the store level. The three equations are produced here:

1. First Stage Prediction

The predictive model for the group sales is:

$$\ln\left(\frac{\hat{S}_{s,i,t}}{\hat{S}_{s,Bi,t}}\right) = \hat{K}_{s,i} + \hat{\gamma}_{s,i}\frac{P_{s,i,t}}{\overline{P}_{s,i,t}} + \hat{v}_{s,i}M_{s,i,t} +$$

$$\hat{\Psi}_{s,i}X_{s,i,t} + \hat{\kappa}_{s,i}X_{s,i,t}\frac{P_{s,i,t}}{\overline{P}_{s,i,t}} + \sum_{n=1}^{\tau}\hat{\delta}_{i,n}\frac{\sum_{r=t-mn}^{t-m(n-1)-1}S_{s,i,r}}{\sum_{r=t-mn}^{t-m(n-1)-1}\overline{S}_{s,i,r}} +$$

$$\sum_{j\neq i}\hat{\phi}_{s,i,j}\frac{\hat{S}_{s,j,t}}{\overline{S}_{s,j,t}} + \hat{\eta}_{s,i,t}\left(\frac{\overline{P}_{s,i,t} - \overline{\overline{P}}_{s,i,t}}{\overline{\overline{P}}_{s,i,t}}\right) + \hat{\pi}_{s,i}\frac{TS_{s,t}}{\overline{TS}_{s,t}} + \hat{\theta}_{s,i}\frac{S_{s,i,t-7}}{\overline{S}_{s,i,t-7}}$$

2. Second Stage Prediction

The predictive model for estimating the fraction of group sales due to a product is:

$$\hat{F}_{s,i,k,t} = \frac{\exp\left\{\hat{\Lambda}_{s,i,k} + \hat{\rho}_{s,i,k}(P_{s,Ri,k,t}) + \sum_{p=1}^{n_p}\hat{\sigma}_{s,p,i,k}(M_{s,p,i,k,t}) + \sum_{n=1}^{\tau}\hat{\chi}_{s,i,k,n}\sum_{r=t-mn}^{t-m(n-1)-1}(F_{s,i,k,r})\right\}}{\sum_{l\in Dem_i}\exp\left\{\hat{\Lambda}_{s,i,l} + \hat{\rho}_{s,i,l}(P_{s,Ri,l,t}) + \sum_{p=1}^{n_p}\hat{\sigma}_{s,p,i,l}(M_{s,p,i,l,t}) + \sum_{n=1}^{\tau}\hat{\chi}_{s,i,k,n}\sum_{r=t-mn}^{t-m(n-1)-1}(F_{s,i,l,r})\right\}}$$

The predictive model for demand for a given product is then given by $$\hat{D}_{s,i,k,t} = \hat{F}_{s,i,k,t}\hat{S}_{s,i,t}$$

3. The Optimization Model

Regression models and the predictive equations derived from the above equations are used to construct the optimization model.

The objective is to maximize profit:

$$\sum_{i \in G} \sum_{k \in Dem_i} \hat{D}_{s,i,k,t}(P_{s,i,k,t} - C_{s,i,k,t}) = \sum_{i \in G} \sum_{k \in Dem_i} \hat{F}_{s,i,k,t} \hat{S}_{s,i,t}(P_{s,i,k,t} - C_{s,i,k,t})$$

and the constraints are:
a. Obey the regression equations governing $\hat{S}_{i,t} \forall i,k$ $$\ln\left(\frac{\hat{S}_{s,i,t}}{S_{s,Bi,t}}\right) = \hat{K}_{s,i} + \hat{\gamma}_{s,i}\frac{P_{s,i,t}}{\overline{P}_{s,i,t}} + \hat{v}_{s,i}M_{s,i,t} +$$

$$\hat{\psi}_{s,i}X_{s,i,t} + \hat{\kappa}_{s,i}X_{s,i,t}\frac{P_{s,i,t}}{\overline{P}_{s,i,t}} + \sum_{n=1}^{\tau}\hat{\delta}_{i,n}\frac{\sum_{r=t-mn}^{t-m(n-1)-1} S_{s,i,r}}{\sum_{r=t-mn}^{t-m(n-1)-1} \overline{S}_{s,i,r}} +$$

$$\sum_{j \neq i}\hat{\phi}_{s,i,j}\frac{\hat{S}_{s,j,t}}{\overline{S}_{s,j,t}} + \hat{\eta}_{s,i,t}\left(\frac{\overline{P}_{s,i,t} - \overline{\overline{P}}_{s,i,t}}{\overline{\overline{P}}_{s,i,t}}\right) + \hat{\pi}_{s,i}\frac{TS_{s,t}}{\overline{TS}_{s,t}} + \hat{\theta}_{s,i}\frac{S_{s,i,t-7}}{\overline{S}_{s,i,t-7}}$$

b. Obey the market share equations $$\hat{F}_{s,i,k,t} = \frac{\exp\left\{\hat{\Lambda}_{s,i,k} + \hat{\rho}_{s,i,k}(P_{s,Ri,k,t}) + \sum_{p=1}^{n_p} \hat{\sigma}_{s,p,i,k}(M_{s,p,i,k,t}) + \sum_{n=1}^{\tau} \hat{\lambda}_{s,i,k,n} \sum_{r=t-mn}^{t-m(n-1)-1}(F_{s,i,k,r})\right\}}{\sum_{l \in Dem_i} \exp\left\{\hat{\Lambda}_{s,i,l} + \hat{\rho}_{s,i,l}(P_{s,Ri,l,t}) + \sum_{p=1}^{n_p} \hat{\sigma}_{s,p,i,l}(M_{s,p,i,l,t}) + \sum_{n=1}^{\tau} \hat{\lambda}_{s,i,k,n} \sum_{r=t-mn}^{t-m(n-1)-1}(F_{s,i,l,r})\right\}}$$

c. Constrain price changes to be within a given range of current prices.

$$PMIN_{s,i,k,t} \leq P_{s,i,k,t} \leq PMAX_{s,i,k,t}$$

Further disclosure of the optimization equations may be found on pages 100-115 of U.S. application Ser. No. 09/741,956 filed on Dec. 20, 2000, entitled "Econometric Engine", which is hereby fully incorporated by reference.

Examples of the optimization of products may be found on pages 118-122 of U.S. application Ser. No. 09/741,956 filed on Dec. 20, 2000, entitled "Econometric Engine", which is hereby fully incorporated by reference.

Figure 8:
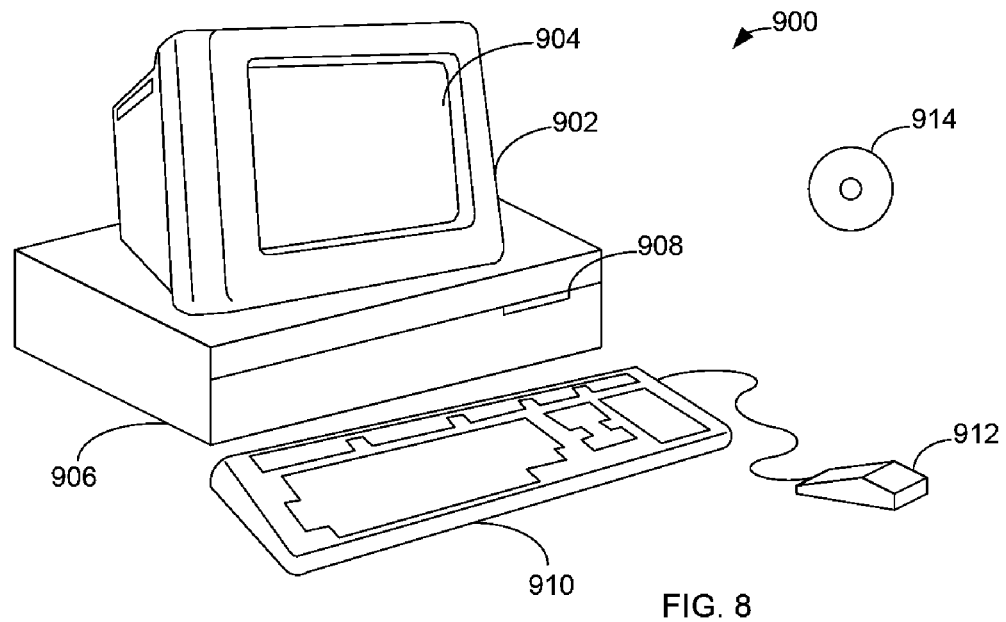
FIGS. 8 and 9 illustrate a computer system, which forms part of a computer network and is suitable for implementing embodiments of the present invention.
Figure 9:
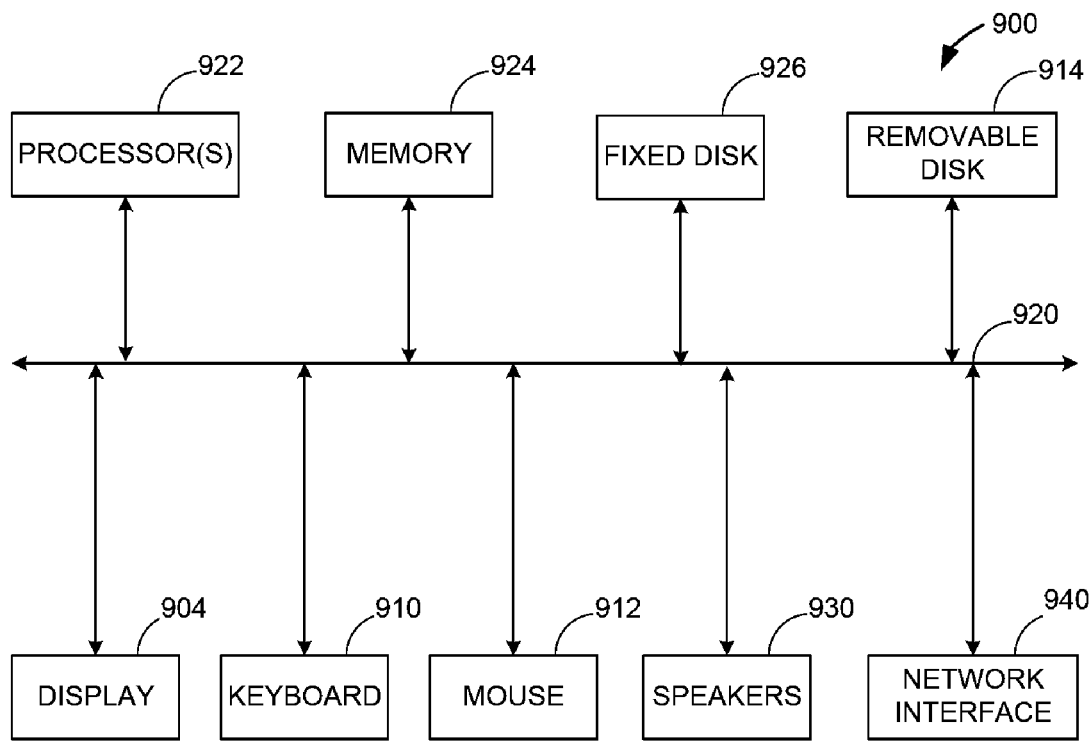

FIGS. 8 and 9 illustrate a computer system 900, which forms part of the network 10 and is suitable for implementing embodiments of the present invention. FIG. 8 shows one possible physical form of the computer system. Of course, the computer system may have many physical forms ranging from an integrated circuit, a printed circuit board, and a small handheld device up to a huge super computer. Computer system 900 includes a monitor 902, a display 904, a housing 906, a disk drive 908, a keyboard 910, and a mouse 912. Disk 914 is a computer-readable medium used to transfer data to and from computer system 900.

FIG. 9 is an example of a block diagram for computer system 900. Attached to system bus 920 are a wide variety of subsystems. Processor(s) 922 (also referred to as central processing units, or CPUs) are coupled to storage devices, including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data, and the like and is typically a secondary storage medium (such as a hard disk) that is slower than primary storage. It will be appreciated that the information retained within fixed disk 926 may, in appropriate cases, be incorporated in standard fashion as virtual memory in memory 924. Removable disk 914 may take the form of any of the computer-readable media described below.

CPU 922 is also coupled to a variety of input/output devices, such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Figure 7:
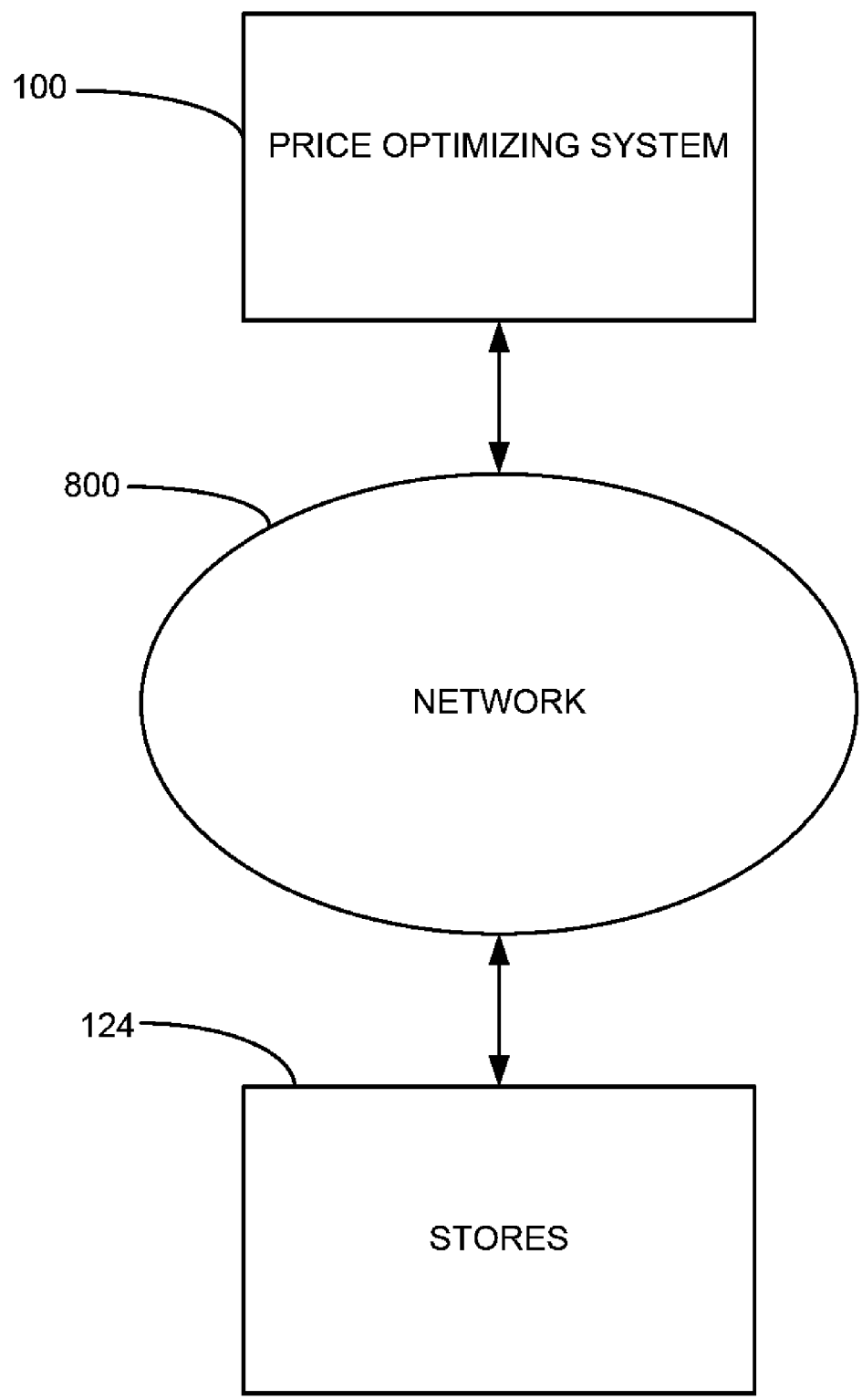
FIG. 7 is a schematic illustration of an embodiment of the invention that functions over a computer network in accordance with one embodiment of the present invention.

FIG. 7 is a schematic illustration of an embodiment of the invention that functions over a computer network 800. The network 800 may be a local area network (LAN) or a wide area network (WAN). An example of a LAN is a private network used by a mid-sized company with a building complex. Publicly accessible WANs include the Internet, cellular telephone network, satellite systems and plain-old-telephone systems (POTS). Examples of private WANs include those used by multi-national corporations for their internal information system needs. The network 800 may also be a combination of private and/or public LANs and/or WANs. In such an embodiment the price optimizing and MDA system 100 is connected to the network 800. The stores 124 are also connected to the network 800. The stores 124 are able to bi-directionally communicate with the price optimizing and MDA system 100 over the network 800.

VI. Merchandising Decomposition Analysis System

This invention relates generally to Merchandising Decomposition Analysis (MDA) system and method to provide fast and efficient analysis of benefits for price optimization systems. As noted, such benefits analysis is useful for the planning of future business goals, as well as providing assurance that the price optimization is performing acceptably.

In Merchandising Decomposition Analysis uses historical sales data as found in Point-Of-Sales (POS) data. The causalities in this POS data, such as pricing and promotion, are inputted into the models to generate back-casts of volume, revenue, and profit. The model, consisting of the coefficients and the imputed terms calculated during the modeling process, read from the optimization database, are utilized to set up the model's forecasting equations. In some embodiments, at the time that the Merchandising Decomposition Analysis is run, the model for the given category may have already been estimated. The causal information in the Point-Of-Sales data, which include the prices and various promotions, are inputted into these model equations to yield the back-casts of volume, revenue, and profit.

In some alternate embodiments, causalities, such as pricing and promotions, are compared to the historical data by a modeling farm to yield coefficients for model generation. Then the causal information in the Point-Of-Sales data, which include the prices and various promotions, are inputted into these model equations to yield the back-casts of volume, revenue, and profit.

Such back-casts may be compared to actual historical data for accuracy. Back-casts may be performed to attribute for a multitude of causal factors, or contributing effects. These causal factors, or effects, may be analyzed individually, thereby providing benefits analysis that accurately reflects benefit attribution to each effect.

Benefits analysis by Merchandising Decomposition Analysis may provide important information on the success of promotional activities and business decision feedback. Such information may be useful for future business decisions and for investor relations. Additionally, an accurate and efficient Merchandising Decomposition Analysis system provides validation of the optimization.

Figure 21:
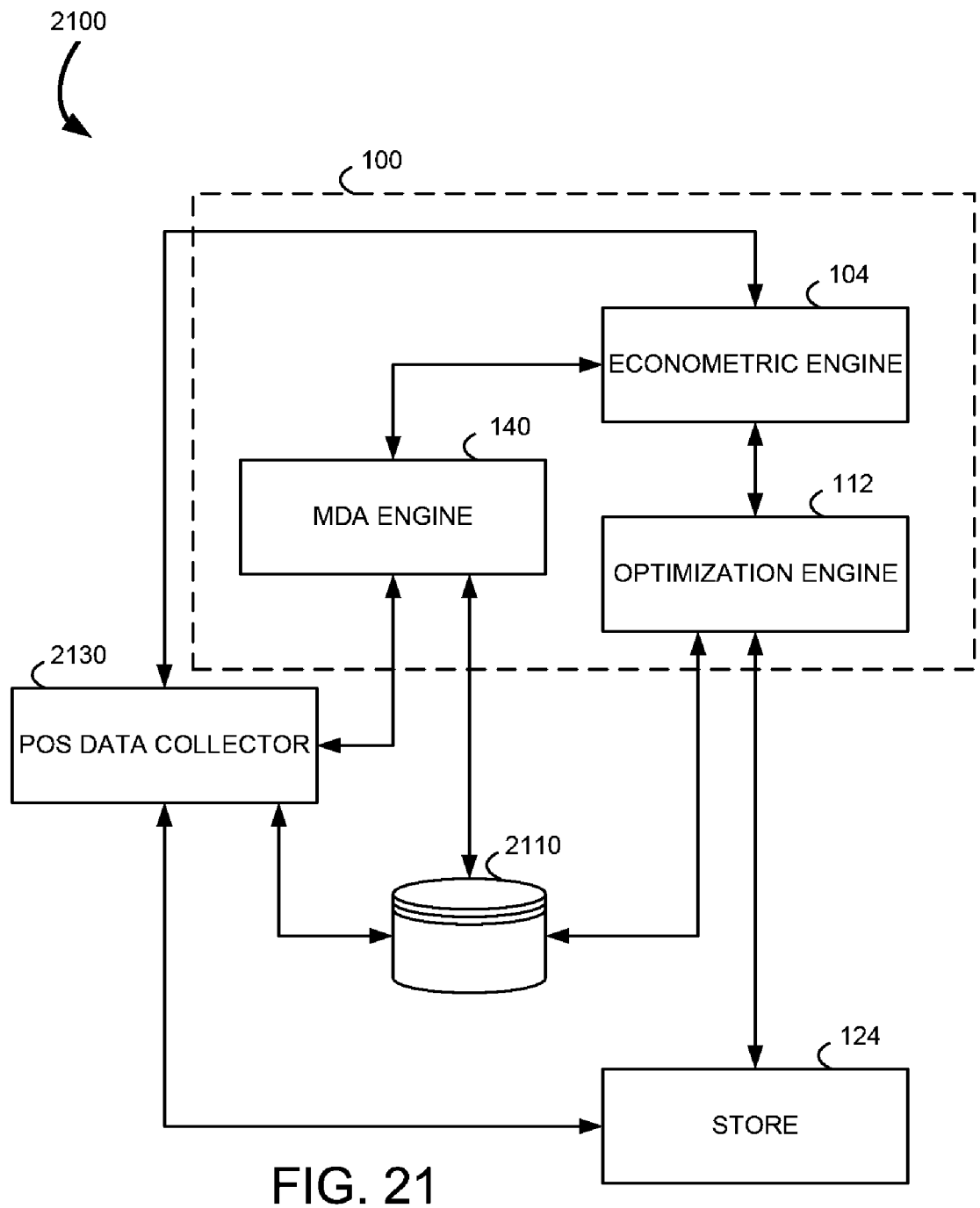
FIG. 21 shows a logical block diagram of the merchandising decomposition analysis system in accordance with one embodiment of the present invention.

FIG. 21 shows a logical block diagram of the Merchandising Decomposition Analysis System in accordance with one embodiment of the present invention, shown generally at 2100. Here the Price Optimizing and MDA System 100 is shown as including the Econometric Engine 104, Optimization Engine 112 and MDA Engine 140. It should be noted that the illustration provided at FIG. 21 is intended to provide the required components of the Merchandising Decomposition Analysis. It is intended that additional components may be included within the Price Optimizing and MDA System 100 as is desired for additional functionality. For example, in some embodiments, the Financial Model Engine 108 may also exist in the Price Optimizing and MDA System 100 to provide cost models to the MDA Engine 140.

As discussed above, the Optimization Engine 112 optimizes prices and provides the Store 124 with the preferred prices. In some embodiments, the Store 124 includes a POS Data Collector 2130. Alternatively, POS Data Collector 2130 may be an external service provided to the Store 124. Often POS Data Collector 2130 may be incorporated into cash register devices for automated Point-Of-Sales (POS) data collection. POS Data Collector 2130 provides the gathered data to a Database 2110, the Econometric Engine 104 and the MDA Engine 140.

In some embodiments the Database 2110 is external to the Price Optimizing and MDA System 100, such as when the Database 2110 is internal to the Store 124. In other embodiments, the Database 2110 may be a central database incorporated within the Price Optimizing and MDA System 100. Database 2110 may compile current point-of-sales data as well as historical point-of-sales data. Data from the Database 2110 may be utilized by the MDA Engine 140 for benefits analysis, and by the Optimization Engine 112 for optimization refinement.

MDA Engine 140 provides the Merchandising Decomposition Analysis by combining point-of-sales data from the POS Data Collector 2130, historical point-of-sales data from the Database 2110 and econometric data from the Econometric Engine 104.

Figure 22:
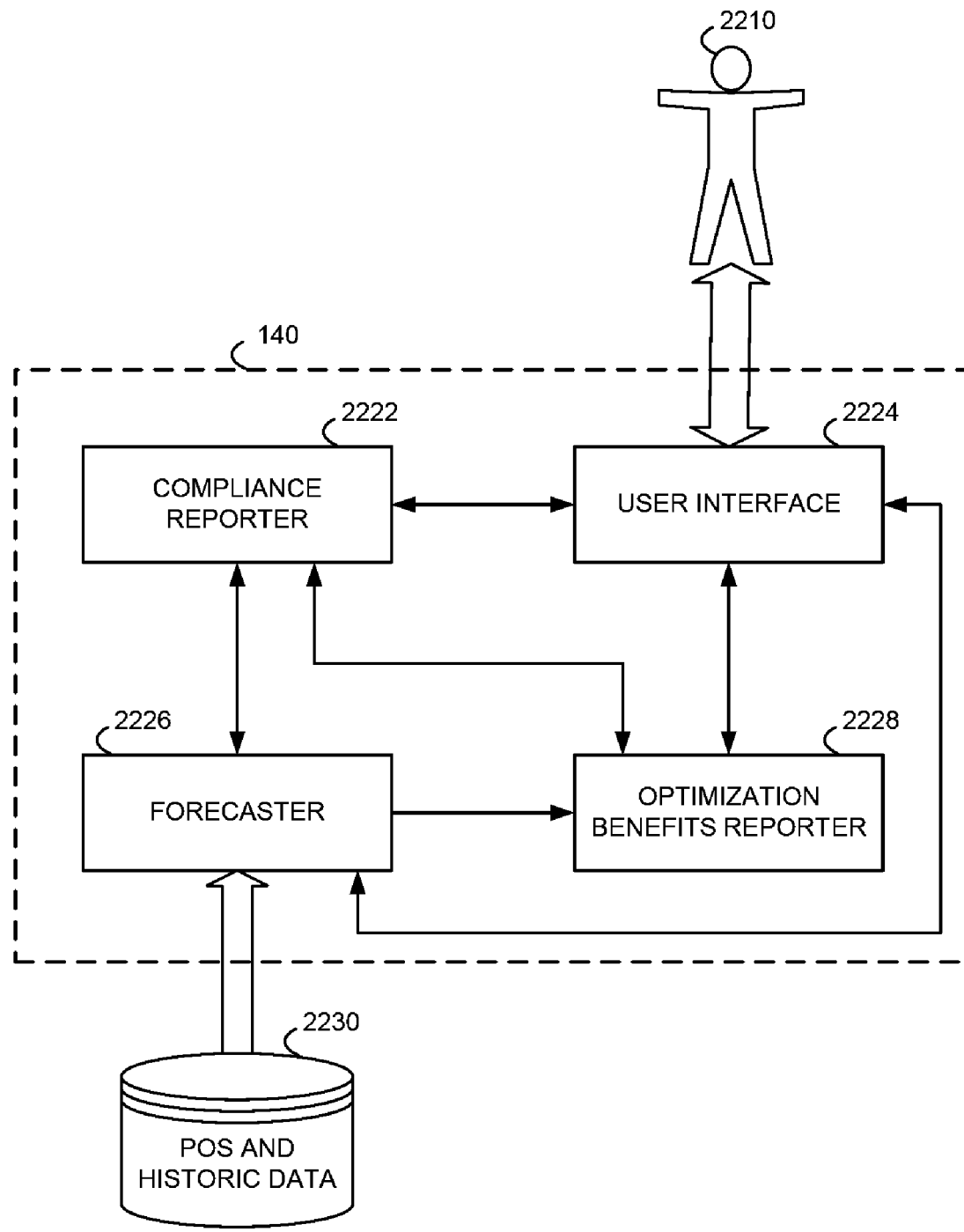
FIG. 22 shows a logical block diagram of the merchandising decomposition analysis engine of FIG. 21.

FIG. 22 shows a logical block diagram of the MDA Engine 140. In some embodiments, MDA Engine 140 includes a Compliance Reporter 2222, User Interface 2224, Forecaster 2226 and Optimization Benefits Reporter 2228. POS and Historic Data 2230 from the POS Data Collector 2130 and Database 2110 are input to the Forecaster 2226. Forecaster 2226 forecasts the back-cast of the sales data. Forecaster 2226 couples to the User Interface 2224, Optimization Benefits Reporter 2228 and Compliance Reporter 2222.

The Compliance Reporter 2222 couples to the User Interface 2224, Forecaster 2226 and Optimization Benefits Reporter 2228. Compliance Reporter 2222 reports the Store 124 compliance to the optimized prices generated by the Optimization Engine 112. Compliance is computed by comparing POS and Historic Data 2230 to the optimized prices generated by the Optimization Engine 112 that were sent to Store 124 for implementation.

Optimization Benefits Reporter 2228 couples to the Compliance Reporter 2222, User Interface 2224 and Forecaster 2226. The Optimization Benefits Reporter 2228 generates reports from the Compliance Reporter 2222 and Forecaster 2226 for usage by the User Interface 2224.

User Interface 2224 couples to the Compliance Reporter 2222, Forecaster 2226 and Optimization Benefits Reporter 2228. User Interface 2224 additionally provides communication to the User 2210. User 2210 may be a manager or executive of Store 124, an investor, a consultant, or any individual with appropriate authority that would benefit from optimization benefits reports. Communication between the User Interface 2224 and the User 2210 may be reciprocal in nature. User Interface 2224 provides benefit data to the User 2210, while User 2210 may provide specific analysis criteria, and "what if" scenarios to the User Interface 2224. Such interactivity of the between the User Interface 2224 and User 2210 enables the MDA Engine 140 to be a versatile tool, capable of complex data analysis.

Figure 23:
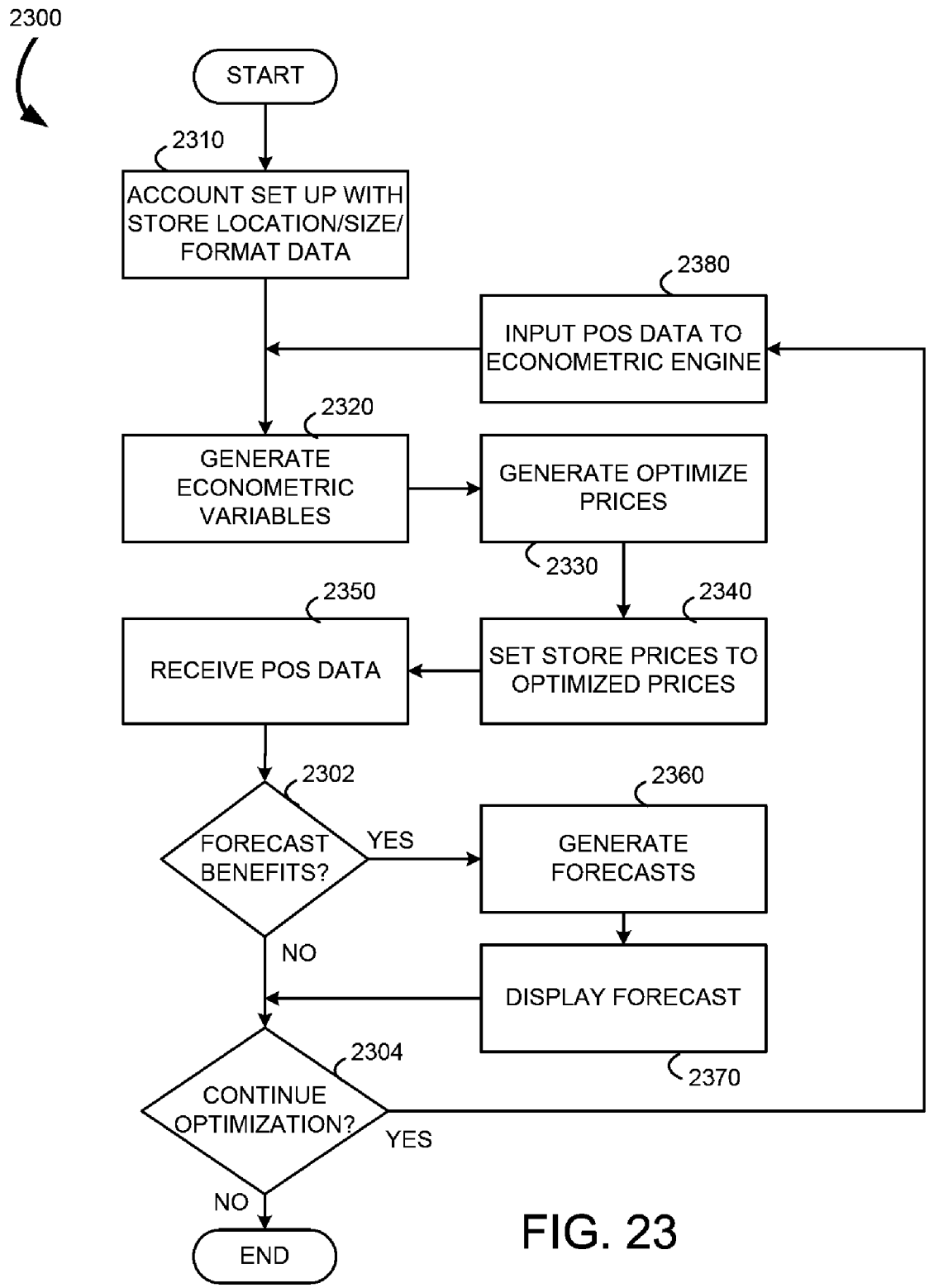
FIG. 23 shows a flow chart illustrating the merchandising decomposition analysis in accordance with one embodiment of the present invention.

FIG. 23 shows a flow chart illustrating the merchandising decomposition analysis shown generally at 2300. The process begins at step 2310 where an account is established including data on Store 124 size, format and location. Such data may be valuable in model generation by the Econometric Engine 104, and for the generation of optimized pricing.

Then, at step 2320, econometric variables are generated by the Econometric Engine 104. At step 2330 prices are optimized for by the Optimization Engine 112. At step 2340 the Store 124 implements the optimized pricing. Steps 2310 to 2340 may all be preformed in a manner consistent with the optimization methods outlined above. However, it should be noted that Merchandising Decomposition Analysis may be performed on any system of product price setting. Thus, steps 2320, 2330 and 2340 are intended to be generic in nature to incorporate a variety of price setting methods.

At step 2350 point-of-sales data is received by the MDA Engine 140 from the POS Data Collector 2130. In some embodiments, the benefits analysis requires a time differential so that point-of-sales data reflects the implementation of the optimized pricing.

At step 2302 an inquiry is made as to whether a benefits forecast is desired. If benefits forecast is desired then the process proceeds to step 2360 where the forecast is generated. Forecast generation is performed by the Forecaster 2226, Compliance Reporter 2222 and Optimization Benefits Reporter 2228 of the MDA Engine 140. Then at step 2370 the forecast is displayed by the User Interface 2224 to the User 2210. The process then proceeds to step 2304 where an inquiry is made whether to continue the pricing optimization.

Else, if at step 2302 benefits forecasting is not desired then the process then proceeds to step 2304 where an inquiry is made whether to continue the pricing optimization. If at step 2304 continued optimization is desired the process may proceed to step 2380 where point-of-sales data is inputted to the Econometric Engine 104 for fine-tuning of the optimization process. Additionally, in some embodiments, the forecasts, if generated, may additionally be inputted to the Econometric Engine 104 for additional tuning of the optimization process.

Otherwise, if at step 2304 continued optimization is not desired the process may then end.

Figure 24:
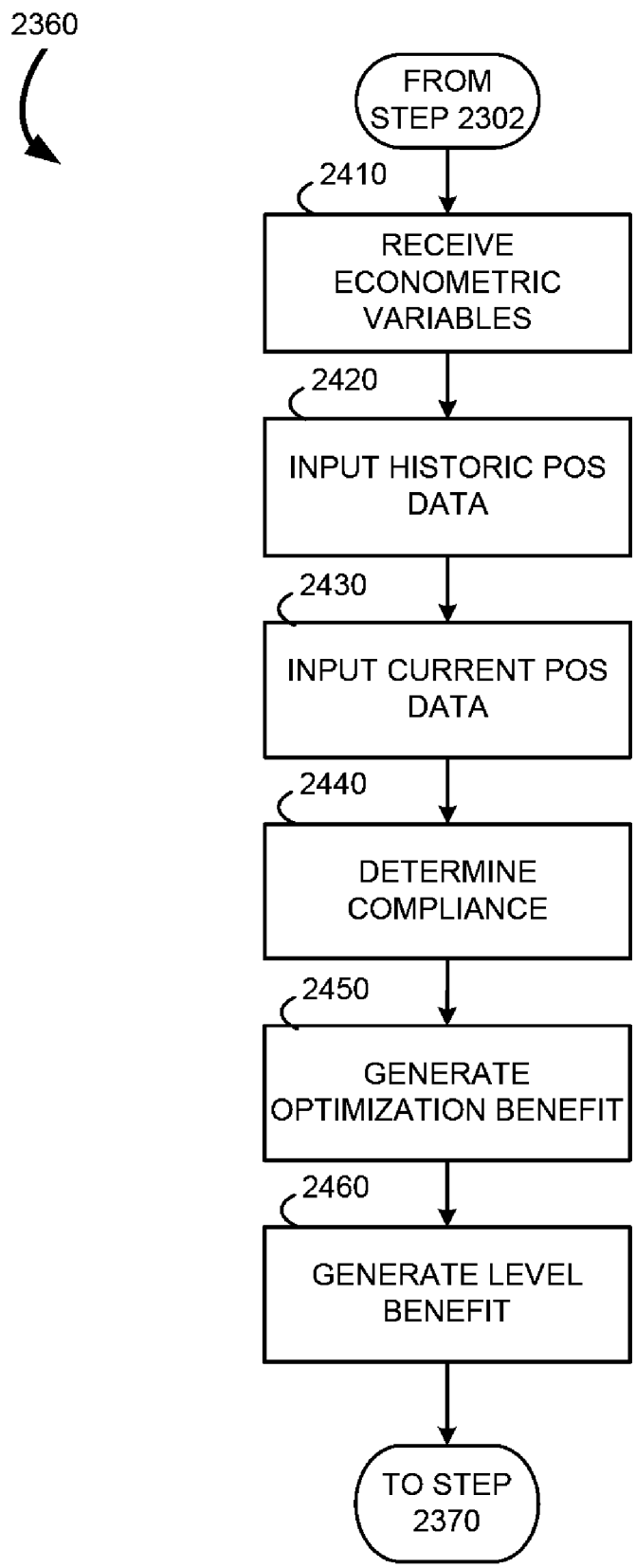
FIG. 24 shows a flow chart illustrating forecast generation in accordance with FIG. 23.

FIG. 24 shows a flow chart illustrating forecast generation shown generally at 2360. The process begins from step 2302 from FIG. 23. The process then proceeds to step 2410 where econometric variables are received by the Forecaster 2226 from the Econometric Engine 104.

In some embodiments the econometric variables are received by the Forecaster 2226 may be similar to the econometric variables and exemplary sales models outlined above. In some alternate embodiments additional econometric modeling may be utilized as is desired. For example, some modeling equations, such as log-linear modeling equations, have been published in books such as *Sales Promotion—Concepts, Methods and Strategies*. Robert C. Blattberg and Scott A. Neslin, *Sales Promotion—Concepts, Methods and Strategies*, Prentice Hall, p 194, 1990.

Such a model may be given by:

$$\ln MS_{jt} = \ln \alpha_j + \sum_k \beta_{jk} x_{jkt} + \epsilon_{jt}$$

where:
$MS_{jt}$=market share for brand j in time t
$\chi_{jkt}$=value for explanatory variable k for brand j in time t
$\epsilon_{jt}$=other causes of market share for brand j in time t
$\alpha_j$=intercept term for brand j
$\beta_{jk}$=regression response coefficient for brand j variable k Such alternate econometric models may be utilized by the Price Optimizing and MDA System 100 as is desired to achieve an accurate result. It is thus intended that the Price Optimizing and MDA System 100 is flexible as to the form, number and type of modeling and econometric coefficients.

Also note that $MS_{jt}$ could also represent sales for product (or brand) j in time t with corresponding modifications to the explanatory variables (e.g. $\chi_{jkt}$ would be the explanatory variable k for product (or brand) j, in time t. Further, the granularity of the equations may be changed by estimating it either at store level (would require adding another subscript s to all of the variables above), division level, chain level, or some other grouping of stores.

Forecaster 2226 may also receive the point-of-sales historic data from the Database 2110 at step 2420. At step 2430 current point-of-sales data is received by the Forecaster 2226 from the POS Data Collector 2130. Then at step 2440 the compliance is generated by the Compliance Reporter 2222 by comparing the expected optimized pricing data against the point-of-sales data received fro the POS Data Collector 2130. The optimization benefit may be generated by the Forecaster 2226 by utilizing the historic sales data, current point-of-sales data and the econometric variables at step 2450. The level benefit may then be generated at step 2460 by selectively removing casuals from the model and regenerating the optimization benefit. Thus, by comparing the original benefit back-cast to the regenerated back-cast, the individual benefits attributable to each specific causal may be generated. The process then concludes by progressing to step 2370 of FIG. 23.

Production models detect seasonality, holidays, and trend at the store/product aggregation level and use this information to determine historical base volume. Seasonality refers to periodic fluctuations in the sales of a given category that are expected to repeat from year to year. For example, allergy medicine sales will rise in the spring and summer, decline in the winter months, and then rise again. Sun Screen sales will rise in the summer months in northern states, but the magnitude of the increase will be greater in the southern states. In the models, seasonality may be a set of 52 indices at the store/product aggregation/week level, calculated over the past 24 months of sales and promotion history.

The Holiday terms in the model capture dramatic volume changes that occur due to holidays. For example, Christmas would create a volume spike on top of the yearly seasonality effect. Likewise, Thanksgiving, the week before mother's day, the week before Father's day, Chanukah and Ramadan would all cause different lifts in different categories. Of course the present list of holidays is non exclusive, and additional holidays may be considered. Additionally, holidays observed may be geographically dependent. Holidays have the ability to move from year to year. For example, Easter may fall in week 10 in one year, and week 12 in the next, but in some embodiments the models adjust the holiday effect accordingly.

Trend is a general, steady increase or decrease in sales at the product aggregation and/or Store level. For example, if a new store is built 10 miles from an existing store, the new store will slowly increase sales, and then begin to level off. The existing store may actually lose some sales at the same time. Conversely, Film sales may be on a general decline, while other sales are on a general increase. The effect of these trends are captured by the models and attributed to Base Sales in the MDA Models may also detect Cannibalization and Halo effects. For example a cannibalistic effect may be seen if the price of Duracell batteries is lowered, but Energizer batteries prices remain constant, Duracell batteries will increase sales at Energizer's expense. Conversely halo effects may be seen if the price of shampoo is lowered, but conditioner prices remain constant and more conditioner sales occur.

In some embodiments, if there is a significant change in sales that cannot be explained by price changes, seasonality, trend, or promotions, the models may have an "Event bucket" that absorbs these effects. Situations such as dock strikes, hurricanes (boom boxes, FRS radios, Soup), supply chain issues, earth quakes (insurance checks), and major sporting events usually trigger "events". Volume changes due to events go into base volume.

The production models use historical POS to determine typical lifts for each type of promotional event (e.g. Temporary Price Reduction, In-store display, Ad, Mail-in-rebate, buy-one-get-one, etc). Using the lifts seen in the point-of-sales data, the models estimate coefficients for each of the promotional vehicles included in the model. Coefficients that capture the effects of these promotions are estimated at the product aggregation/store level (where the product aggregation levels may include both Demand Group and SKU) and take cannibalization into account.

Figure 25A:
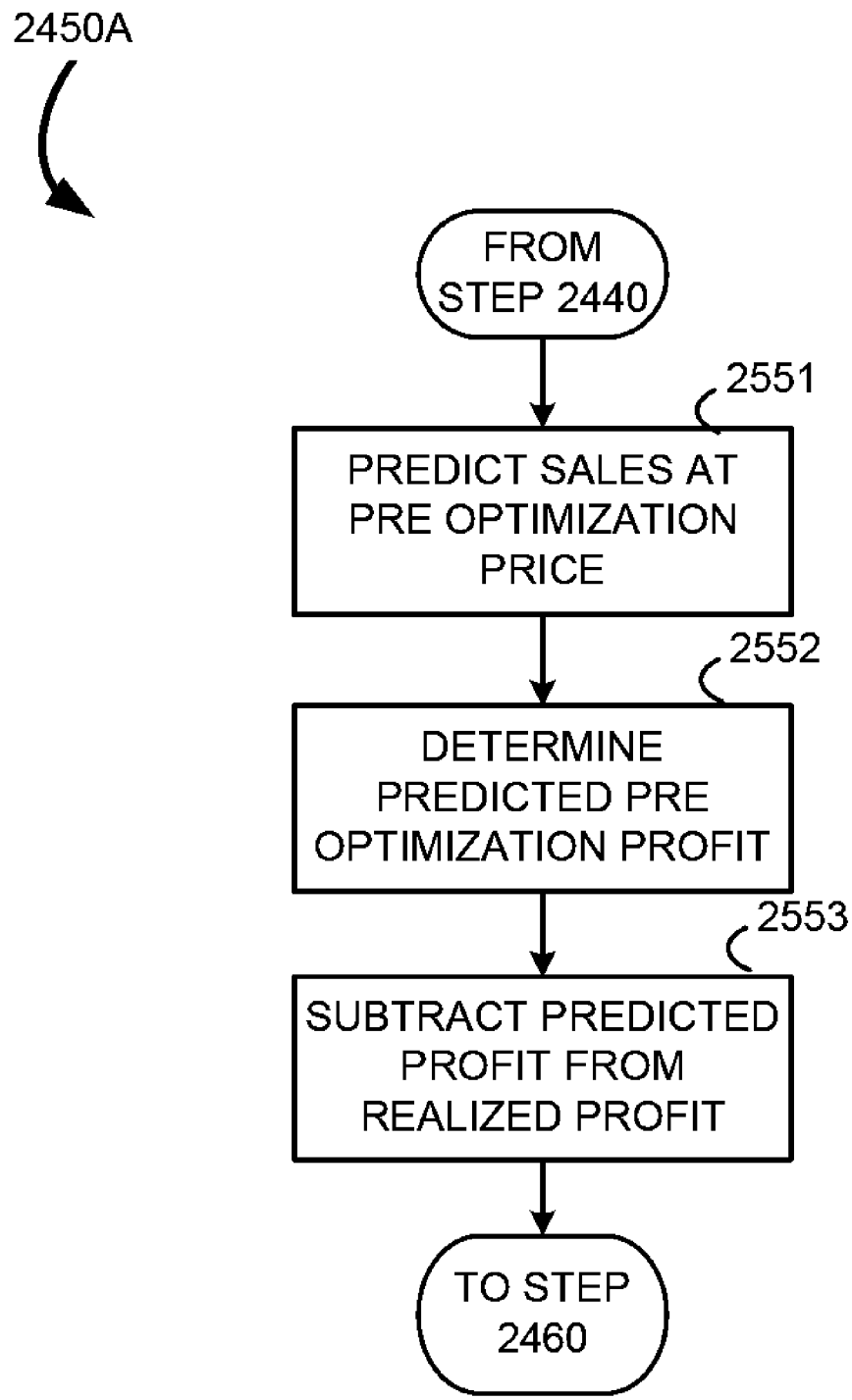
FIG. 25A shows a flow chart illustrating a method of optimization benefit measurement in accordance with FIG. 24.

FIG. 25A shows a flow chart illustrating a first method of optimization benefit measurement shown generally at 2450A. The process begins from step 2440 from FIG. 24. The process then proceeds to step 2551 where sales are predicted at pre-optimization pricing. Then, at step 2552, the pre-optimization profits are generated by multiplying the profit per item by the predicted sales. This pre-optimization profit may then be subtracted from the realized profit at step 2553. Realized profit may be determined from the point-of-sales data received from the POS Data Collector 2130. The process then end by proceeding to step 2460 from FIG. 24. FIG. 25A is intended to provide an overview of one possible method of optimization benefit generation. Alternate methods will be explored in more depth in the following figures.

Figure 25B:
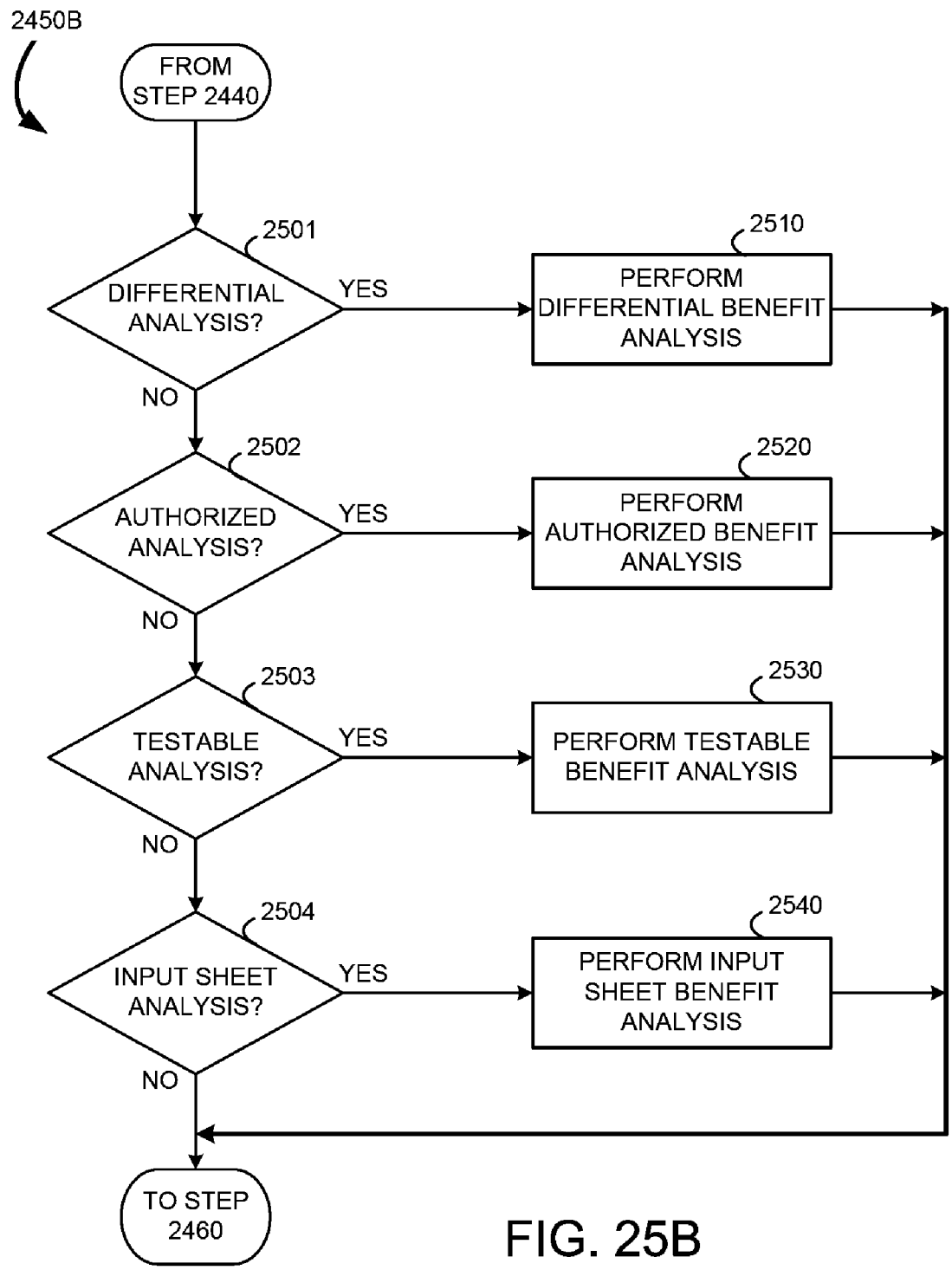
FIG. 25B shows a flow chart illustrating another method of optimization benefit measurement in accordance with FIG. 24.

FIG. 25B shows a flow chart illustrating a second method of optimization benefit generation shown generally at 2450B. The process begins from step 2440 from FIG. 24. The process then proceeds to step 2501 where an inquiry is made whether to use the differential benefit analysis for benefit analysis. The differential benefit analysis may also be referred to as the pre/post method for benefit analysis. If at step 2501 differential benefit analysis is desired the process then proceeds to step 2510 where the differential benefit analysis is performed. The differential benefit analysis may, in some embodiments, be the default mode, as it is akin to a traditional pre/post methodology. The differential benefit analysis measures the impact of all price changes in a category executed after optimized prices have been implemented in stores and compares this impact to that of the prices prior to price optimization. The process then concludes by progressing to step 2460 from FIG. 24.

Else, if at step 2501, the differential benefit analysis is not desired, the process then proceeds to step 2502 where an inquiry is made whether to use the authorized method for benefit analysis. If at step 2502 authorized method is desired the process then proceeds to step 2520 where the authorized benefits analysis is performed. The authorized benefits analysis enables the User 2210 to provide an "Authorized Price Change Window". Only prices that change during this period are considered valid for the purposes of price optimization. For example, if strategic pricing raises the price of an inelastic item $1 from $18 to $19 in February, and the buyer changes the price back to $18 three months later, then the MDA Engine 140 will show a positive $1 for every item sold in February, March, and April. Benefits return to zero for this SKU after the price returned to normal. If the buyer lowered the price another $1 to $17 in June, this SKU would fall off the authorized list, as it underwent a price change outside of the Authorized Price Change Window, and the SKU would no longer receive any positive or negative benefit. The process then concludes by progressing to step 2460 from FIG. 24.

Else, if at step 2502 the authorized method is not desired, the process then proceeds to step 2503 where an inquiry is made whether to use the testable benefit analysis for benefit analysis. Testable benefit analysis may additionally be referred to as a test/control method for benefit analysis. If at step 2503 testable benefit analysis is desired, the process then proceeds to step 2530 where the testable benefit analysis is performed. This method is used for implementations with test and control stores. The MDA Engine 140 compares how the Test Stores are doing at the current price versus how well they would have done had they implemented the prices in the control stores. The testable benefit analysis tends to be expensive, however, in some circumstances where models are inaccurate due to unstable markets the testable benefit analysis may be a desired method. The process then concludes by progressing to step 2460 from FIG. 24.

Else, if at step 2503 the testable benefit analysis is not desired, the process then proceeds to step 2504 where an inquiry is made whether to use the input sheet method for benefit analysis. If at step 2504 input sheet method is desired the process then proceeds to step 2540 where the input sheet method is performed. Input sheet method requires input from the User 2210. This method is of particular use for compiling "what-if" scenarios and for business planning. The process then concludes by progressing to step 2460 from FIG. 24.

Else, if at step 2504 input sheet method is not desired, the process then concludes by progressing to step 2460 from FIG. 24.

In some embodiments, as is illustrated in the FIG. 25B, only one system for benefits analysis measurement may be utilized for any Merchandise Decomposition Analysis. However, in some other embodiments, more than one of the analyses discussed in FIG. 25B may be utilized. Additional methods may be utilized, as is well known by those skilled in the art, for benefits analysis as is needed.

Figure 26:
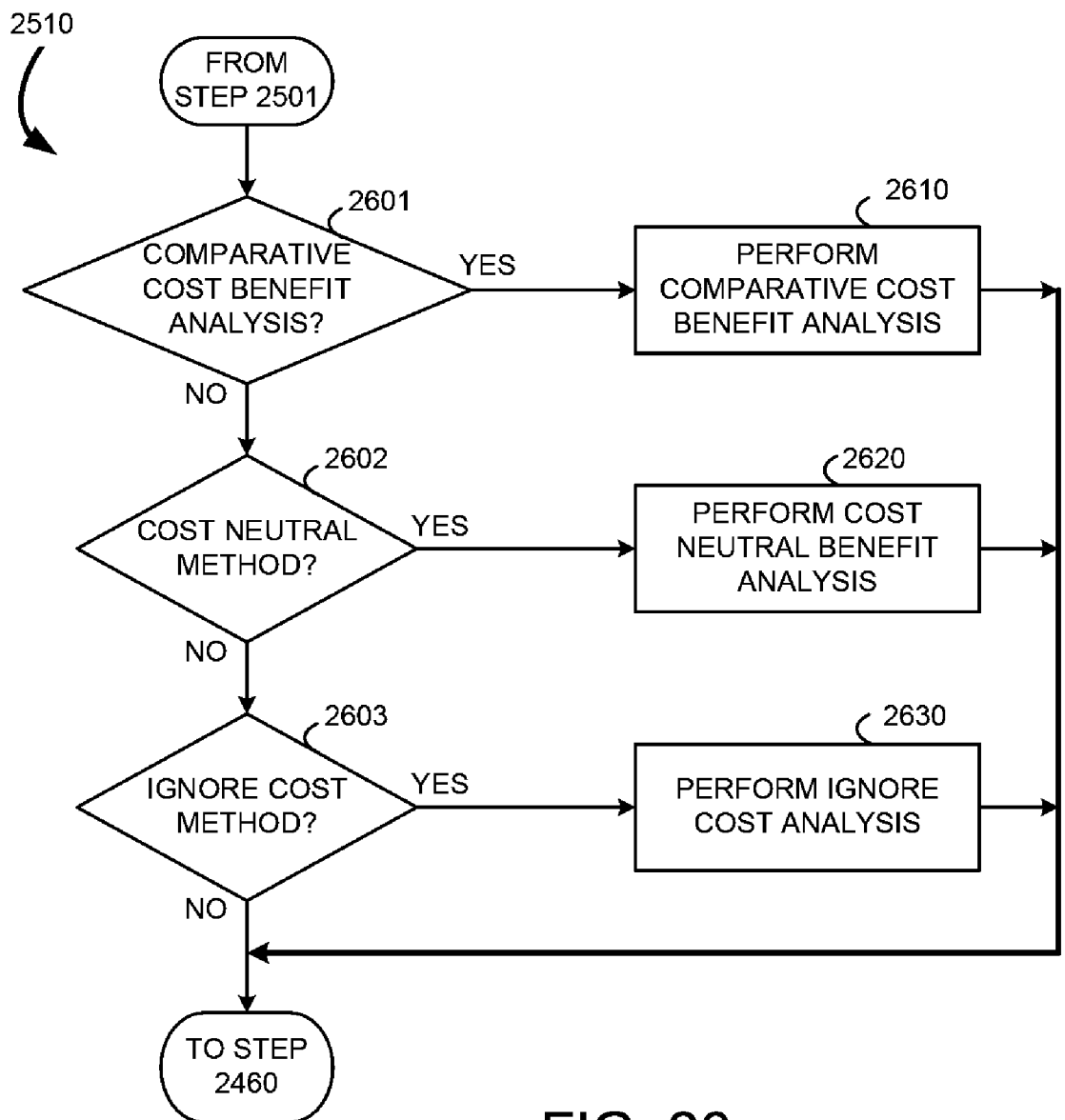
FIG. 26 shows a flow chart illustrating differential benefit analysis in accordance with FIG. 25.

FIG. 26 shows a flow chart illustrating differential benefit analysis shown generally at step 2510. The process begins from step 2501 from FIG. 25B. The process then proceeds to step 2601 where an inquiry is whether to use the comparative cost benefit analysis for benefit analysis. The comparative cost benefit analysis may additionally be referred to as old price/old cost method for benefit analysis. If at step 2601 comparative cost benefit analysis is desired the process then proceeds to step 2610 where the comparative cost benefit analysis is performed. Ignoring, for the sake of simplicity, changes in forecasted volume resulting from price changes, the equations for the comparative cost benefit analysis are given by:

$$\text{Profit} = (\text{Current Price} - \text{Current Cost}) - (\text{Old Price} - \text{Old Cost})$$

$$\text{Revenue} = \text{Current Price} - \text{Old Price}$$

This method is a less advanced way of handling cost changes than the cost neutral method but is simpler. For profit, the comparative cost benefit analysis simply predicts what a SKU's performance would have been at the old price and the old cost compared to how it actually did at the current price and cost for a given week. In the case of categories whose products have undergone extreme cost changes, this method may be preferred. The process then concludes by progressing to step 2460 from FIG. 24.

Else, if at step 2601 comparative cost benefit analysis is not desired, the process then proceeds to step 2602 where an inquiry is made whether to use the cost neutral method for benefit analysis. If at step 2602 cost neutral method is desired the process then proceeds to step 2620 where the cost neutral method is performed. Ignoring, for the sake of simplicity, changes in forecasted volume resulting from price changes, the equation for the cost neutral method is given by:

$$\text{Profit} = (CurPrice - CurCost) - \left(\left(\frac{OldPrice}{OldCost} \times CurCost\right) - CurCost\right)$$

$$\text{Revenue} = CurPrice - \left(\frac{OldPrice}{OldCost} \times CurCost\right)$$

In the cost neutral method, if a retailer passes a cost change onto the consumer, the MDA Engine 140 treats this as a profit-neutral activity. If the cost drops and the retailer holds the price constant, this is recorded as a profit-positive activity. If the cost increases and the retailer holds the price constant, this is a profit-negative action. The cost neutral method may, in some embodiments, be the recommended method for cost handling. The process then concludes by progressing to step 2460 from FIG. 24.

Else, if at step 2602 cost neutral method is not desired, the process then proceeds to step 2603 where an inquiry is made whether to use the ignore cost method for benefit analysis. If at step 2603 the ignore cost method is desired, the process then proceeds to step 2630 where the ignore cost method is performed. The equations for the ignore cost method are given by:

Profit=(Current Price−Current Cost)−(Old Price−Current Cost)

Revenue=Current Price−Old Price

Ignore cost method, in some embodiments, is not a recommended method for cost handling, since the MDA Engine 140 will ignore cost changes of products. However, in situations where, for the products in the category, the Store 124 has few cost changes or changes of small magnitude, then the ignore cost method may be of use. The process then concludes by progressing to step 2460 of FIG. 24.

Else, if at step 2603 the ignore cost method is not desired, the process then concludes by progressing to step 2460 of FIG. 24.

In some embodiments, as is illustrated in the FIG. 26, only one system for benefits analysis cost handling may be utilized for any Merchandise Decomposition Analysis. However, in some other embodiments, more than one of the cost handling methods discussed in FIG. 26 may be utilized. Additional methods may be utilized, as is well known by those skilled in the art, for benefits analysis as is needed.

Figure 27A:
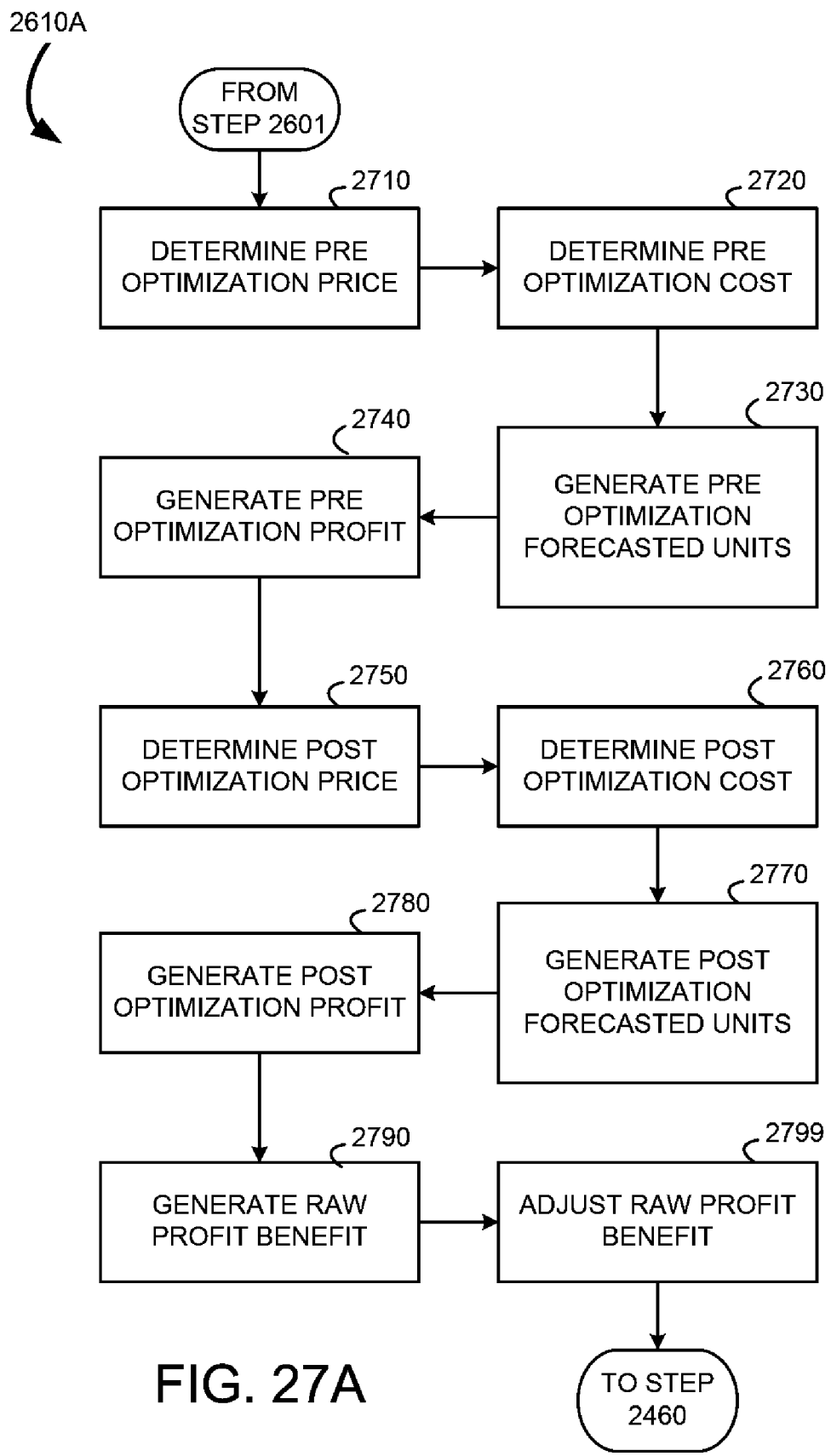
FIG. 27A shows a flow chart illustrating a method of comparative cost analysis in accordance with FIG. 26.

FIG. 27A shows a flow chart illustrating a first method of old price/old cost benefit analysis shown generally at 2610A. The process begins from step 2601 from FIG. 26. The process then proceeds to step 2710 where the pre-optimization price is determined. Pre and post-optimization prices may be determined in many different ways. For example, a regular method would to be to obtain the pre- and post-optimization prices from the customer's current retail prices as found in the point-of-sales data. Alternatively, the Pre and post-optimization prices may be obtained by calculating the Imputed Base Prices using same algorithm as used in econometric modeling. Moreover, in some embodiments, a hybrid method may be utilized for determining the pre and post-optimization prices. In such a hybrid method the post-optimization price may be set to the Imputed Base Price, whereas the pre-optimization price may be set to the calculated Imputed Base Price minus an adjusting factor. The adjusting factor may be the difference between the customer's pre- and post-optimization current retail prices as found in the point-of-sales data. Moreover, additional methods for determining pricing may be utilized, as is well known by those skilled in the art.

Pre-optimization costs may be determined from stored data in the Database 2110 at step 2720. The pre-optimization price may then be utilized, along with econometric variables, to determine the pre-optimization forecasted units sold at step 2730. This forecast may be performed by the Forecaster 2226. The process then proceeds to step 2740 where the pre-optimization forecasted units sold is multiplied by the pre-optimization price-versus-cost difference to obtain the pre-optimization forecasted profits.

The process then proceeds to step 2750 where the post-optimization price is determined. See the discussion above for the methods of price determination. Post-optimization costs may be determined from stored data in the Database 2110, or other current cost sources, at step 2760. The post-optimization price and cost may then be utilized, along with econometric variables, to determine the post-optimization forecasted units sold at step 2770. This forecast may be performed by the Forecaster 2226. The process then proceeds to step 2780 where the post-optimization forecasted units sold is multiplied by the post-optimization price-versus-cost difference to obtain the post-optimization forecasted profits.

At step 2790 post-optimization forecasted profits may be compared to pre-optimization forecasted profits in order to generate a raw profit benefit. The raw profit benefit may then be adjusted at step 2799. Adjustment of raw benefit may be based on the promo exclusion rules that may be configured by the User 2210 via the User Interface 2224. Such promo exclusion rules may include flags that trigger benefit exclusions and TPR threshold. The raw Benefit and other deltas (TPR, Ad, etc.) may also be scaled so that sum of all of the deltas (Base benefit, Optimal Pricing benefit, TPR benefit, Ad benefit, Display benefit, Multiples benefit, Non-Modeled benefit, and Clearance benefit) sum up to the actual Units/Equnits/Revenue/Profit, as obtained from the point-of-sales data. The process then concludes by progressing to step 2460 from FIG. 24.

Figure 27B:
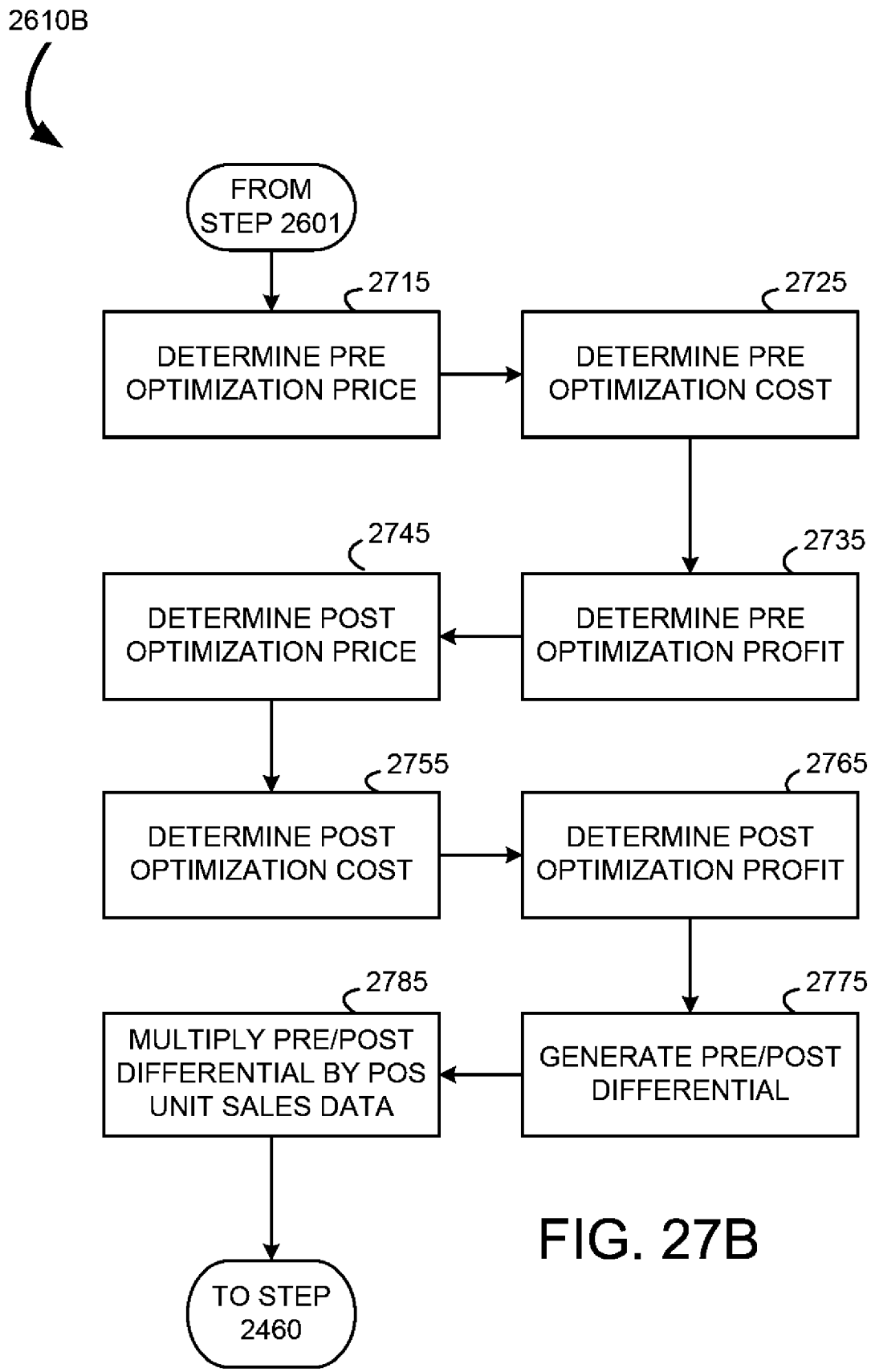
FIG. 27B shows a flow chart illustrating another method of comparative cost analysis in accordance with FIG. 26.

FIG. 27B shows a flow chart illustrating a second method of comparative cost benefit analysis shown generally at 2610B. The process begins from step 2601 from FIG. 26. The process then proceeds to step 2715 where the pre-optimization price is determined. As previously stated, pre and post-optimization prices may be determined in many different ways. For example, a regular method would to be to utilize point-of-sales data to determine the pricing. Alternatively, the Pre and post-optimization prices may be obtained through calculating Imputed Base Prices using econometric modeling. Moreover, in some embodiments, a hybrid method may be utilized for determining the pre and post-optimization prices. In such a hybrid method the post-optimization price may be set to a calculated Imputed Base Price using econometric modeling, whereas the pre-optimization price may be set to a calculated Imputed Base Price minus an adjusting factor. The adjusting factor may be the difference between point-of-sales data for the post-optimization price and the pre-optimization price. Moreover, additional methods for determining pricing may be utilized, as is well known by those skilled in the art.

Then, pre-optimization costs may be determined from stored data in the Database 2110 at step 2725. The pre-optimization price and cost may then be utilized to determine pre-optimization profit per item at step 2735.

The process then proceeds to step 2745 where the post-optimization price is determined. Post-optimization costs may be determined from stored data in the Database 2110, or other current cost sources, at step 2755. The post-optimization price and cost may then be utilized to determine post-optimization profits per item at step 2765.

At step 2775 post-optimization profits may be compared to pre-optimization profits in order to generate a profit differential per item. The profit differential per item may then be multiplied by unit sales data to generate the benefit, at step 2785. The process then concludes by progressing to step 2460 from FIG. 24.

The comparative cost analysis as outlined in FIG. 27B is an alternative to the comparative cost analysis as outlined in FIG. 27A. For some embodiments of the present invention only one of the comparative cost analyses is utilized. Likewise additional methods for comparative cost analysis may be utilized as is desired. The purpose of illustrating two mutually exclusive comparative cost analyses is to exemplify that there are multiple methods available for cost handling. As such, the processes illustrated are intended to expand the scope of the present invention rather than limit.

Figure 28:
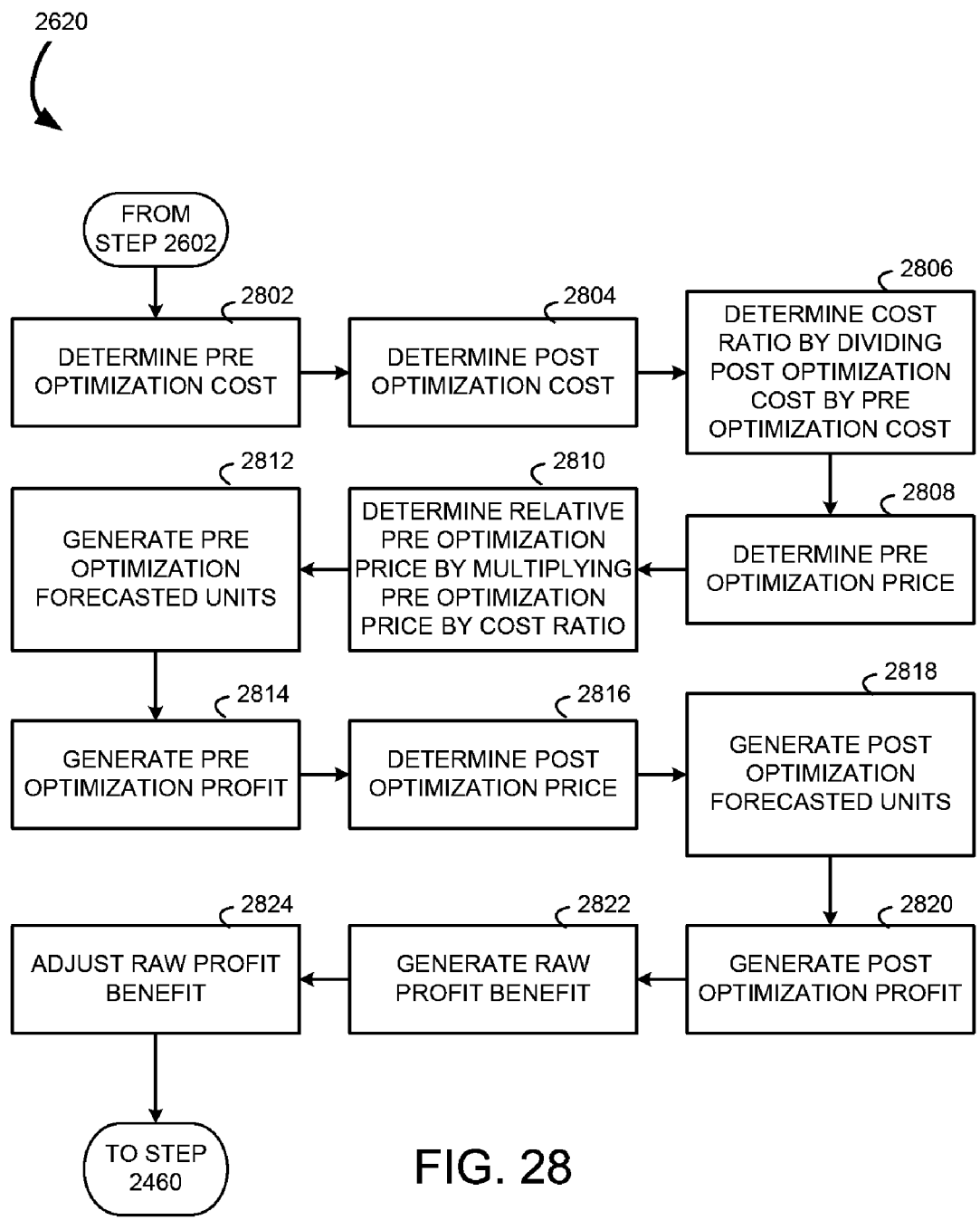
FIG. 28 shows a flow chart illustrating cost neutral benefit analysis in accordance with FIG. 26.

FIG. 28 shows a flow chart illustrating cost neutral benefit analysis shown generally at 2620. The process begins from step 2602 from FIG. 26. The process then proceeds to step 2802 where the pre-optimization costs may be determined from stored data in the Database 2110. Post-optimization costs may be determined from stored data in the Database 2110, or other current cost sources, at step 2804. Then at step 2806 a cost ratio is determined by dividing post-optimization costs by pre-optimization costs.

At step 2808 pre-optimization prices are determined. As previously stated, pre and post-optimization prices may be determined in many different ways. For example, a regular method would to be to obtain the pre- and post-optimization prices from the current retail prices in the point-of-sales data. Alternatively, the Pre and post-optimization prices may be obtained from the Imputed Base Prices calculated with the same Base Price Imputation algorithm used in econometric modeling. Moreover, in some embodiments, a hybrid method may be utilized for determining the pre and post-optimization prices. In such a hybrid method the post-optimization price may be set to a calculated Imputed Base Price using econometric modeling, whereas the pre-optimization price may be set to a calculated Imputed Base Price minus an adjusting factor. The adjusting factor may be the difference between the post-optimization and pre-optimization prices, as obtained from the point-of-sales data. Moreover, additional methods for determining pricing may be utilized, as is well known by those skilled in the art.

Then, at step 2810, the pre-optimization prices are multiplied by the cost ratio from step 2806 thereby yielding a relative pre-optimization price. The pre-optimization price and cost may then be utilized, along with econometric variables, to determine the pre-optimization forecasted units sold at step 2812. This forecast may be performed by the Forecaster 2226. The process then proceeds to step 2814 where the pre-optimization forecasted units sold is used along with the relative pre-optimization prices and costs to determine pre-optimization forecasted profits.

The process then proceeds to step 2816 where the post-optimization price is determined. The post-optimization price and cost may then be utilized, along with econometric variables, to determine the post-optimization forecasted units sold at step 2818. This forecast may be performed by the Forecaster 2226. The process then proceeds to step 2820 where the post-optimization forecasted units sold is used along with post-optimization prices and costs to determine post-optimization forecasted profits.

At step 2822 post-optimization forecasted profits may be compared to pre-optimization forecasted profits in order to generate a raw profit benefit. The raw profit benefit may then be adjusted at step 2824. As previously stated, adjustment of raw benefit may be based on the promo exclusion rules that may be configured by the User 2210 via the User Interface 2224. The raw Benefit and other deltas (TPR, Ad, etc.) may also be scaled so that sum of all of the deltas (Base benefit, Optimal Pricing benefit, TPR benefit, Ad benefit, Display benefit, Multiples benefit, Non-Modeled benefit, and Clearance benefit) sum up to the actual Units/Equnits/Revenue/Profit, as measured by point-of-sales data. The process then concludes by progressing to step 2460 from FIG. 24.

Figure 29:
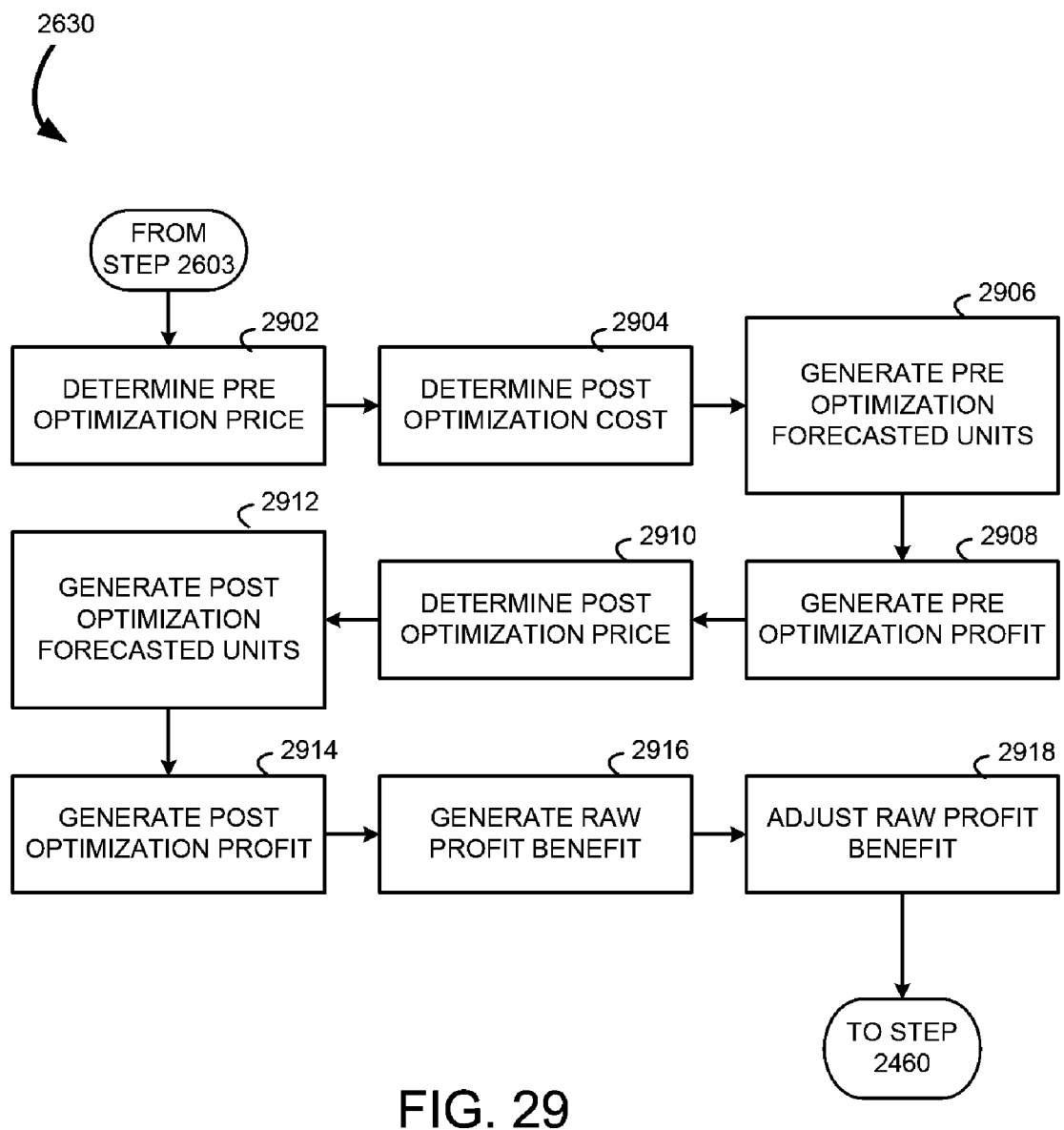
FIG. 29 shows a flow chart illustrating ignore cost benefit analysis in accordance with FIG. 26.

FIG. 29 shows a flow chart illustrating ignore cost benefit analysis shown generally at 2630. The process begins from step 2603 from FIG. 26. The process then proceeds to step 2902 where the pre-optimization price is determined. Also, post-optimization costs may be determined, at step 2904. As previously stated, pre and post-optimization prices may be determined in many different ways. For example, a regular method would to be to obtain them from the current retail prices in the point-of-sales data. Alternatively, the Pre and post-optimization prices may be obtained by calculating the Imputed Base Prices with the same Base Price Imputation algorithm used in econometric modeling. Moreover, in some embodiments, a hybrid method may be utilized for determining the pre and post-optimization prices as discussed above. Moreover, additional methods for determining pricing may be utilized, as is well known by those skilled in the art.

The pre-optimization price may then be utilized, along with econometric variables, to determine the pre-optimization forecasted units sold at step 2906. This forecast may be performed by the Forecaster 2226. The process then proceeds to step 2908 where the pre-optimization forecasted units sold is multiplied by the difference between pre-optimization price and post-optimization cost to determine pre-optimization forecasted profits.

The process then proceeds to step 2910 where the post-optimization price is determined from the point-of-sales data from in the POS Data Collector 2130. The post-optimization price may then be utilized, along with econometric variables, to determine the post-optimization forecasted units sold at step 2912. This forecast may be performed by the Forecaster 2226. The process then proceeds to step 2914 where the post-optimization forecasted units sold is multiplied by the difference between post-optimization price and post-optimization cost to determine post-optimization forecasted profits.

At step 2916 post-optimization forecasted profits may be compared to pre-optimization forecasted profits in order to generate a raw profit benefit. The raw profit benefit may then be adjusted at step 2018. As previously stated, adjustment of raw benefit may be based on the promo exclusion rules that may be configured by the User 2210 via the User Interface 2224. The raw Benefit and other deltas (TPR, Ad, etc.) may also be scaled so that sum of all of the deltas (Base benefit, Optimal Pricing benefit, TPR benefit, Ad benefit, Display benefit, Multiples benefit, Non-Modeled benefit, and Clearance benefit) sum up to the actual Units/Equnits/Revenue/Profit, as measured by point-of-sales data. The process then concludes by progressing to step 2460 from FIG. 24.

Figure 30:
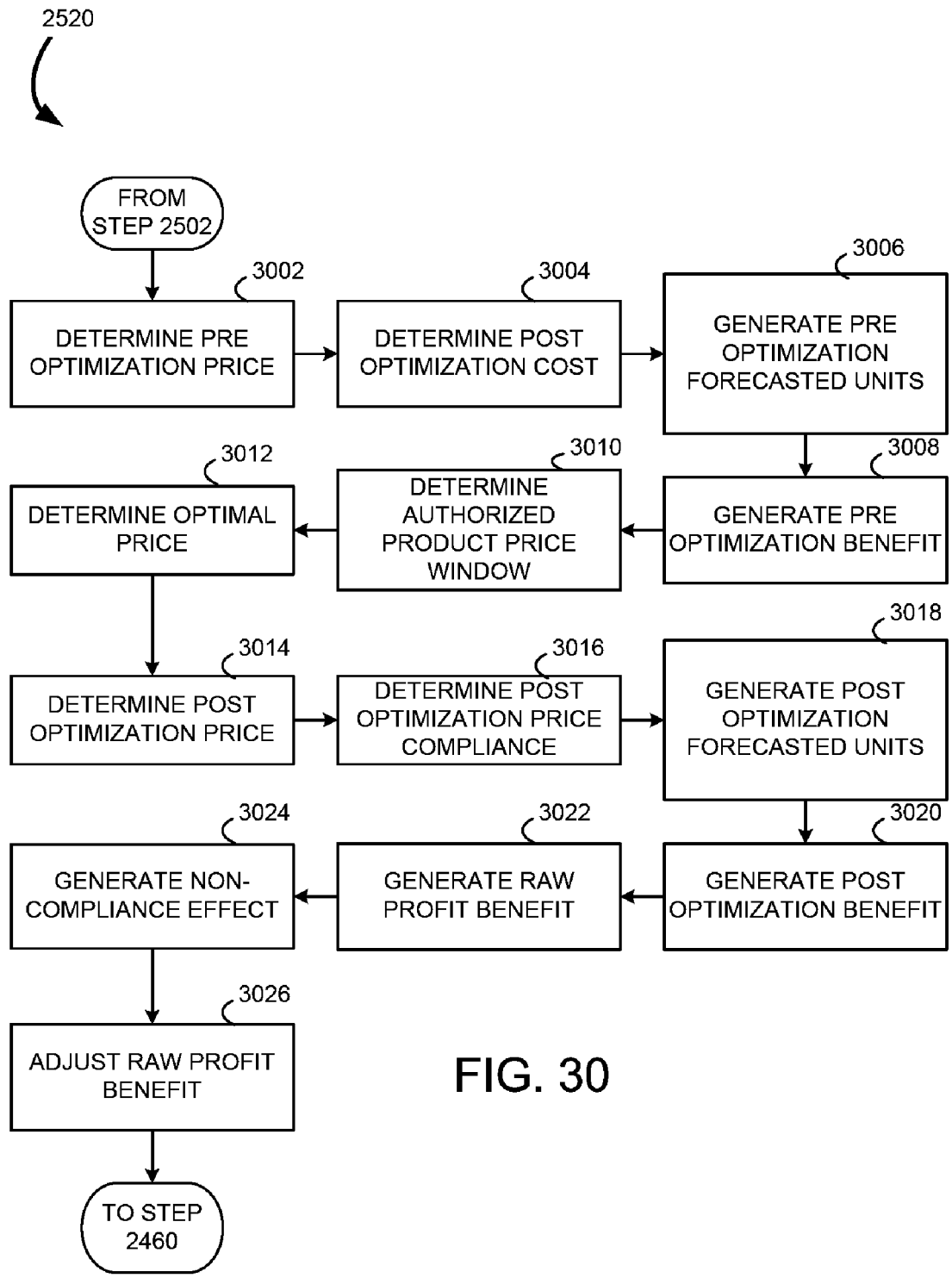
FIG. 30 shows a flow chart illustrating authorized benefit analysis in accordance with FIG. 25.

FIG. 30 shows a flow chart illustrating authorized benefit analysis shown generally at 2520. The authorized benefit analysis may be performed via the ignore cost methodology; however, additional cost handling methods may be employed for authorized benefit analysis. The process begins from step 2502 from FIG. 25B. The process then proceeds to step 3002 where the pre-optimization price is determined. As previously stated, pre and post-optimization prices may be determined in many different ways. For example, a regular method would to be to obtain them from the current retail prices in the point-of-sales data. Alternatively, the Pre and post-optimization prices may be obtained by calculating the Imputed Base Prices using the same Base Price Imputation algorithm used in econometric modeling. Moreover, in some embodiments, a hybrid method may be utilized for determining the pre and post-optimization prices as discussed above. Moreover, additional methods for determining pricing may be utilized, as is well known by those skilled in the art.

Also, post-optimization costs may be determined; at step 3004. The pre-optimization price may then be utilized, along with econometric variables, to determine the pre-optimization forecasted units sold at step 3006. This forecast may be performed by the Forecaster 2226. The process then proceeds to step 3008 where the pre-optimization forecasted units sold is multiplied by the difference between pre-optimization price and post-optimization cost to determine pre-optimization forecasted benefit.

Then, at step 3010 the authorized product price window is determined. In some embodiments, this determination may be made by the User 2210. Alternatively, in some embodiments, the window may be a pre-determined pricing window range. At step 3012 optimum pricing is determined. At step 3014 the post-optimization price is determined. Then at step 3016 pricing compliance is determined by comparing the post-optimization price to the optimum pricing.

The post-optimization price may then be utilized, along with econometric variables, to determine the post-optimization forecasted units sold at step 3018. This forecast may be performed by the Forecaster 2226. The process then proceeds to step 3020 where the post-optimization forecasted units sold is multiplied by the difference between post-optimization price and post-optimization cost to determine post-optimization benefit.

At step 3022 post-optimization benefit may be compared to pre-optimization benefit in order to generate a raw profit benefit. At step 3024 the non compliance, as determined at step 3016, may be used to generate a non-compliance effect. The raw profit benefit may then be adjusted at step 3026. As previously stated, adjustment of raw benefit may be based on the promo exclusion rules that may be configured by the User 2210 via the User Interface 2224; however, in the present method benefit adjustment may additionally include the non-compliance effect of step 3024. The raw Benefit and other deltas (TPR, Ad, etc.) may also be scaled so that sum of all of the deltas (Base benefit, Optimal Pricing benefit, TPR benefit, Ad benefit, Display benefit, Multiples benefit, Non-Modeled benefit, and Clearance benefit) sum up to the actual Units/Equnits/Revenue/Profit, as measured by point-of-sales data. The process then concludes by progressing to step 2460 from FIG. 24.

In the authorized method benefits are only reported when SKUs are actually selling at the optimized price. For example, if the price of an inelastic SKU increases from $18 to $19 in February, and if the price increases another $1 to $20 outside an authorized window, the MDA Engine 140 may still report $1 in benefit (from $18 to $19) and +$1 in non-compliance. However, if the price fell back to $18.50 outside an authorized price change window, the MDA Engine 140 may still report $0.50 in benefit and −$0.50 in non-compliance. Moreover, if the price fell back to $18 outside an authorized price change window, the MDA Engine 140 will report $0 benefit and −$1 non-compliance. Lastly, if the price fell to $17 outside an authorized price change window, the MDA Engine 140 may report $0 benefit and −$2 due to non-compliance. The foregoing example is not intended to be limiting of the claimed invention, and provides one of many logical methods for authorized benefits analysis.

Figure 31:
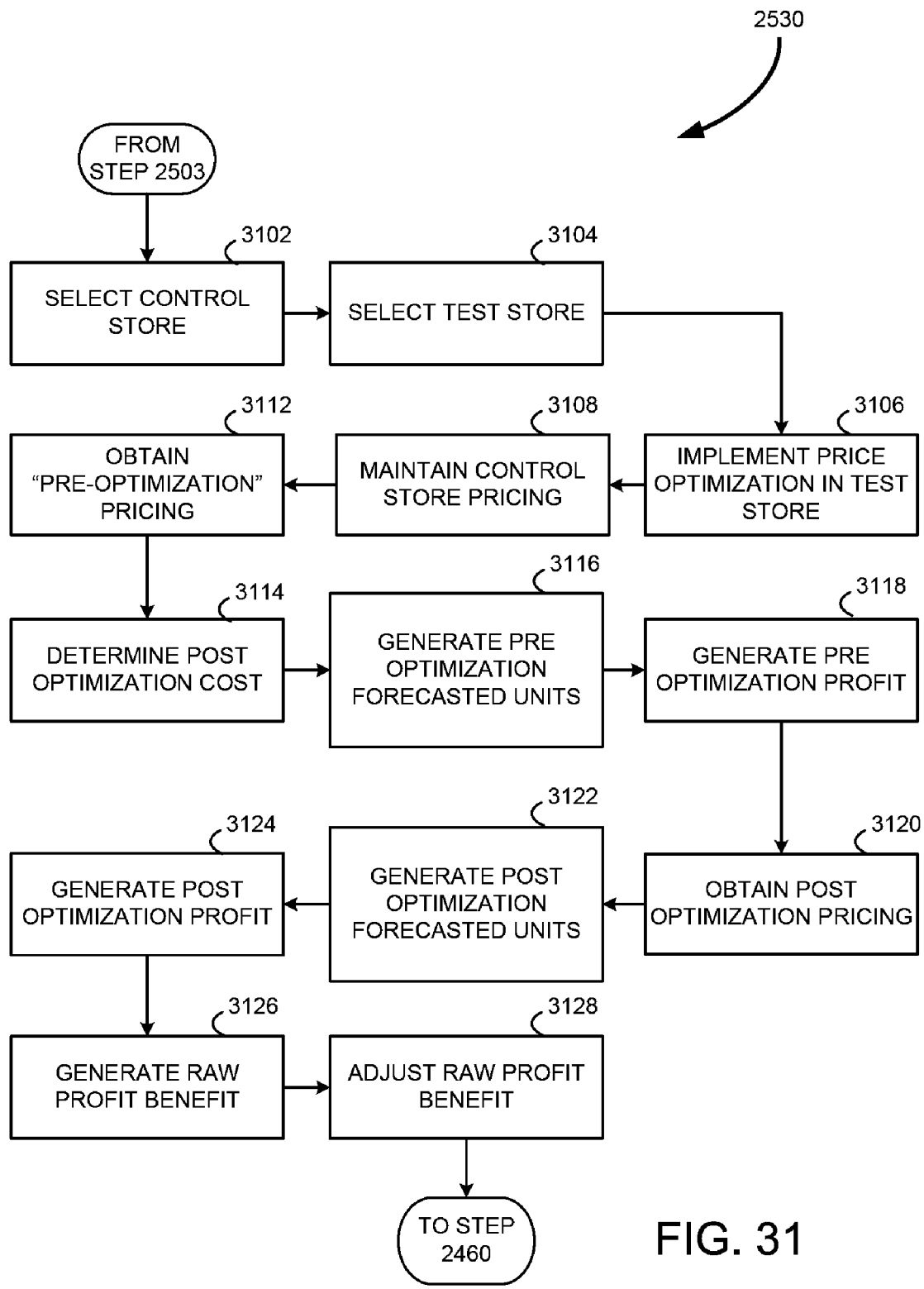
FIG. 31 shows a flow chart illustrating testable benefit analysis in accordance with FIG. 25.

FIG. 31 shows a flow chart illustrating test/control benefit analysis shown generally at 2530. The process begins from step 2503 from FIG. 25B. The process then proceeds to 3102 where the control store is selected. User 2210 may select the control store, or the selection may be automated for statistical reasons. In some embodiments, it may be preferable that the control store historically has few unexpected events that may result in skewed point-of-sales data. Likewise, at step 3104, the test store may be selected. Again the User 2210 may select the test store, or in some embodiments, the test store may be selected for unique characteristics or similarity to the control store. In some embodiments, sales history between control store and test store closely mirror one another, or are correlative. At step 3106 optimized pricing is implemented in the test stores. Control store pricing is maintained at present levels, or operated under standard (non-optimized) conditions at step 3108. Then, in step 3112, "pre-optimization" prices are obtained from the point-of-sales data of the control stores over the trial period. "Pre-optimization" prices actually occur during the time period that price optimization has been implemented in the test stores; however, for consistency these control pricing values will be referred to as "pre-optimization" prices.

Additionally, post-optimization costs may be determined at step 3114. In some embodiments, costs in both the test and control store may be substantially similar. In the case of discrepant costs, the costs of the test store may be used as the value for the post-optimization costs. However, additional cost computations are possible, as is well known by those skilled in the art. At step 3116 the pre-optimization forecasts are generated by utilizing the "pre-optimization" prices along with the econometric variables and modeling equations. The post-optimization costs may be subtracted from the "pre-optimization" prices and the result multiplied by the pre-optimization forecasted units to yield the pre-optimization profit at step 3118.

The process then proceeds to step 3120 where the post-optimization pricing is determined from the point-of-sales data from the test stores. At step 3122 the post-optimization forecasts are generated by utilizing the post-optimization prices along with the econometric variables and modeling equations. The post-optimization costs may be subtracted from the post-optimization prices and the result multiplied by the post-optimization forecasted units to yield the post-optimization profit at step 3124.

Pre-optimization profit may be subtracted from the post-optimization profit in order to yield the raw benefit at step 3126. The raw profit benefit may then be adjusted at step 3128. Adjustment of raw benefit may be based on the promo exclusion rules that may be configured by the User 2210 via the User Interface 2224. Such promo exclusion rules may include flags that trigger benefit exclusions and TPR threshold. The raw Benefit and other deltas (TPR, Ad, etc.) may also be scaled so that sum of all of the deltas (Base benefit, Optimal Pricing benefit, TPR benefit, Ad benefit, Display benefit, Multiples benefit, Non-Modeled benefit, and Clearance benefit) sum up to the actual Units/Equnits/Revenue/Profit, as measured by point-of-sales data. The process then concludes by progressing to step 2460 from FIG. 24.

Figure 32:
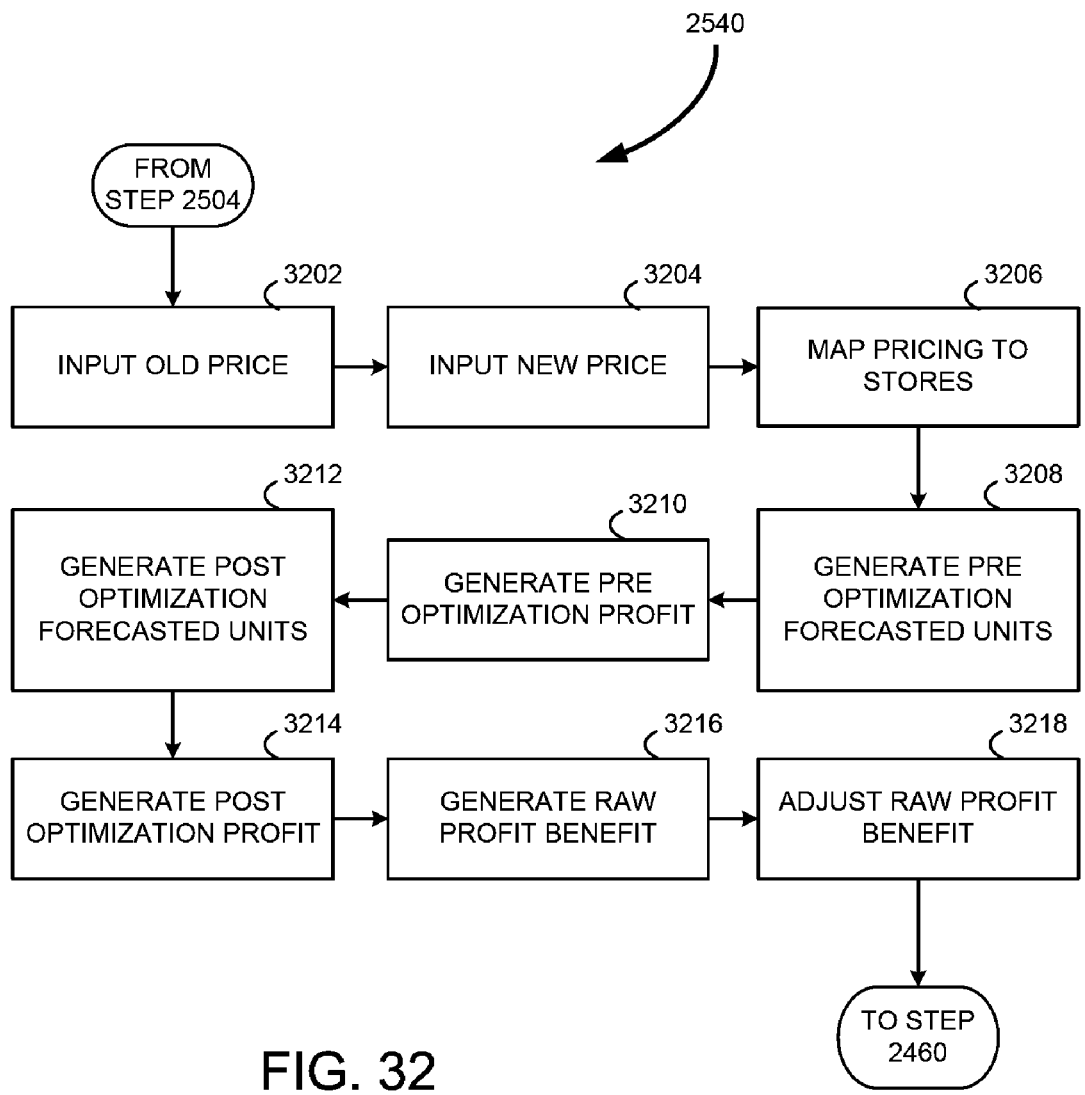
FIG. 32 shows a flow chart illustrating input sheet benefit analysis in accordance with FIG. 25.

FIG. 32 shows a flow chart illustrating input sheet benefit analysis shown generally at step 2540. Input sheet analysis enables business "what if" scenarios to be performed without the risks traditional price setting experimentation requires. The process begins from step 2504 from FIG. 25B. The process then proceeds to step 3202 where an old price is input by the User 2210. Likewise, the User 2210 may input a new price at step 3204. Then at step 3206 the inputted pricing is mapped to Store 124 for analysis by the MDA Engine 140. At step 3208 the pre-optimization forecasted units are determined utilizing the old prices that were inputted by the User

2210 at step 3202. Then at step 3210 pre-optimization forecasted units may be multiplied by old prices to determine pre-optimization revenue. In some embodiments, costs may be subtracted from the old prices and then multiplied by pre-optimization forecasted units to provide a pre-optimization profit. Costs may be pre or post-optimization costs, or fictitious cost values inputted by User 2210.

The process then proceeds to step 3212 where the post-optimization forecasted units are determined utilizing the new prices that were inputted by the User 2210 at step 3204. Then at step 3214 post-optimization forecasted units may be multiplied by new prices to determine post-optimization revenue. As previously discussed, in some embodiments, costs may be subtracted from the new prices and then multiplied by post-optimization forecasted units to provide a post-optimization profit. Costs may be pre or post-optimization costs, or fictitious cost values inputted by User 2210.

Then, at step 3216, raw benefit may be determined by subtracting either pre-optimization profit from post-optimization profit, or pre-optimization revenue from post-optimization revenue. The raw benefit may then be adjusted at step 3218. Adjustment of raw benefit may be based on the promo exclusion rules that may be configured by the User 2210 via the User Interface 2224. Such promo exclusion rules may include flags that trigger benefit exclusions and TPR threshold. The raw Benefit and other deltas (TPR, Ad, etc.) may also be scaled so that sum of all of the deltas (Base benefit, Optimal Pricing benefit, TPR benefit, Ad benefit, Display benefit, Multiples benefit, Non-Modeled benefit, and Clearance benefit) sum up to the actual Units/Equnits/Revenue/Profit, as measured by point-of-sales data. The process then concludes by progressing to step 2460 of FIG. 24.

Figure 33:
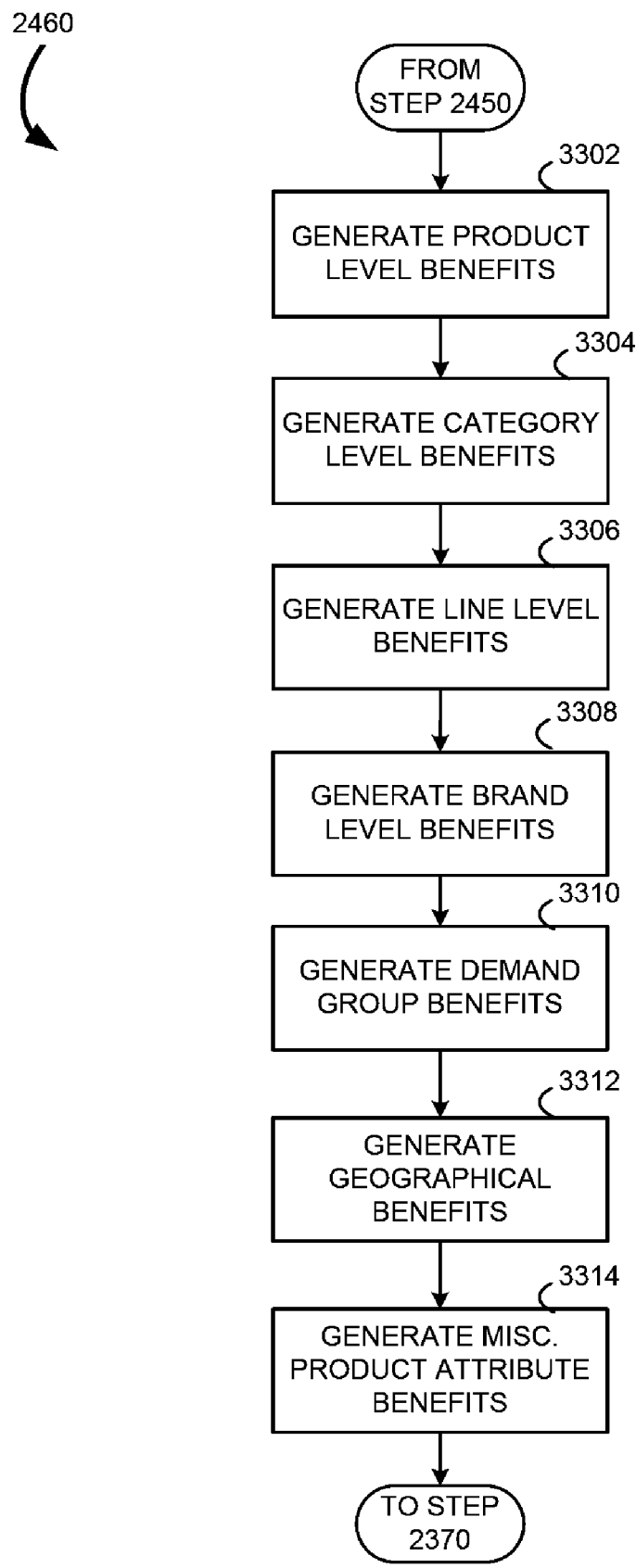
FIG. 33 shows a flow chart illustrating level benefit generation in accordance with FIG. 24.

FIG. 33 shows a flow chart illustrating level benefit generation shown generally at 2460. The process begins from step 2450 of FIG. 24. The process then proceeds to step 3302 where product level benefits are generated. Product level benefits may determine which portion of the total benefits may be attributed to any particular product. In some embodiments, product level benefits may be utilized in purchasing and inventory business decisions. For example, if a particular product substantially provides a large benefit then businesses may be inclined to continue offering said product.

In step 3304 category level benefits may be generated. For example, categories may include housewares and foodstuffs. Benefit analysis on a categorical level may aid in future business emphasis and strategy.

In step 3306 line level benefit may be generated. Line level benefit may provide benefit for every product line. In some embodiments, every SKU may thus be referenced to a benefit. Line level benefit may provide valuable information for product placement decisions, future contracts and to identify cannibalistic trends between items.

Then, at step 3308, brand level benefits may be generated. In some embodiments, brand level benefits may be utilized for brand contract negotiations and advertising.

At step 3310 demand group benefits may be generated. As discussed earlier, demand groups are groupings of substantially substitutable products. For example one demand grouping may be all colas, regardless of brand. Demand group benefits provide information as to the benefits of "kinds of" products rather than individual products.

Then, at step 3312, geographical benefits may be generated. In multi Store 124 businesses it may be useful to determine benefits for each geographic region. Such benefits analyses may be useful when determining staffing considerations, new Store 124 openings and Store 124 closures.

Lastly, at step 3314, miscellaneous product attributes benefits may be generated. For example, one such miscellaneous attribute may include organic foods. In some embodiments, User 2210 may specify the product attribute that benefits analysis is performed for. Thus in this manner benefits of virtually any desired attribute may be determined; thereby enabling highly tailored analysis of product trends and profitability for complex business management decisions.

The process then concludes by proceeding to step 2370 of FIG. 23.

VII. Examples of MDA System

To better illustrate the functionality of the Price Optimizing and MDA System 100 numerous examples will be provided. This subsection is intended to be purely exemplary in nature and not intended to limit the present invention.

Figure 34:
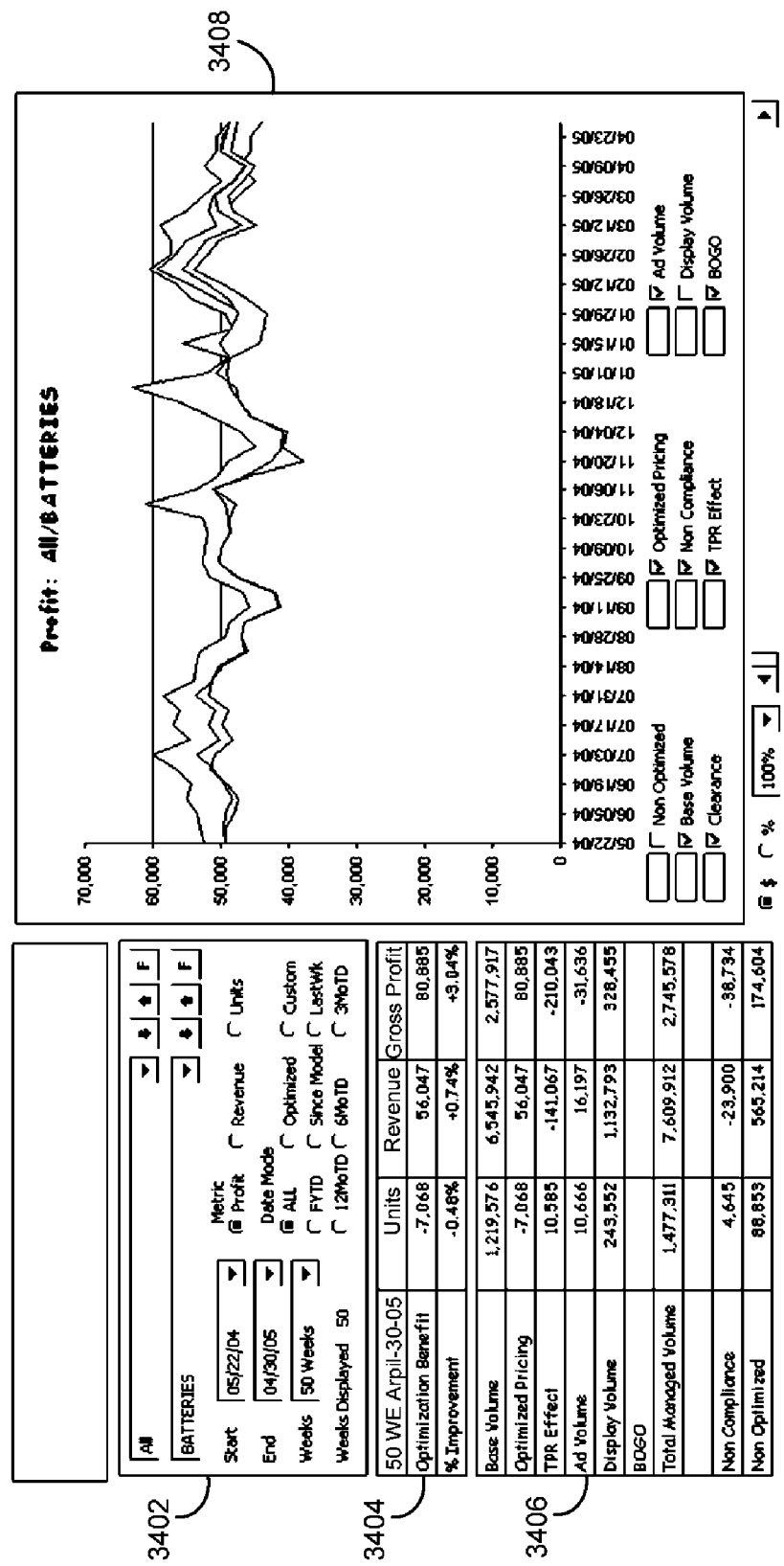
FIG. 34 shows an exemplary diagram illustrating merchandising decomposition analysis interface in accordance with an embodiment of the present invention.

FIG. 34 shows an exemplary diagram illustrating an embodiment of User Interface 2224. The present diagram is but one embodiment of the User Interface 2224 and is not intended to limit other embodiments of the User Interface 2224. In this embodiment the User 2210 is able to set major benefits analysis parameters at an Input Field 3402. Input Field 3402 may include start and end dates for analysis, or length time for analysis or particular date modalities; and analysis in terms of profit, revenue or units sold. At Raw Benefit Results 3404 aggregate raw benefit may be provided for revenue, volume unit sales and profit. Raw Benefit Results 3404 may provide benefit in terms of percentage and dollar amounts. Likewise, Effect Benefits Results 3406 may provide individual benefits for the component effects. The Raw Benefit Results 3404 panel lists totals and percentages for only the Optimized Pricing component of benefit, labeled "Optimization Benefit" in the panel. The numbers in the "Optimization Benefit" row of the Raw Benefits Results panel 3404 are repeated in the "Optimized Pricing" row of the Effect Benefits Results 3406 panel.

Benefit Graph 3408 may provide a graphical representation of the benefit values along a time scale. In some embodiments, the individual component effects may be selected at the bottom of Benefit Graph 3408 for display on the graph. Each component effect may, in some embodiments, be colored in order to clearly illustrate benefits contributions. Additionally, graph sizing and unit of measurement may additionally be controlled by the User 2210, as is shown at the bottom of Benefit Graph 3408.

The embodiment of User Interface 2224 illustrated is non-exclusive. Additional tools and functionalities may be incorporated in the User Interface 2224 as is desired for improved functionality of general aesthetic. For example, in some embodiments, the User Interface 2224 may include a variety of graph representations, such as pie graphs for the data of Effect Benefits Results 3406.

Figure 35:
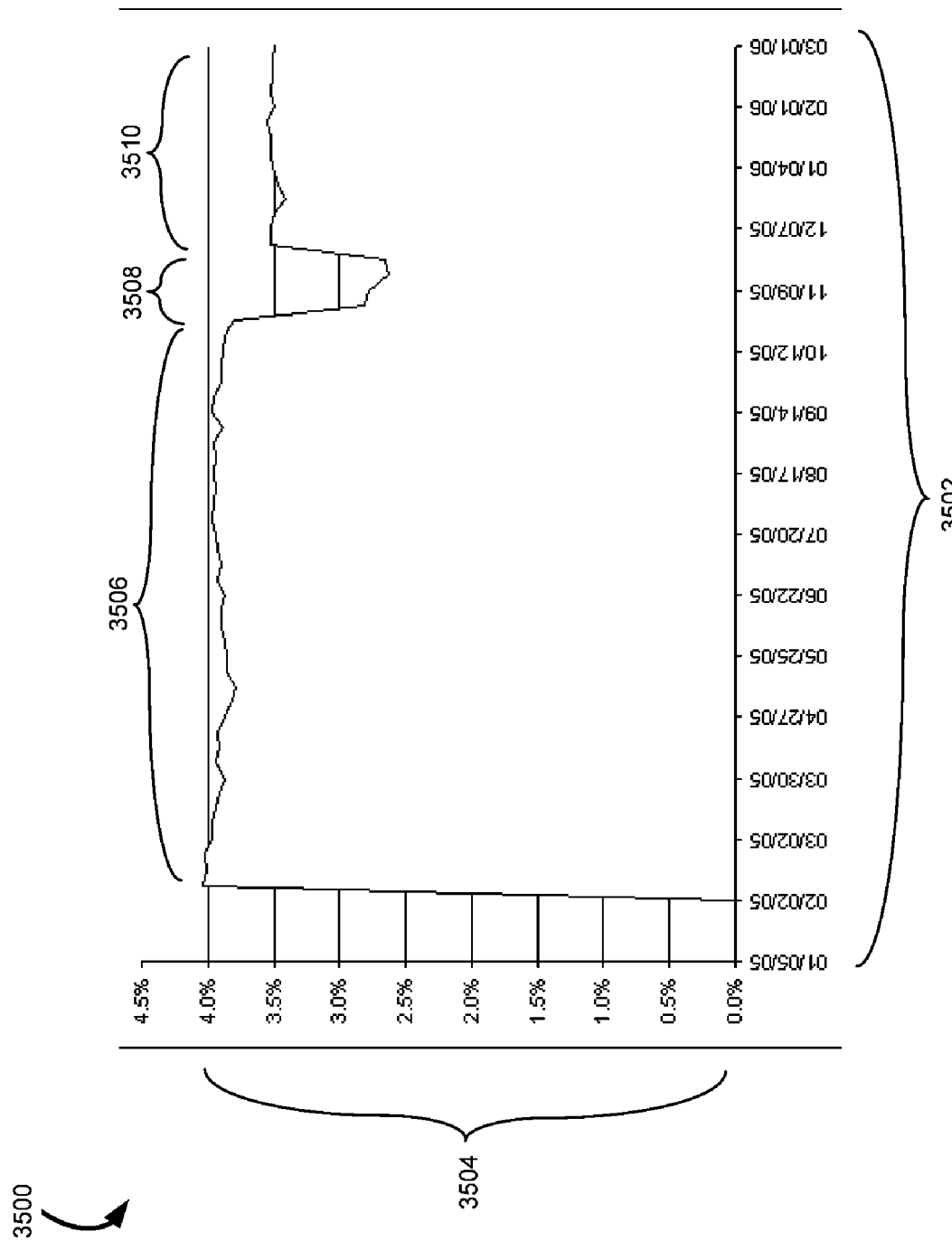
FIG. 35 shows an exemplary diagram illustrating benefits results in accordance with an embodiment of the present invention.

FIG. 35 shows an exemplary diagram illustrating benefits results shown generally at 3500. This diagram and the data contained are examples only and do not reflect actual data or limitations upon the present invention.

In this diagram the dates of analysis duration may be provided at Time scale Axis 3502. The benefits of the optimization are given at Benefit Axis 3504 in terms of percentage increases. The benefits of optimization may be seen beginning at the period starting with 3506. The period of time at 3506 maintains a relatively consistent benefit, which under stable circumstances is expected. At 3508 there is a drop in benefit. Such a drop in benefit may be the result of special activity such as unusual promotion activity around holidays, for example. However, at 3510 there is a decrease in benefit over pre-event levels. Such behavior is unexpected and warrants additional investigation and remedial measure by Store

124 and User 2210 to increase benefits to normal levels. As such it may be seen that benefit analysis by the MDA Engine 140 may aid in the business activity and decision making A. Differential Benefits Analysis Previously, various ways of cost handling were disclosed for the Merchandising Decomposition Analysis. The following chart provides a comparison between the disparate cost handling methodologies. In particular, the following chart illustrates how MDA would respond when the cost of a product increases but the price remains unchanged on a relatively inelastic product.

| Methodology | Profit | Revenue | Units (Volume) |
|---|---|---|---|
| Ignore Cost Analysis | Profit would remain the same since the price didn't change. | Revenue would remain the same. | Units would remain the same. |
| Comparative Cost Analysis | Profit would decrease since the item is less profitable than before implementation. | Revenue would remain the same since price didn't change. | Units would remain the same. | ignored. Thus, the MDA Profit Benefit for the example above, using Ignore Cost Analysis, is given by:

(Current Price − Current Cost) − (Old Price − Current Cost) =

($400 − $330) − ($450 − $330) = $70 − $120 = −$50

Likewise, MDA Revenue Benefit for the example above, using Ignore Cost Analysis, is given by:

(Current Price) − (Old Price) = $400 − $450 = −$50

The table below provides a detailed example of Benefits calculation using the ignore cost analysis. The product in this example is somewhat elastic, and as a result, its forecasted volume ("Units Frcst") moves inversely to Retail Price changes.

| UPC | Date | Period | Retail Price | Cost | Units Frcst | Profit @ Old Price | Profit @ Current Price | Profit Benefit |
|---|---|---|---|---|---|---|---|---|
| Product01 | Jan. 29, 2007 | Pre-Opt | $19.99 | $10.99 | 1000 | 9,000 | 9,000 | $— |
| Product01 | Feb. 5, 2007 | Opt | $20.99 | $10.99 | 950 | 9,000 | 9,500 | $500 |
| Product01 | Feb. 12, 2007 | Opt | $20.99 | $10.99 | 950 | 9,000 | 9,500 | $500 |
| Product01 | Feb. 19, 2007 | Opt | $20.99 | $10.99 | 950 | 9,000 | 9,500 | $500 |
| Product01 | Mar. 12, 2007 | Opt | $20.99 | $9.99 | 950 | 10,000 | 10,450 | $450 |
| Product01 | Mar. 19, 2007 | Opt | $20.99 | $9.99 | 950 | 10,000 | 10,450 | $450 |
| Product01 | Apr. 9, 2007 | Opt | $20.99 | $8.99 | 950 | 11,000 | 11,400 | $400 |
| Product01 | Apr. 16, 2007 | Opt | $20.99 | $8.99 | 950 | 11,000 | 11,400 | $400 |
| Product01 | Apr. 23, 2007 | Opt | $21.49 | $9.99 | 900 | 10,000 | 10,350 | $350 |
| Product01 | Apr. 30, 2007 | Opt | $21.49 | $9.99 | 900 | 10,000 | 10,350 | $350 |
| Product01 | May 7, 2007 | Opt | $22.49 | $9.99 | 850 | 10,000 | 10,625 | $625 |
| Product01 | May 14, 2007 | Opt | $22.49 | $9.99 | 850 | 10,000 | 10,625 | $625 |
| Product01 | May 21, 2007 | Opt | $20.49 | $9.99 | 975 | 10,000 | 10,238 | $238 |
| Product01 | May 28, 2007 | Opt | $20.49 | $9.99 | 975 | 10,000 | 10,238 | $238 |

-continued

| Methodology | Profit | Revenue | Units (Volume) |
|---|---|---|---|
| Cost Neutral Analysis | Profit would decrease since the item is less profitable than before implementation. | Revenue would decrease since the unchanged price is actually viewed as price drop below the neutral action. | Units would increase since the unchanged price is actually viewed as price drop below the neutral action. |

Figure 36:
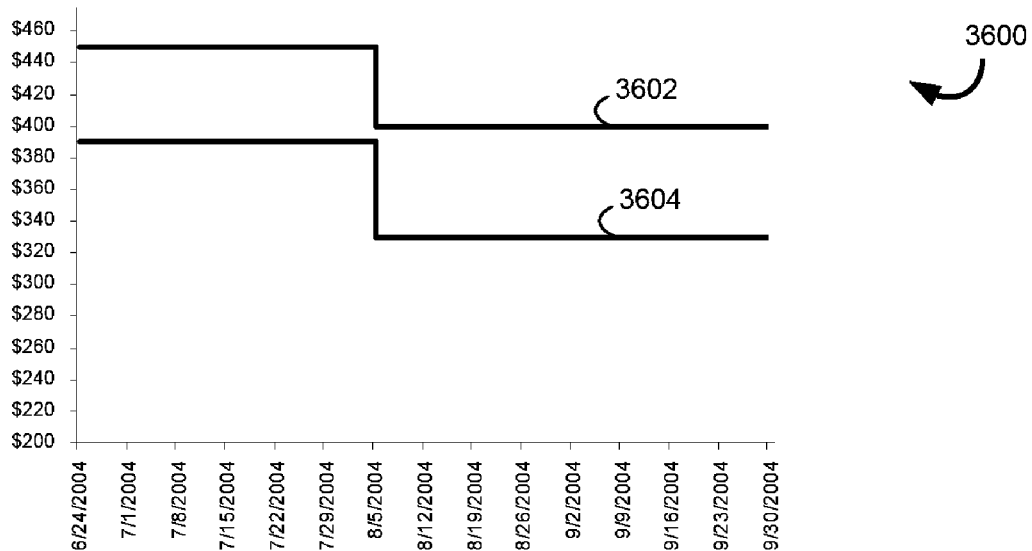
FIG. 36 illustrates an exemplary graph of a cost change scenario in accordance with an embodiment of the present invention.

FIG. 36 illustrates an exemplary graph of a cost change scenario, shown generally at 3600. For example, an item may sell for $450 and costs $390. This provides a 15% gross margin. If the cost then drops to $330 ($60 drop) and the price drops to $400 ($50 drop). The new margin is 21%. Price 3602 and Cost 3604 may be seen as graphed against time measurements.

Under the Differential Benefits Analysis Mode, any of the foregoing cost handling methodologies may be utilized.

1. Ignore Cost Analysis

Under the Ignore Cost Analysis, the difference between the forecasted volume at the Current Price and at the Old Price is The "Profit @ Old Price" is calculated as: F_Units(Pre-Opt Price)*(Pre-Opt Price−Cost), where: F_Units(Pre-Opt Price) is the forecasted volume at the Pre-Opt (Old) Price, Pre-Opt Price is the Retail Price of the product ($19.99) in the Pre-Optimization week of Jan-29 2007, Cost is the current cost in each week, and Under the Ignore Cost Analysis, the Forecasted Profit at the Old Price is based on the Pre-Optimization Price and the current Cost.

A simplifying assumption may be made that from week to week, the forecasted volume at the Pre-Opt Price, F_Units (Pre-Opt Price), will not change since Pre-Opt Price, which is a snapshot of the Retail Price just prior to the implementation of Optimized Prices in stores, remains fixed during the Post-Optimization weeks. In reality, the F_Units(Pre-Opt Price) could change from week to week even in the absence of Pre-Opt Price changes as a result of changes in assortment, seasonal purchasing patterns, promotions, and so on.

The "Profit @ Current Price" is calculated as: F_Units(Opt Price)*(Opt Price−Cost), where: F_Units(Opt Price) is the forecasted volume at the Opt (New) Price, Opt Price is the Retail Price of the product in each week. As this changes from week to week, so will the value of F_Units(Opt Price). Also, Cost represents the current cost of the product in each week.

The forecasted "Profit Benefit" under the "Ignore Cost-Handling" mode, taking changes in forecasts from different prices into account, is calculated as: Profit @ Current Price−

Profit @ Old Price=F_Units(Opt Price)*(Opt Price−Cost)−F_Units*(Pre-Opt Price)*(Pre-Opt Price−Cost) Under the Ignore Cost Analysis, the current Cost in each week is used in both the forecasted Profit @ Current Price and Profit @ Old Price.

Figure 37:
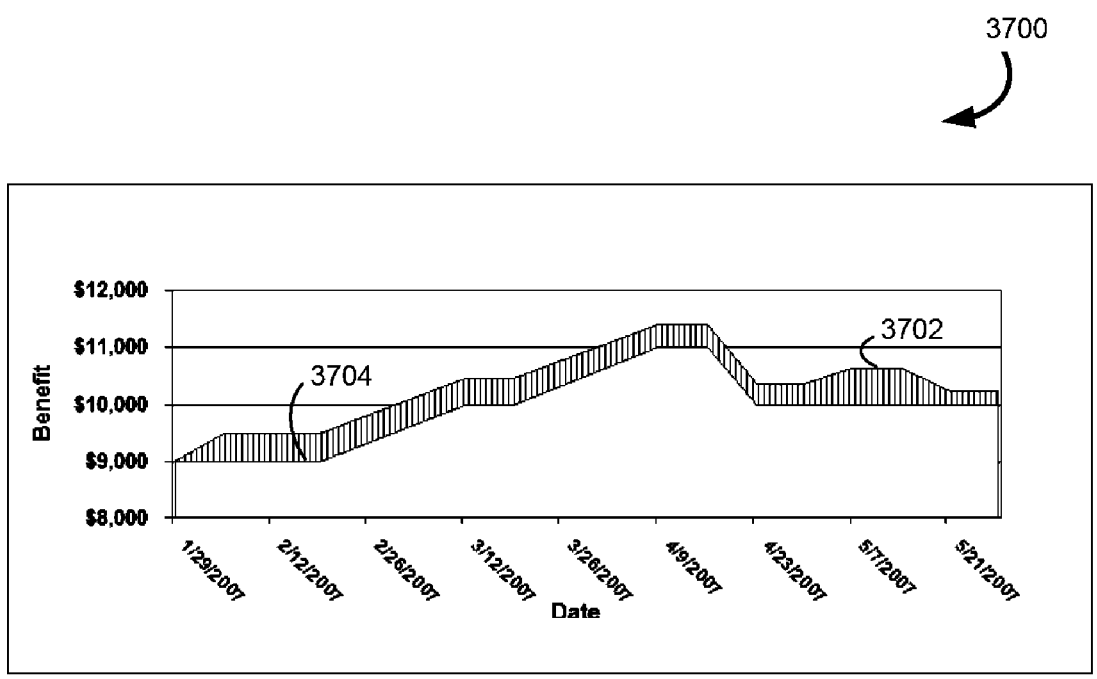
FIG. 37 illustrates an exemplary graph of the result of the benefit analysis using ignore costs analysis in accordance with an embodiment of the present invention.

FIG. 37 illustrates an exemplary graph of the result of the benefit analysis using ignore costs analysis, shown generally at 3700. Here the Profit Benefit 3702 may be seen exceeding the Profit at the old price 3704.

2. Comparative Cost Analysis

Under the Comparative Cost Analysis, the difference between the forecasted volume at the Current Price and at the Old Price is ignored. Thus, the MDA Profit Benefit for the example above, using Comparative Cost Analysis, would be given by:

(Current Price − Current Cost) − (Old Price − Current Cost) =

($400 − $330) − ($450 − $390) = $70 − $60 = +$10

Likewise, MDA Revenue Benefit for the example above, using Comparative Cost Analysis, is given by:

(Current Price) − (Old Price) = $400 − $450 = −$50

The table below provides a detailed example of Benefits calculation using the Comparative cost analysis.

| UPC | Date | Period | Retail Price | Cost | Units Frcst | Profit @ Old Price | Profit @ Current Price | Profit Benefit |
|---|---|---|---|---|---|---|---|---|
| Product01 | Jan. 29, 2007 | Pre-Opt | $19.99 | $10.99 | 1000 | $9,000 | $9,000 | $— |
| Product01 | Feb. 5, 2007 | Opt | $20.99 | $10.99 | 950 | $9,000 | $9,500 | $500 |
| Product01 | Feb. 12, 2007 | Opt | $20.99 | $10.99 | 950 | $9,000 | $9,500 | $500 |
| Product01 | Feb. 19, 2007 | Opt | $20.99 | $10.99 | 950 | $9,000 | $9,500 | $500 |
| Product01 | Mar. 12, 2007 | Opt | $20.99 | $9.99 | 950 | $9,000 | $10,450 | $1,450 |
| Product01 | Mar. 19, 2007 | Opt | $20.99 | $9.99 | 950 | $9,000 | $10,450 | $1,450 |
| Product01 | Apr. 9, 2007 | Opt | $20.99 | $8.99 | 950 | $9,000 | $11,400 | $2,400 |
| Product01 | Apr. 16, 2007 | Opt | $20.99 | $8.99 | 950 | $9,000 | $11,400 | $2,400 |
| Product01 | Apr. 23, 2007 | Opt | $21.49 | $9.99 | 900 | $9,000 | $10,350 | $1,350 |
| Product01 | Apr. 30, 2007 | Opt | $21.49 | $9.99 | 900 | $9,000 | $10,350 | $1,350 |
| Product01 | May 7, 2007 | Opt | $22.49 | $9.99 | 850 | $9,000 | $10,625 | $1,625 |
| Product01 | May 14, 2007 | Opt | $22.49 | $9.99 | 850 | $9,000 | $10,625 | $1,625 |
| Product01 | May 21, 2007 | Opt | $20.49 | $9.99 | 975 | $9,000 | $10,238 | $1,238 |
| Product01 | May 28, 2007 | Opt | $20.49 | $9.99 | 975 | $9,000 | $10,238 | $1,238 |

The "Profit @ Old Price" is calculated as: F_Units(Pre-Opt Price)*(Pre-Opt Price−Pre-Opt Cost) where: Pre-Opt Price is the Pre-Optimization (Old) Price of $19.99 in effect on the week of Jan. 29, 2007, Pre-Opt Cost is the Pre-Optimization (Old) Cost of $10.99 in effect on the week of Jan. 29, 2007.

A simplifying assumption may be made that from week to week, the forecasted volume at the Pre-Opt Price, F_Units (Pre-Opt Price), will not change since Pre-Opt Price, which is a snapshot of the Retail Price just prior to the implementation of Optimized Prices in stores, remains fixed during the Post-Optimization weeks. In reality, this forecasted volume could change even in the absence of Pre-Opt Price changes as result of changes in assortment, seasonal buying patterns, promotions, and so on. Because of the simplifying assumption, as well as the fact that the cost used in the "Profit @ Old Price" calculation is a fixed snapshot taken just prior to the implementation of Optimized Prices in stores, the "Profit @ Old Price" also does not change from week to week. In some embodiments such a simplification may not be utilized.

The "Profit @ Current Price" is calculated as: F_Units(Opt Price)*(Opt Price−Cost), where: F_Units(Opt Price) is the forecasted volume at the Opt (New) Price. Opt Price is the Retail Price of the product in each week. As this changes from week to week, so will the value of F_Units(Opt Price). Cost represents the current cost of the product in each week.

The forecasted "Profit Benefit" under the Comparative Cost Analysis, taking changes in forecasts into account, is calculated as: Profit @ Current Price−Profit @ Old Price=F_Units(Opt Price)*(Opt Price−Current Cost)−F_Units*(Pre-Opt Price)*(Pre-Opt Price−Pre-Opt Cost).

Under the Comparative Cost Analysis, the Current Cost in each week is used in the "Profit @ Current Price" calculation while the Pre-Opt Cost is used in the "Profit @ Old Price".

In this example, the Forecasted Profit Benefit under the Comparative Cost Analysis is greater than that of the Ignore Cost Analysis because cost changes during the Post-Optimization period are reflected in the Profit Benefit calculations. The reduction in the Post-Optimization Costs from the Pre-Optimization level ($10.99 down to $8.99 and $9.99) results in a larger delta between the Differential Benefit Analysis.

Figure 38:
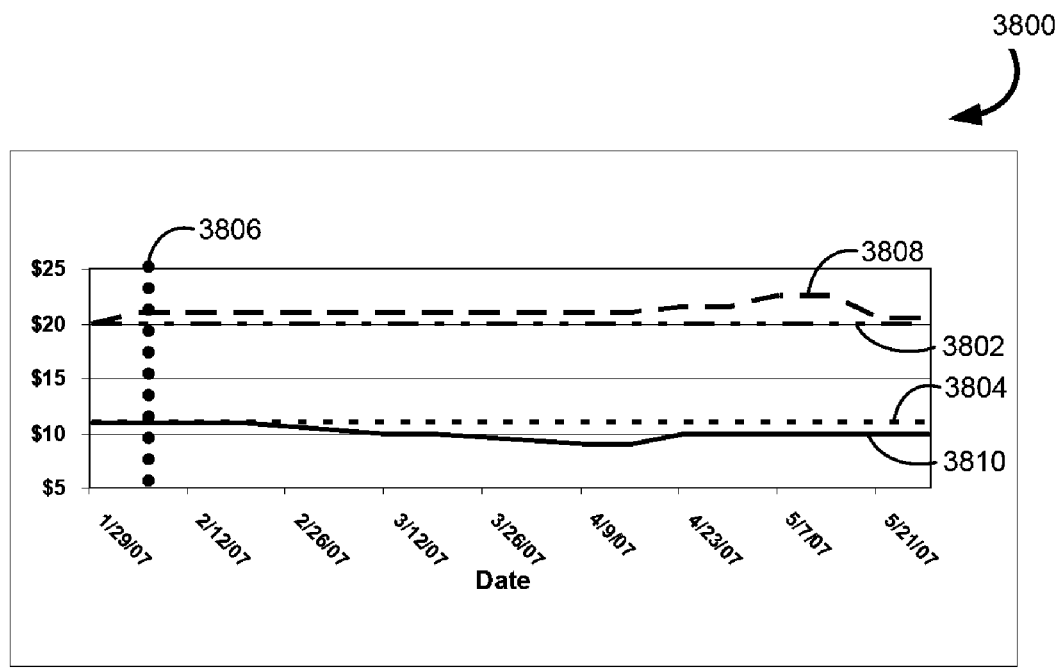
FIG. 38 illustrates an exemplary graph of old and current prices and costs used in comparative cost analysis in accordance with an embodiment of the present invention.

FIG. 38 illustrates an exemplary graph of old and current prices and costs used in comparative cost analysis, shown generally at 3800. The Old or Pre-Opt Prices 3802 and Costs 3804 are snapshots of the Prices and Costs just prior to the implementation of Optimized Prices in stores on Feb-05 2007, shown at 3806. Additionally, Current Price 3808 and Current Costs 3810 are illustrated.

Figure 39:
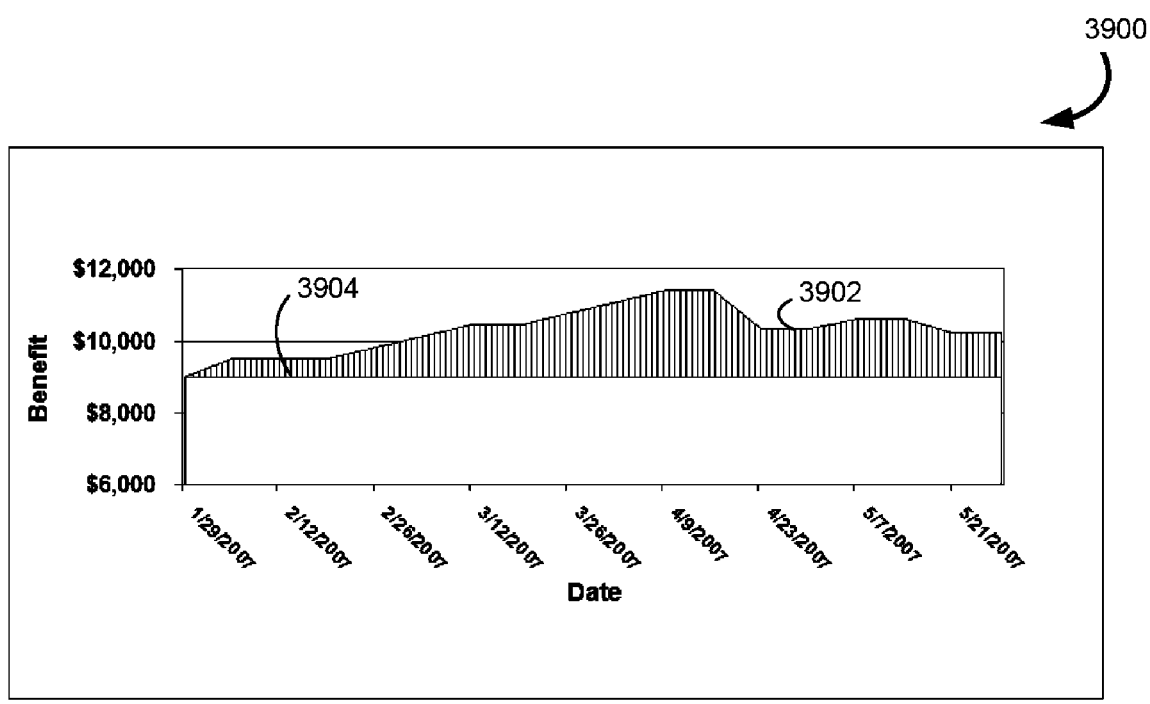
FIG. 39 illustrates an exemplary graph of profit benefit under differential analysis with cost comparative analysis in accordance with an embodiment of the present invention.

FIG. 39 illustrates an exemplary graph of Profit Benefit under Differential Analysis with Cost Comparative Analysis, shown generally at 3900. Here the Profit Benefit 3902 may be seen exceeding the Profit at the old price 3904.

The delta between the "Profit @ New Price" and "Profit @ Old Price" is larger under Comparative Cost Analysis than under the Ignore Cost Analysis. Below is a comparison of the Ignore Cost Analysis and the Comparative Cost Analysis.

| 3. Cost Neutral Analysis | | |
|---|---|---|
| Method | Pros | Cons |
| Ignore Cost Analysis | Works well when merchants do not respond to vendor cost changes Only measures what DT directly controls: price changes | Understates or overstates benefits when costs change and merchants do respond |
| Comparative Cost Analysis | Works well when merchants do respond to vendor cost changes Highlights negative impact when merchants do not respond to cost increases | Understates or overstates benefits when costs change and merchants do not respond Requires accurate, complete, and consistent costs in historical TPV (POS) |

Figure 40:
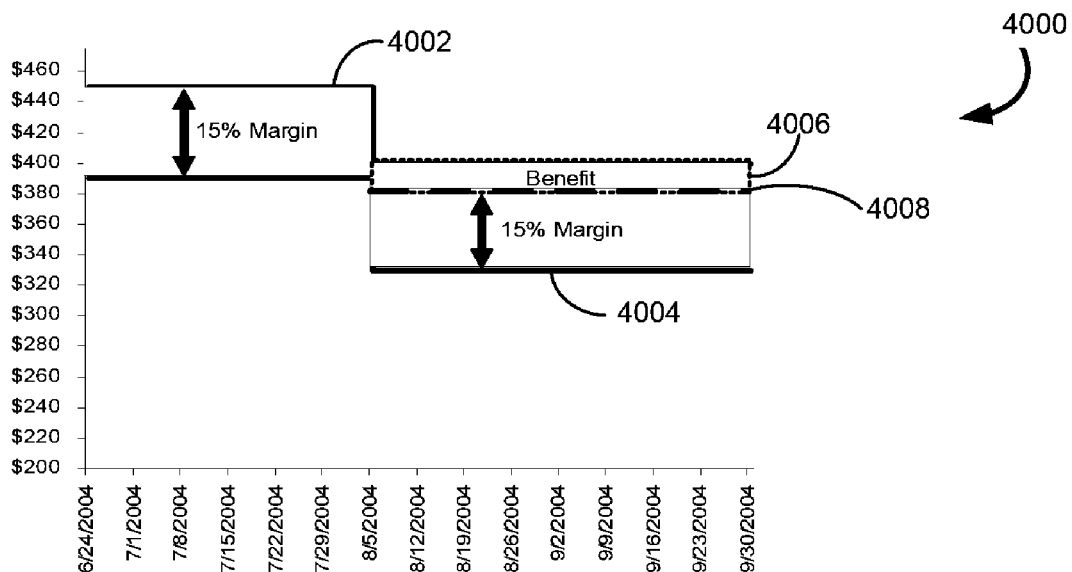
FIG. 40 illustrates an exemplary graph of the cost neutral analysis in accordance with an embodiment of the present invention.

Under the Cost Neutral Analysis, the difference between the forecasted volume at the Current Price and at the Old Price is ignored. FIG. 40 illustrates an exemplary graph of the cost neutral analysis, shown generally at 4000. The Price 4002 and Cost 4004 drop. Under Cost Neutral Analysis, the Neutral Point 4008 is identified by maintaining margin of 15% before and the cost dropped $60 by lowering the price. Lowering the price by $50 from $450 to $400, as in this example, is thus a profit positive action, as it results in a 21% gross margin. Thus the remainder is Benefit 4006.

Thus, the MDA Profit Benefit for the example above, using Cost Neutral Analysis, would be given by:

$$MDA \text{ Profit Benefit} = CurPrice - \left(\frac{OldPrice}{OldCost} \times CurCost\right)$$

$$= \$400 - \left(\frac{\$450}{\$390} \times \$330\right) = \$400 - (1.15 \times \$330)$$

$$= \$400 - \$381 = \$19$$

Here is another example using Cost Neutral Analysis when there is a cost increase and constant price. In this example, cost increased from $330 to $390 (+$60), and price stayed constant at $400.

$$\text{Profit} = CurPrice - \left(\frac{OldPrice}{OldCost} \times CurCost\right) = \$400 - \left(\frac{\$400}{\$330} \times \$390\right)$$

MDA Profit Benefit=$400−(1.21×$390)=$400− $472=−$72

The table below provides a detailed example of Benefits calculation using the Cost Neutral analysis.

| UPC | Date | Period | Retail Price | Cost | Units Frcst | Cost-Adjusted Old Price | Units Frcst @ Cost-Adj Old Price | Profit @ Cost-Adj Old Price | Profit @ Current Price | Profit Benefit |
|---|---|---|---|---|---|---|---|---|---|---|
| Product01 | Jan. 29, 2007 | Pre-Opt | $19.99 | $10.99 | 1000 | $19.99 | 1000 | $9,000 | $9,000 | $— |
| Product01 | Feb. 5, 2007 | Opt | $20.99 | $10.99 | 950 | $19.99 | 1000 | $9,000 | $9,500 | $500 |
| Product01 | Feb. 12, 2007 | Opt | $20.99 | $10.99 | 950 | $19.99 | 1000 | $9,000 | $9,500 | $500 |
| Product01 | Feb. 19, 2007 | Opt | $20.99 | $10.99 | 950 | $19.99 | 1000 | $9,000 | $9,500 | $500 |
| Product01 | Mar. 12, 2007 | Opt | $20.99 | $9.99 | 950 | $18.17 | 1100 | $8,999 | $10,450 | $1,451 |
| Product01 | Mar. 19, 2007 | Opt | $20.99 | $9.99 | 950 | $18.17 | 1100 | $8,999 | $10,450 | $1,451 |
| Product01 | Apr. 9, 2007 | Opt | $20.99 | $8.99 | 950 | $16.35 | 1250 | $9,203 | $11,400 | $2,197 |
| Product01 | Apr. 16, 2007 | Opt | $20.99 | $8.99 | 950 | $16.35 | 1250 | $9,203 | $11,400 | $2,197 |
| Product01 | Apr. 23, 2007 | Opt | $21.49 | $9.99 | 900 | $18.17 | 1100 | $8,999 | $10,350 | $1,351 |
| Product01 | Apr. 30, 2007 | Opt | $21.49 | $9.99 | 900 | $18.17 | 1100 | $8,999 | $10,350 | $1,351 |
| Product01 | May 7, 2007 | Opt | $22.49 | $9.99 | 850 | $18.17 | 1100 | $8,999 | $10,625 | $1,626 |
| Product01 | May 14, 2007 | Opt | $22.49 | $9.99 | 850 | $18.17 | 1100 | $8,999 | $10,625 | $1,626 |
| Product01 | May 21, 2007 | Opt | $20.49 | $9.99 | 975 | $18.17 | 1100 | $8,999 | $10,238 | $1,238 |
| Product01 | May 28, 2007 | Opt | $20.49 | $9.99 | 975 | $18.17 | 1100 | $8,999 | $10,238 | $1,238 |

The "Cost-Adjusted Old Price," also referred to as the Relative Old Price, is calculated as: Pre-Opt Price*(Cost/Pre-Opt Cost), where: Pre-Opt Price is the Retail Price just prior to the implementation of Optimized Prices in stores ($19.99), Cost is the current Cost in effect in each week, and Pre-Opt Cost is the Cost just prior to implementation of Optimized Prices ($10.99).

The "Units Frcst @ Cost-Adj Old Price" is the volume forecast at the Cost-Adjusted Old Price. Since the product in this example is assumed to be somewhat elastic, this forecast moves inversely to changes in the Cost-Adjusted Old Price, which in turn fluctuates in response to weekly cost changes.

"Profit @ Cost-Adj Old Price" is calculated as: F(Cost-Adj Old Price)*(Cost-Adj Old Price−Cost), where: F(Cost-Adj Old Price) is the forecasted volume at the Cost-Adjusted Old Price (as found in the "Units Frcst @ Cost-Adj Old Price" column), Cost-Adj Old Price is the Cost-Adjusted Old (Pre-Opt) Price as defined above, and Cost is the current Cost in each week.

The "Profit @ Current Price" is calculated as: F_Units(Opt Price)*(Opt Price−Cost), where: F_Units(Opt Price) is forecasted volume at the Optimized or New Price, Opt Price is the Optimized or New Price, and Cost is the current Cost in each week.

The forecasted "Profit Benefit" is calculated as: Profit @ Current Price−Profit @ Cost-Adj Old Price=F_Units(Opt Price)*(Opt Price−Current Cost)−F_Units*(Cost-Adj Old Price)*(Cost-Adj Old Price−Current Cost). Under the Cost-Neutral Analysis, the Current Cost is used in both the Profit @ Current Price and Profit @ Cost-Adj Old Price calculations. Cost changes are reflected in the use of the Cost-Adjusted Old Price in the Profit @ Cost-Adj Old Price formula.

In this example, the forecasted Profit Benefit under the Cost-Neutral Analysis is greater than that of the Ignore Cost Analysis because cost changes during the Post-Optimization period are reflected in the Profit Benefit calculations. The reduction in the weekly cost to $8.99 and $9.99 results in a lower Pre-Opt or Old Price in the "Profit @ Old Price" calculation, which, along with assumed elasticity for the product as reflected in the forecasted volume at the Old Price, results in a lower forecasted Profit @ Old Price under the Cost-Neutral mode and thus a higher forecasted Profit Benefit.

Figure 41:
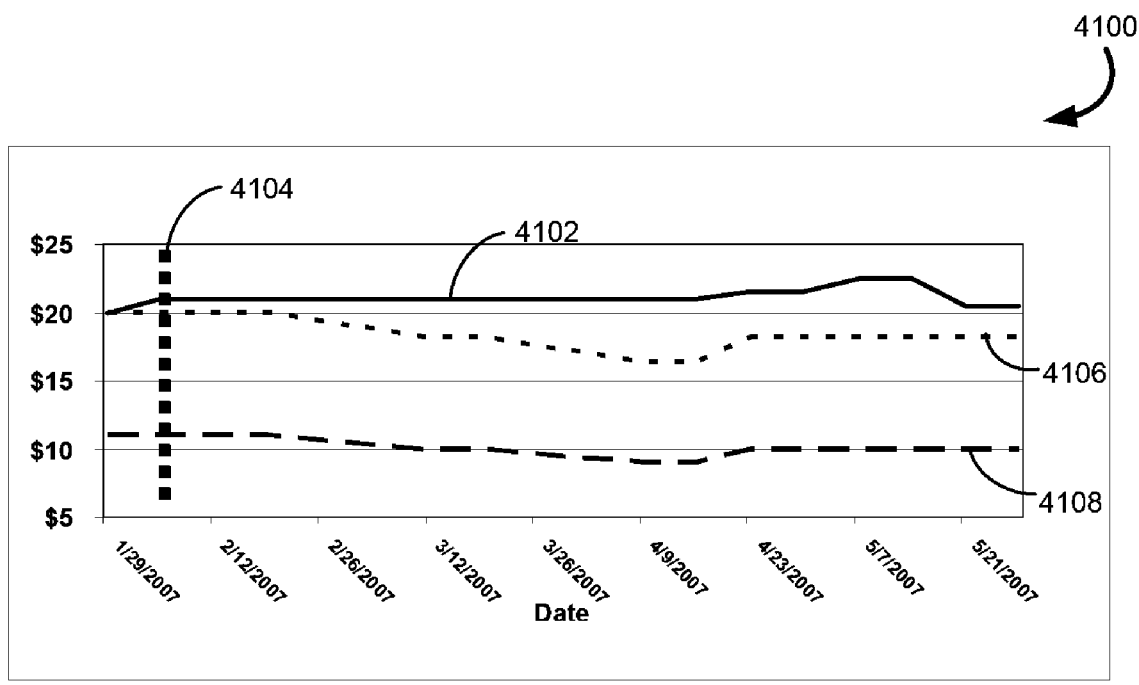
FIG. 41 illustrates a graph showing plots of old and current prices and costs used in cost neutral analysis in accordance with an embodiment of the present invention.

FIG. 41 illustrates a graph showing plots of Old and Current Prices and Costs used in Cost Neutral Analysis, shown generally at 4100. The Cost-Adjusted Old Price 4106 is a function of the currently weekly Cost 4108 and is intended to capture what the Old Price 4102 would have been in light of cost changes, assuming the same Gross Margin % as the one in effect during the Pre-Optimization period. 4102 illustrates the point of optimization.

Figure 42:
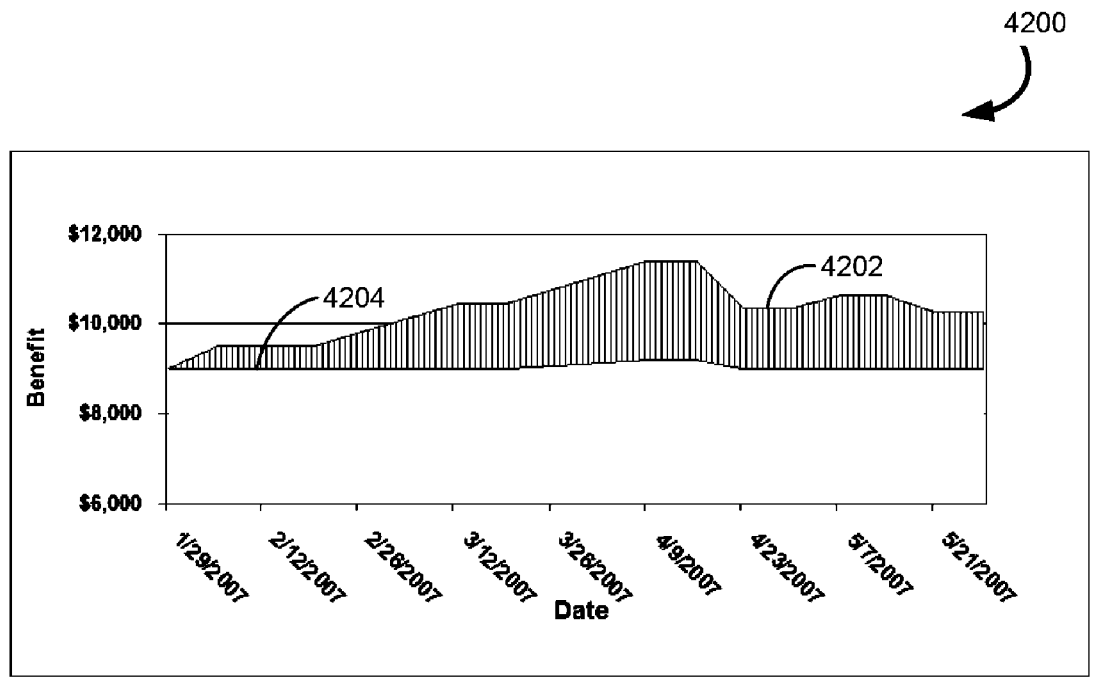
FIG. 42 illustrates the profit benefit under cost-neutral analysis for differential benefit analysis for the example in accordance with an embodiment of the present invention.

FIG. 42 illustrates the Profit Benefit under Cost-Neutral Analysis for Differential Benefit Analysis for the example, shown generally at 4200. Benefit 4202 may be seen over the old profit 4204. The Profit @ Cost-Adjusted Old Price fluctuates under the Cost-Neutral mode due to changes in the weekly Cost, which are reflected in varying Cost-Adjusted Old Prices.

B. Authorized Benefits Analysis

In the authorized benefits analysis benefits are only reported when SKUs are actually selling at the optimized price. In some implementation of this measurement mode, the Ignore Cost Changes cost-handling mode will be the default way to address cost changes, but alternate cost-handling modes may be used as well.

An example of the authorized benefits analysis is as follows: Prior to the implementation of optimized prices, SKU A is selling at a price of $18. The authorized price change window for SKU A is specified to be the period starting on Feb-01 and ending Feb 28. Benefits for SKU A will start to accrue after Feb-01 based on the product's retail prices during this month. Price changes that occur after Feb 28 will be regarded as unauthorized.

If the price of an inelastic SKU undergoes the following changes:

increase from $18 to $18.50 on Feb-01
increase from $18.50 to $19 on Feb-28
increase from $19 to $20 on May-01
decrease from $20 to $18 on July-01 then the following will occur, assuming that the Ignore Cost analysis is in effect and that the SKU is inelastic (so that the forecasted volumes at different price points can be assumed to all be the same):

$18 will be regarded as the old or pre-optimization price

Between Feb-01 and Feb-28, $18.50 will be regarded as the new or recommended price From Feb-28 onward, $19 will be regarded as the recommended or new price Between Feb-01 and Feb-28, this SKU will generate $0.50 in profit to the Optimized Pricing benefit bucket per unit sold Starting from Feb-28 until May-01, this SKU will generate $1 in profit to the Optimized Pricing benefit bucket per unit sold From May-01 to July-01, this SKU will continue to generate $1 profit benefit per unit sold, but will also contribute +$1 to the Non-Compliance profit bucket since it is selling at $1 above the recommended price From July-01 onward, the SKU will contribute $0 to the benefit profit bucket and −$1 to the Non-Compliance profit bucket, as it is selling at $1 below the recommended price The table below provides another detailed example of benefits calculation using authorization analysis.

| UPC | Date | Period | Auth Window | Retail Price | Cost | Units Frcst | Profit @ Old Price | Profit @ Old Price | Profit @ Current Price | Profit Benefit | Profit Non-Compl |
|---|---|---|---|---|---|---|---|---|---|---|---|
| Product01 | Jan. 29, 2007 | Pre-Opt | No | $19.99 | $10.99 | 1000 | 9,000 | 9,000 | 9,000 | $— | $— |
| Product01 | Feb. 5, 2007 | Opt | Yes | $20.99 | $10.99 | 950 | 9,000 | 9,500 | 9,500 | $500 | $— |
| Product01 | Feb. 12, 2007 | Opt | Yes | $20.99 | $10.99 | 950 | 9,000 | 9,500 | 9,500 | $500 | $— |
| Product01 | Feb. 19, 2007 | Opt | Yes | $20.99 | $10.99 | 950 | 9,000 | 9,500 | 9,500 | $500 | $— |
| Product01 | Mar. 12, 2007 | Opt | Yes | $20.99 | $9.99 | 950 | 10,000 | 10,450 | 10,450 | $450 | $— |
| Product01 | Mar. 19, 2007 | Opt | Yes | $20.99 | $9.99 | 950 | 10,000 | 10,450 | 10,450 | $450 | $— |
| Product01 | Apr. 9, 2007 | Opt | Yes | $20.99 | $8.99 | 950 | 11,000 | 11,400 | 11,400 | $400 | $— |
| Product01 | Apr. 16, 2007 | Opt | Yes | $20.99 | $8.99 | 950 | 11,000 | 11,400 | 11,400 | $400 | $— |
| Product01 | Apr. 23, 2007 | Opt | Yes | $21.49 | $9.99 | 900 | 10,000 | 10,350 | 10,350 | $350 | $— |
| Product01 | Apr. 30, 2007 | Opt | Yes | $21.49 | $9.99 | 900 | 10,000 | 10,350 | 10,350 | $350 | $— |
| Product01 | May 7, 2007 | Opt | No | $22.49 | $9.99 | 850 | 10,000 | 10,350 | 10,625 | $350 | $275.00 |
| Product01 | May 14, 2007 | Opt | No | $22.49 | $9.99 | 850 | 10,000 | 10,350 | 10,625 | $350 | $275.00 |
| Product01 | May 21, 2007 | Opt | No | $20.49 | $9.99 | 975 | 10,000 | 10,350 | 10,238 | $350 | $(112.50) |
| Product01 | May 28, 2007 | Opt | No | $20.49 | $9.99 | 975 | 10,000 | 10,350 | 10,238 | $350 | $(112.50) |

The "Auth Window" column indicates whether each week falls within the Authorized Window during which Retail Price changes are allowed. Only Retail Prices changes falling within the Authorized Window are reflected in the Optimized Price stream. The Optimized Price in effect at the end of the window is carried forward and treated as the Optimized Price in the post-window weeks.

In the post-Authorized Window weeks, retail prices that differ from the last Retail Price in effect at the end of the window will be considered non-compliant and will contribute to the Non-Compliance Profit.

In this example, the cost-handling mode is assumed to be Ignore Cost Analysis, which will be the default mode used in the Authorized Window methodology. Thus, the Profit @ Old Price is calculated as: F_Units(Pre-Opt Price)*(Pre-Opt Price−Cost), where: Pre-Opt Price is the price in effect immediately before the implementation date ($19.99), and Cost is the current cost in effect in each week.

During the Authorized Window, the Opt Price used in the Profit @ Opt Price calculation is simply the Retail Price. In the post-Authorized Window weeks, the Opt Price used in the calculation is the most recent Retail Price in effect during the window ($21.49 in this example).

The Profit Non-Compliance measure indicates how much additional profit is gained or lost as a result of charging Non-Compliant Retail Prices, or retail prices that differ from the official Optimized Price. It is calculated as: F_Units(Retail Price)* (Retail Price−Cost)−F_Units(Opt Price)*(Opt Price−Cost), where: F_Units(Retail Price) is the volume forecast at the Retail Price, F_Units(Opt Price) is the volume forecast at the Optimized Price, Opt Price, and Cost is the weekly current Cost.

By definition, Profit Non-Compliance will equal 0 during the Authorized Window, as the Opt Price will equal the Retail Price during these weeks. In the post-Window weeks, the Non-Compliance Profit will reflect the difference between the Retail Price and the last Retail Price in effect during the window.

Figure 43:
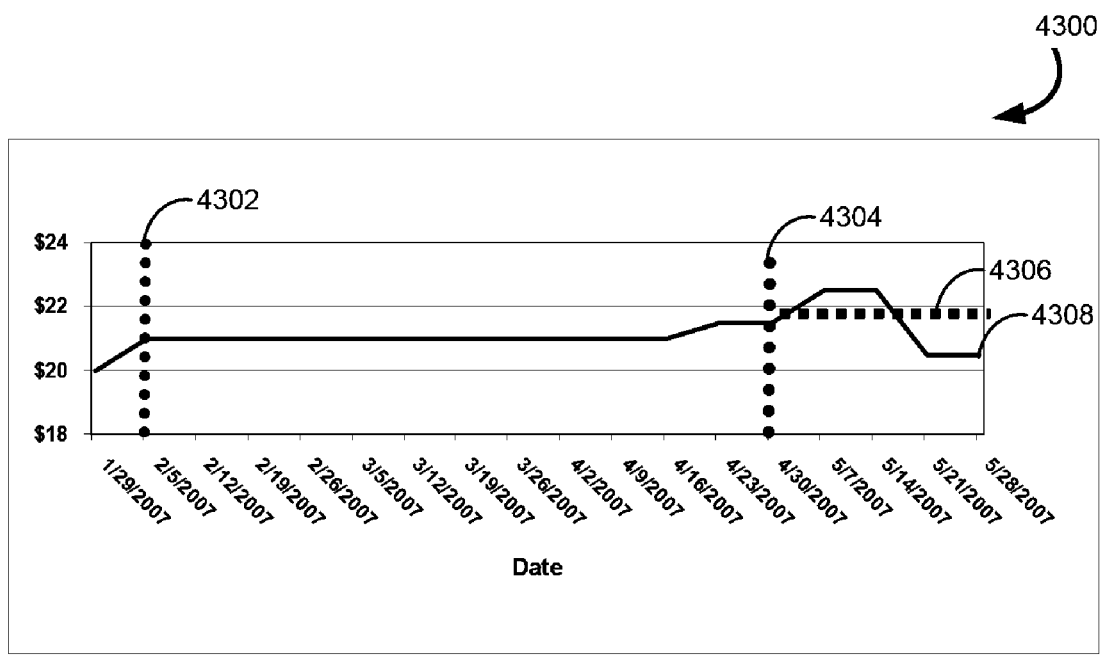
FIG. 43 illustrates a graph illustrating price changes within authorized window in accordance with an embodiment of the present invention.

FIG. 43 illustrates a graph illustrating price changes within authorized window, shown generally at 4300. Retail Prices 4308 in effect during the Authorized Window are treated as Optimized Prices. The Authorized window begins at 4302 and ends at 4304. In the post-window weeks, differences between the current Retail Price 4308 and the last Retail Price 4206 in effect during the window ($21.49) contribute to the Non-Compliance Volume, Equivalent Volume, Revenue, and Profit measures.

Figure 44:
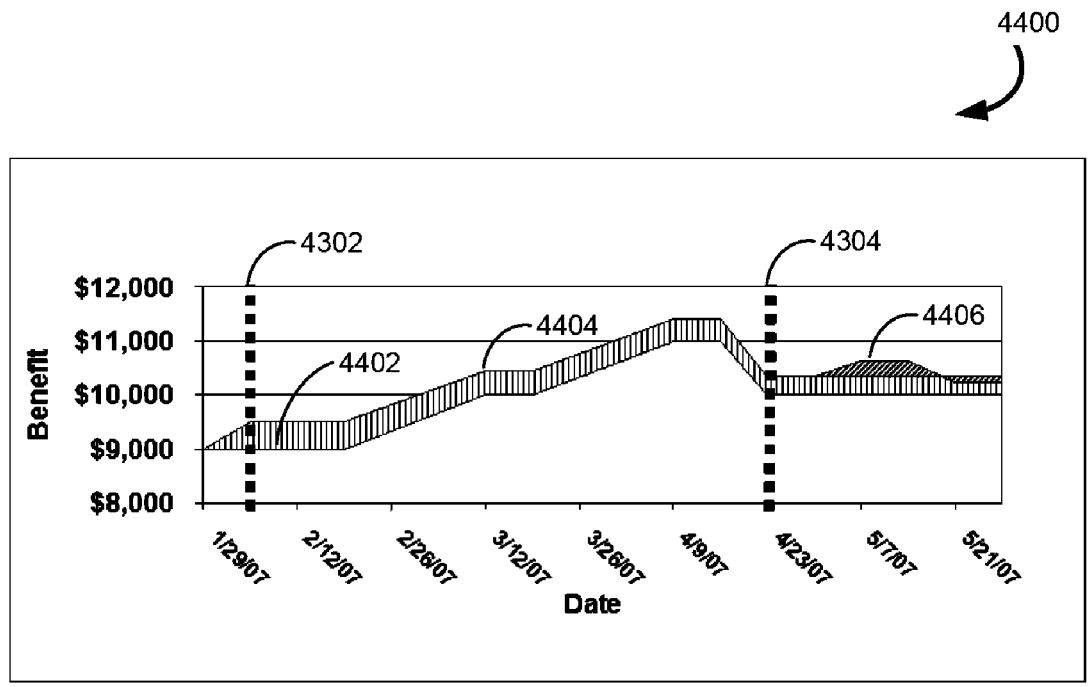
FIG. 44 illustrates an exemplary graph showing authorized analysis for benefit in accordance with an embodiment of the present invention.

FIG. 44 illustrates an exemplary graph showing authorized analysis for benefit, shown generally at 4400. Again, the authorized window begins at 4302 and ends at 4304. Benefit 4404 may be seen as greater than pre-optimization Profit 4402. Non-Compliance Profit 4406 also may be seen. The Retail Price changes that occur after the end of the Authorized Window result in a non-zero Non-Compliance Profit band during the last month of the reported period below.

C. Testable Benefits Analysis

The Testable Benefits Analysis compares the sales of two or more similar stores under disparate pricing in order to generate benefits data. For an example given here, assume that there is a single test store and a single control store, both of which were selected either by an analyst or in an automated way so as to ensure that the sales patterns in the two stores are as similar to one another as possible. Additionally, assume that on March $1^{st}$, optimized prices are implemented only in the Test store. Prices in the Control store continue to be set according to the retailer's usual strategies, which do not involve price optimization.

Below is shown how, for this example, the weekly raw forecasted profit benefit for a given product might be calculated if the product underwent the following retail price and cost changes in the Test and Control stores on the dates listed below. In this example, we assume that the product in question is somewhat elastic so that its forecasted volume has minor fluctuations in response to price changes.

| Date | Test Store Price | Control Store Price | Test Store Cost | Forecasted Units at Test Price | Forecasted Units at Control Price | Forecasted Profit at Test Price | Forecasted Profit at Control Price | Forecasted Profit Benefit |
|---|---|---|---|---|---|---|---|---|
| Mar. 01, 2007 | $54.99 | $49.99 | $32.99 | 1,000 | 1,200 | $22,000 | $20,400 | $1,600 |
| Jul. 01, 2007 | $54.99 | $53.49 | $33.99 | 1,000 | 1,050 | $21,000 | $20,475 | $525 |
| Sep. 01, 2007 | $52.99 | $53.49 | $33.99 | 1,100 | 1,050 | $20,900 | $20,475 | $425 |

The price in the Test store ("Test Store Price") is regarded as the new or optimized price, while the price in the Control store ("Control Store Price") is regarded as the old price. Thus, under the Testable benefits analysis, the "pre-optimization" prices actually occur during the time period in which price optimization has been implemented in the test store(s).

In this example, the volume forecasts at the Test store and Control store prices are calculated using the model coefficients specific to the given product and the Test store. The "Forecasted Units at Control Price" and "Forecasted Profit at Control Price" represent forecasts of the volume and profit the Test store would have generated had it implemented the Control store's prices for the product.

Moreover, the "Forecasted Profit Benefit" is calculated as the difference between the Forecasted Profit at Test Price and Forecasted Profit at Control Price. This forecasted benefit represents the weekly benefit that would accrue from this product at the specified Old/New Prices and Costs.

The table below provides another detailed example of benefits calculation using Testable analysis.

| UPC | Date | Period | Test Store Price | Control Store Price | Test Store Cost | Units Frcst @ Test Price | Units Frcst @ Control Price | Profit @ Test Price | Profit @ Control Price | Profit Benefit |
|---|---|---|---|---|---|---|---|---|---|---|
| Product01 | Jan. 29, 2007 | Pre-Opt | $19.99 | $17.99 | $10.99 | 1000 | 1100 | 9,000 | 7,700 | $— |
| Product01 | Feb. 5, 2007 | Opt | $20.99 | $18.99 | $10.99 | 950 | 1050 | 9,500 | 8,400 | $1,100 |
| Product01 | Feb. 12, 2007 | Opt | $20.99 | $18.99 | $10.99 | 950 | 1050 | 9,500 | 8,400 | $1,100 |
| Product01 | Feb. 19, 2007 | Opt | $20.99 | $18.99 | $10.99 | 950 | 1050 | 9,500 | 8,400 | $1,100 |
| Product01 | Mar. 12, 2007 | Opt | $20.99 | $18.99 | $9.99 | 950 | 1050 | 10,450 | 9,450 | $1,000 |
| Product01 | Mar. 19, 2007 | Opt | $20.99 | $18.99 | $9.99 | 950 | 1050 | 10,450 | 9,450 | $1,000 |

-continued

| UPC | Date | Period | Test Store Price | Control Store Price | Test Store Cost | Units Frcst @ Test Price | Units Frcst @ Control Price | Profit @ Test Price | Profit @ Control Price | Profit Benefit |
|---|---|---|---|---|---|---|---|---|---|---|
| Product01 | Apr. 9, 2007 | Opt | $20.99 | $20.99 | $8.99 | 950 | 950 | 11,400 | 11,400 | $— |
| Product01 | Apr. 16, 2007 | Opt | $20.99 | $20.99 | $8.99 | 950 | 950 | 11,400 | 11,400 | $— |
| Product01 | Apr. 23, 2007 | Opt | $21.49 | $19.49 | $9.99 | 900 | 1025 | 10,350 | 9,738 | $613 |
| Product01 | Apr. 30, 2007 | Opt | $21.49 | $19.49 | $9.99 | 900 | 1025 | 10,350 | 9,738 | $613 |
| Product01 | May 7, 2007 | Opt | $22.49 | $19.49 | $9.99 | 850 | 1025 | 10,625 | 9,738 | $888 |
| Product01 | May 14, 2007 | Opt | $22.49 | $19.49 | $9.99 | 850 | 1025 | 10,625 | 9,738 | $888 |
| Product01 | May 21, 2007 | Opt | $20.49 | $19.49 | $9.99 | 975 | 1025 | 10,238 | 9,738 | $500 |
| Product01 | May 28, 2007 | Opt | $20.49 | $19.49 | $9.99 | 975 | 1025 | 10,238 | 9,738 | $500 |

The "Test Store Price" and "Control Store Price" denote the Retail Price in effect in the Test Store and Control Store, respectively, in each week. In the Test/Control mode, the Test Store Prices are regarded as the New or Optimized Prices while the Control Store Prices are regarded as the Old or Pre-Optimized Prices.

The forecasts calculated under the Test/Control mode are all based on the coefficients for Product01 in the Test Store only. For example, the "Units Frcst @ Test Price" is the forecasted volume for Product01 in the Test Store at the "Test Store Price." The "Units Frcst @ Control Price" is the forecasted volume for Product01 in the Test Store at the "Control Store Price."

The "Profit @ Test Price" is calculated as: F_Units(Test Price)*(Test Price−Test Cost), and the "Profit @ Control Price" is calculated as: F_Units(Control Price)*(Control Price−Test Cost), where: F_Units(Test Price) and F_Units (Control Price) are the volume forecasts in the Test Store at the Test and Control Prices, respectively, and Test Cost is the weekly Cost of Product01 in the Test Store.

The Profit Benefit is calculated as: Profit @ Test Price− Profit @ Control Price. In the Pre-Optimization weeks, the Profit Benefit is assumed to be $0, as there is no concern about differences between the Test and Control Store Prices until Optimized Prices are actually implemented in the Test Store.

Figure 45:
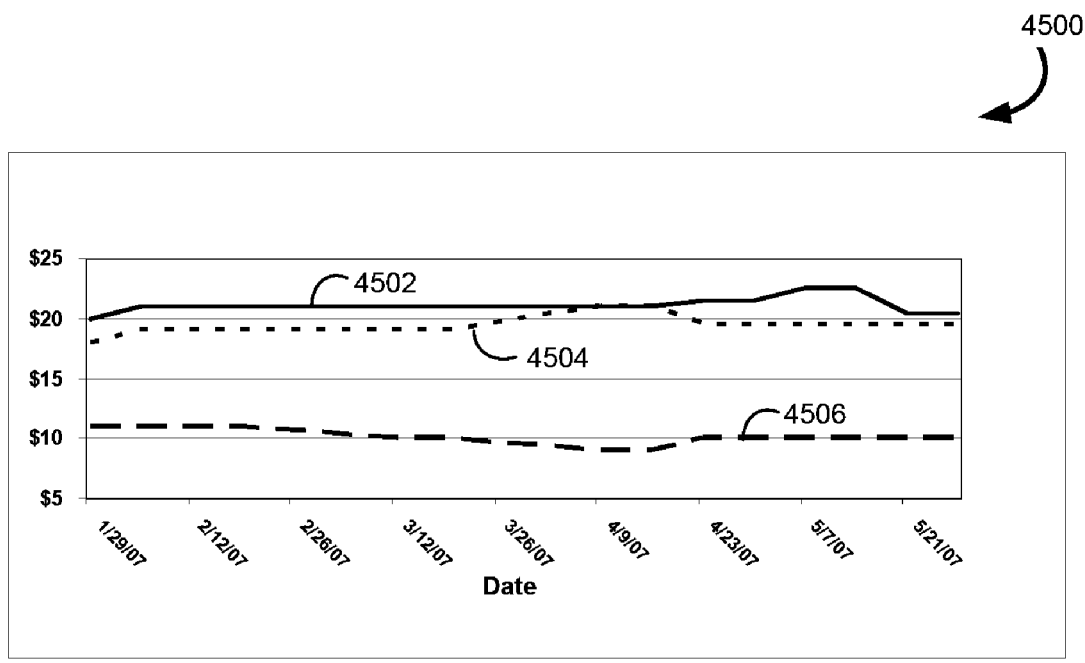
FIG. 45 illustrates an exemplary graph showing old and new prices and cost under testable benefits analysis in accordance with an embodiment of the present invention.

FIG. 45 illustrates an exemplary graph showing old and new prices and cost under testable benefits analysis, shown generally at 4500. The Test Prices 4502 are seen as compared to the Control Prices 4504. Both test and control stores share a common Cost 4506.

Figure 46:
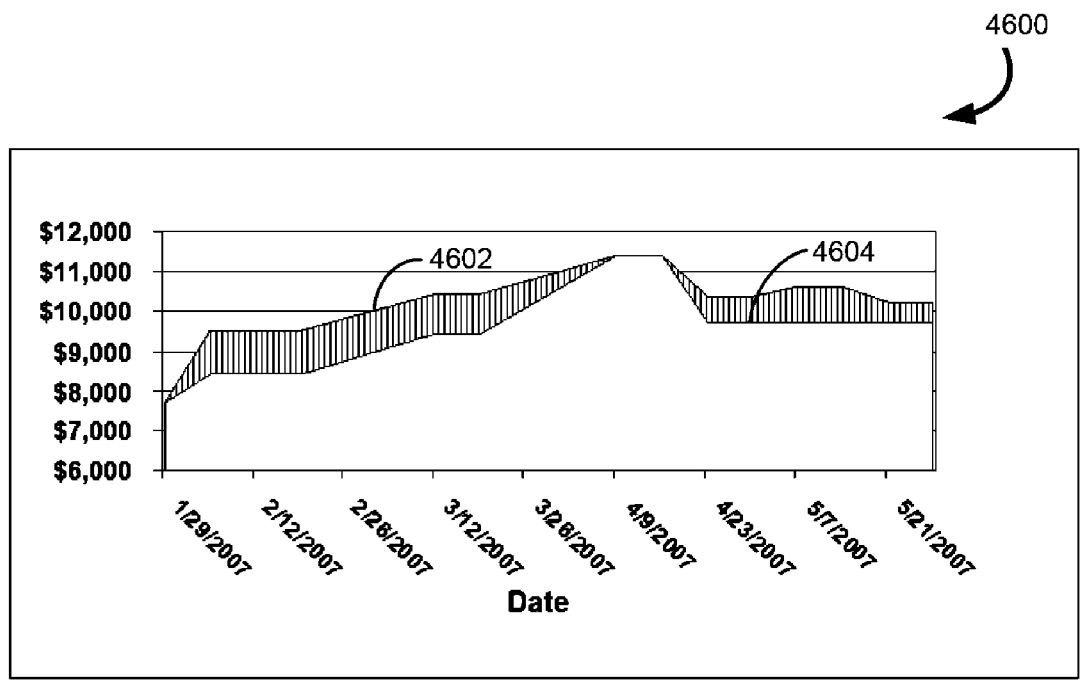
FIG. 46 illustrates an exemplary graph showing profit benefit under testable analysis in accordance with an embodiment of the present invention.

FIG. 46 illustrates an exemplary graph showing Profit Benefit under Testable analysis, shown generally at 4600. The Benefit 4602 may be seen as predominantly greater than Pre-optimization Profit 4604. However, the Profit Benefit equals $0 in the Pre-Optimization week of Jan-29, 2007. In the weeks of April-09 and April-23, the Profit Benefit drops to $0 as the Test Store and Control Store Prices are equal in those two weeks.

C. User Input Sheet

In some embodiments of the invention a Input Sheet Mode, or Input sheet analysis, may be used by the user, whereby the user creates an input spreadsheet that specifies for each product, at the division or zone level, the Old and New Prices and the dates ("Activation Date") on which those prices went into effect. As previously stated, the Input Sheet Mode may be utilized to run "what if" scenarios for business management.

For example, the Old and New Prices, for a given product, in the input spreadsheet may be as follows:

| Activation Date | Old Price | New Price |
|---|---|---|
| Mar. 1, 2007 | $19.99 | $21.99 |
| Jun. 1, 2007 | $19.99 | $22.99 |
| Dec. 1, 2007 | $16.99 | $18.99 |

Likewise, dates of cost changes may be specified as follows:

| Date of Cost Change | Cost |
|---|---|
| Mar. 1, 2007 | $9.99 |
| Dec. 1, 2007 | $7.99 |

Then the weekly Profit Benefit at the different Old/New Price and Cost combinations would be:

| Activation Date | Old Price | New Price | Current Cost | Forecasted Units at Old Price | Forecasted Units at New Price | Forecasted Profit at Old Price | Forecasted Profit at New Price | Forecasted Profit Benefit |
|---|---|---|---|---|---|---|---|---|
| Mar. 01, 2007 | $19.99 | $21.99 | $9.99 | 1,000 | 900 | $10,000 | $10,800 | $800 |
| Jun. 01, 2007 | $19.99 | $22.99 | $9.99 | 1,000 | 800 | $10,000 | $10,400 | $400 |
| Dec. 01, 2007 | $16.99 | $19.99 | $6.99 | 1,250 | 1,000 | $12,500 | $13,000 | $500 |

In this example, the product is assumed to be elastic so that forecasted volumes differ based on the price. Also, on Mar-01-2007, the first optimized price of $21.99 goes into effect. From Mar-01-2007 until June-01-2007, the weekly profit benefit is $800. On June-01-2007, the optimized price is raised to $22.99. From this date until Dec-01-2007, the weekly profit benefit is $400. On Dec-01-2007, the cost of the product drops to $6.99. In response, the user decides to drop the price of the product from $22.99 to $19.989 to pass the savings onto the consumer. Since the cost has dropped, the user also wants to reset the baseline or Old Price to $16.99. From Dec-01-2007 onward, the weekly profit benefit is $500.

D. Cost Handling Exceptions

Figure 47:
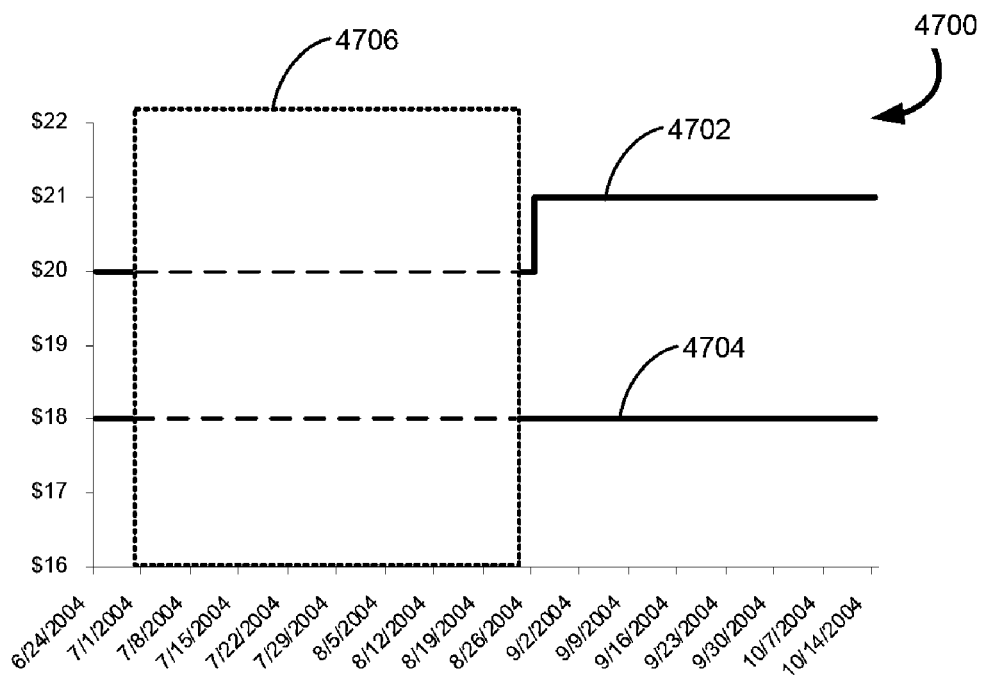
FIG. 47 illustrates an exemplary graph showing price and cost of a product for the purpose of pre-optimization sampling in accordance with an embodiment of the present invention.

FIG. 47 illustrates an exemplary graph showing price and cost of a product for the purpose of pre-optimization sampling, shown generally at 4700. Price 4702 and Cost 4704 are plotted versus time. Old Prices are sampled as the average price during the N weeks 4706 prior to implementation of optimized prices. Likewise, Old Cost are sampled as average cost during the N weeks 4706 prior to implementation of optimized prices. N, the number of weeks in the Sample Period—i.e., the period over which Old Prices and Costs are calculated—may be configurable by the user. In this example, the default N may be equal to 8 weeks.

Old Prices and Old Costs are calculated for each store-product that has POS data during the sample period. However, in some instances the Cost, or Price, data may be anomalous. In these situations there may be an override of actual costs for a more statistically relevant value.

Figure 48:
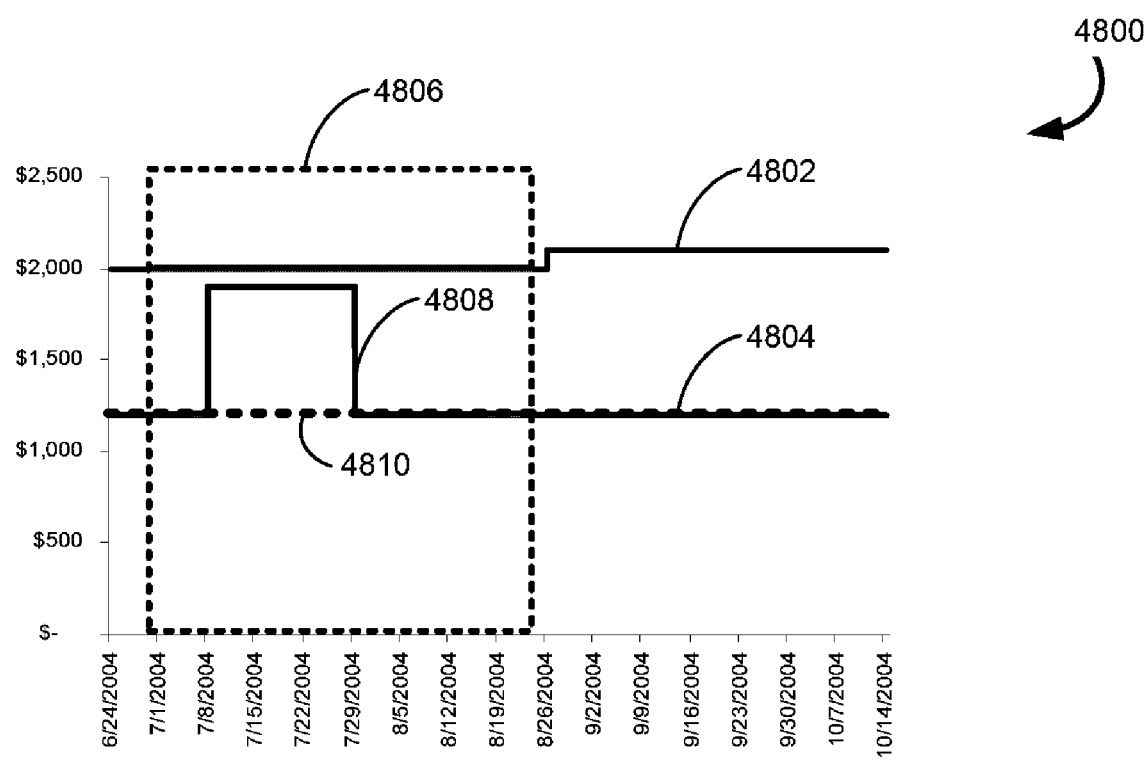
FIG. 48 illustrates an exemplary graph showing price and cost of a product subject to cost override in accordance with an embodiment of the present invention.

FIG. 48 illustrates an exemplary graph showing price and cost of a product subject to cost override, shown generally at 4800. Price 4802 and Cost 4804 are plotted versus time. The example assumes that the POS data received included incorrect cost data that resulted in a cost spike 4808 during the period just prior to the implementation of optimized prices. Under the Old Price/Old Cost cost-handling mode, this would result in an incorrect reported Profit benefit.

An Old Cost Exception 4810 may be added to the exception input sheet to force the Old Cost to the level desired. In this example, an Old Cost exception is applied so that immediately after the sample period 4806, the Old Cost is forced back down to the exception value. In this manner, the incorrect cost data that caused the average cost during the sample period to be increased is ignored.

In sum the present invention relates generally to Merchandising Decomposition Analysis (MDA) system and method to provide fast and efficient analysis of benefits for price optimization systems. The present invention provides efficient and accurate benefit analyses across many possible levels of product groupings. Additionally, benefit analyses may be performed for multiple effects, such as ads, promotions and optimization. In this way the Merchandising Decomposition Analysis system and method may provide an invaluable tool for business managers and investors.

In the specification, examples of product are not intended to limit products covered by the claims. Products may for example include food, hardware, software, real estate, financial devices, intellectual property, raw material, and services. The products may be sold wholesale or retail, in a brick and mortar store or over the Internet, or through other sales methods.

While this invention has been described in terms of several preferred embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computer implemented method for merchandising decomposition analysis, useful in association with stores, the method comprising:

setting initial prices of products, wherein the products are products sold by the stores;

compiling initial point of sales data from the stores;

generating demand forecast model for product sales of products using the initial point of sales data;

optimizing prices using the demand forecast model;

generating a profit and sales lift prediction based upon the optimized prices;

resetting prices of the products to the optimized prices;

collecting subsequent point of sales data from the stores, wherein the subsequent point of sales data reflects transactions that include the optimized prices;

generating, using a processor, back-casts of volume, revenue and profit by applying causal data in the subsequent point of sales data to equations of the demand forecast model, wherein the back-casts predict volume, revenue and profits had the product maintained the initial prices adjusting the back-casts to account for effects unknown when the profit and sales lift prediction was generated;

comparing the adjusted back-casts to the profit and sales lift prediction to generate a benefits analysis, wherein the benefits analysis includes a differential benefits analysis comprising the steps of:

detecting pre-optimization price of the products;

detecting pre-optimization cost of the products;

generating pre-optimization forecasted units, wherein the pre-optimization forecasted units are predictions of volume of sales of the products at the pre-optimization price, and wherein the pre-optimization forecasted units is generated by utilizing the pre-optimization price and the demand forecast model;

calculating forecasted pre-optimization profit by subtracting pre-optimization cost from pre-optimization price and multiplying the result by the pre-optimization forecasted units;

detecting post-optimization price of the products;

detecting post-optimization cost of the products;

generating post-optimization forecasted units, wherein the post-optimization forecasted units are predictions of volume of sales of the products at the post-optimization price, and wherein the post-optimization forecasted units is generated by utilizing the post-optimization price and the demand forecast model;

calculating forecasted post-optimization profit by subtracting post-optimization cost from post-optimization price and multiplying the result by the post-optimization forecasted units;

generating raw profit benefit by subtracting forecasted pre-optimization profit from the forecasted post-optimization profit; and calibrating raw profit benefit by iteratively excluding effects, wherein the demand forecast model include the effects, and further wherein the effects include at least one of promotion effect, ad effect, discount effect, halo effect, cannibalism effect, seasonality effect, holiday effect and event effects; and displaying the generated benefit analysis.

2. The method of merchandising decomposition analysis, as recited in claim 1, wherein the resetting preferred prices of products optimizes at least one of profits, revenue, market share and sales volume.

3. The method of merchandising decomposition analysis, as recited in claim 2, wherein the optimizing at least one of profits, revenue, market share and sales volume utilizes the generated demand forecast model.

4. The method of merchandising decomposition analysis, as recited in claim 3, wherein the benefit analysis include compliance, optimization benefit and level benefits.

5. The method of merchandising decomposition analysis, as recited in claim 4, wherein the level benefits include product level benefits, category level benefits, line level benefits, brand level benefits, demand group level benefits and geographical level benefits.

6. The method of merchandising decomposition analysis, as recited in claim 4, wherein optimization benefit include at least one of differential benefit analysis, authorized benefit analysis and testable benefit analysis.

7. The method of merchandising decomposition analysis, as recited in claim 6, wherein the differential benefit analysis includes cost handling, and wherein the cost handling includes at least one of a comparative cost analysis, a cost neutral analysis, an ignore cost analysis and a hybrid cost analysis.

8. The method of merchandising decomposition analysis, as recited in claim 7, wherein the differential benefit analysis utilizing cost neutral analysis further comprises:
  determining pre-optimization price of the products;
  determining pre-optimization cost of the products;
  determining post-optimization cost of the products;
  generating relative price by multiplying the pre-optimization price by the ratio of post-optimization cost to pre-optimization cost;
  generating pre-optimization forecasted units, wherein the pre-optimization forecasted units are predictions of volume of sales of the products at the relative price, and wherein the pre-optimization forecasted units is generated by utilizing the relative price and the demand forecast model;
  calculating forecasted pre-optimization profit by subtracting pre-optimization cost from relative price and multiplying the result by the pre-optimization forecasted units;
  determining post-optimization price of the products;
  generating post-optimization forecasted units, wherein the post-optimization forecasted units are predictions of volume of sales of the products at the post-optimization price, and wherein the post-optimization forecasted units is generated by utilizing the post-optimization price and the demand forecast model;
  calculating forecasted post-optimization profit by subtracting post-optimization cost from post-optimization price and multiplying the result by the post-optimization forecasted units;
  generating raw profit benefit by subtracting forecasted pre-optimization profit from the forecasted post-optimization profit; and
  calibrating raw profit benefit by iteratively excluding effects, wherein the demand forecast model include the effects, and further wherein the effects include at least one of promotion effect, ad effect, discount effect, halo effect, cannibalism effect, seasonality effect, holiday effect and event effects.

9. The method of merchandising decomposition analysis, as recited in claim 7, wherein the differential benefit analysis utilizing ignore cost analysis further comprises:
  determining pre-optimization price of the products;
  determining post-optimization cost of the products;
  generating pre-optimization forecasted units, wherein the pre-optimization forecasted units are predictions of volume of sales of the products at the pre-optimization price, and wherein the pre-optimization forecasted units is generated by utilizing the pre-optimization price and the demand forecast model;
  calculating forecasted pre-optimization profit by subtracting post-optimization cost from pre-optimization price and multiplying the result by the pre-optimization forecasted units;
  determining post-optimization price of the products;
  generating post-optimization forecasted units, wherein the post-optimization forecasted units are predictions of volume of sales of the products at the post-optimization price, and wherein the post-optimization forecasted units is generated by utilizing the post-optimization price and the demand forecast model;
  calculating forecasted post-optimization profit by subtracting post-optimization cost from post-optimization price and multiplying the result by the post-optimization forecasted units;
  generating raw profit benefit by subtracting forecasted pre-optimization profit from the forecasted post-optimization profit; and
  calibrating raw profit benefit by iteratively excluding effects, wherein the demand forecast model include the effects, and further wherein the effects include at least one of promotion effect, ad effect, discount effect, halo effect, cannibalism effect, seasonality effect, holiday effect and event effects.

10. The method of merchandising decomposition analysis, as recited in claim 6, wherein the authorized benefit analysis further comprises:
  determining pre-optimization price of the products;
  determining post-optimization cost of the products;
  generating pre-optimization forecasted units, wherein the pre-optimization forecasted units are predictions of volume of sales of the products at the pre-optimization price, and wherein the pre-optimization forecasted units is generated by utilizing the pre-optimization price and the demand forecast model;
  generating authorized product pricing window, wherein the authorized product pricing window is the period of time during which prices are expected to change in order to reflect the setting of prices to optimized prices in stores;
  calculating forecasted pre-optimization profit by subtracting post-optimization cost from pre-optimization price and multiplying the result by the pre-optimization forecasted units;
  determining post-optimization price of the products;
  generating post-optimization forecasted units, wherein the post-optimization forecasted units are predictions of volume of sales of the products at the post-optimization price, and wherein the post-optimization forecasted units is generated by utilizing the post-optimization price and the demand forecast model;
  calculating forecasted post-optimization profit by subtracting post-optimization cost from post-optimization price and multiplying the result by the post-optimization forecasted units;
  generating non compliance effect wherein the non compliance effect is the benefit attributed to the difference between the post-optimization price and the optimized price detected during the authorized product pricing window;
  generating raw profit benefit by subtracting forecasted pre-optimization profit from the forecasted post-optimization profit; and
  calibrating raw profit benefit by iteratively excluding effects and non compliance effect, wherein the demand forecast model include the effects, and further wherein the effects include at least one of promotion effect, ad effect, discount effect, halo effect, cannibalism effect, seasonality effect, holiday effect and event effects.

11. The method of merchandising decomposition analysis, as recited in claim 6, wherein the testable benefit analysis further comprises:
  selecting a test store;
  selecting a control store;
  implementing post-optimization price in test store by setting the prices of the products;
  maintaining pre-optimization price of the products in the control store;
  determining post-optimization cost of the products;
  generating pre-optimization forecasted units, wherein the pre-optimization forecasted units are predictions of volume of sales of the products at the pre-optimization price, and wherein the pre-optimization forecasted units is generated by utilizing the pre-optimization price and the demand forecast model;
  calculating forecasted pre-optimization profit by subtracting post-optimization cost from pre-optimization price and multiplying the result by the pre-optimization forecasted units;
  generating post-optimization forecasted units, wherein the post-optimization forecasted units are predictions of volume of sales of the products at the post-optimization price, and wherein the post-optimization forecasted units is generated by utilizing the post-optimization price and the demand forecast model;
  calculating forecasted post-optimization profit by subtracting post-optimization cost from post-optimization price and multiplying the result by the post-optimization forecasted units;
  generating raw profit benefit by subtracting forecasted pre-optimization profit from the forecasted post-optimization profit; and
  calibrating raw profit benefit by iteratively excluding effects, wherein the demand forecast model include the effects, and further wherein the effects include at least one of promotion effect, ad effect, discount effect, halo effect, cannibalism effect, seasonality effect, holiday effect and event effects.

12. A system for merchandising decomposition analysis, useful in association with stores, the apparatus comprising:
  an optimization engine configured to set initial prices of products, wherein the products are products sold by the stores;
  a point of sales data collector configured to compile initial point of sales data from the stores;
  an econometric engine configured to generate a demand forecast model for product sales of the products using the initial point of sales data;
  the optimization engine further configured to optimize prices using the demand forecast model;
  an econometric engine configured to generate a profit and sales lift prediction based upon the optimized prices;
  the optimization engine further configured to reset prices of the products to the optimized prices;
  the point of sales data collector further configured to transmit subsequent point of sales data from the stores, wherein the subsequent point of sales data reflects transactions that include the optimized prices;
  a forecasting engine, including a processor, configured to generate back-casts of volume, revenue and profit by applying causal data in the subsequent point of sales data to equations of the demand forecast model, wherein the back-casts predict volume, revenue and profits had the product maintained the initial prices, the forecasting engine further configured to adjust the back-casts to account for effects unknown when the profit and sales lift prediction was generated, and the forecasting engine further configured to compare the adjusted back-casts to the profit and sales lift prediction to generate a benefits analysis wherein the benefits analysis includes a differential benefits analysis generated by a differential benefit analyzer configured to:
    detecting pre-optimization price of the products;
    detecting pre-optimization cost of the products;
    generate pre-optimization forecasted units, wherein the pre-optimization forecasted units are predictions of volume of sales of the products at the pre-optimization price, and wherein the pre-optimization forecasted units is generated by utilizing the pre-optimization price and the demand forecast model;
    calculate forecasted pre-optimization profit by subtracting pre-optimization cost from pre-optimization price and multiplying the result by the pre-optimization forecasted units;
    detecting post-optimization price of the products;
    detecting post-optimization cost of the products;
    generate post-optimization forecasted units, wherein the post-optimization forecasted units are predictions of volume of sales of the products at the post-optimization price, and wherein the post-optimization forecasted units is generated by utilizing the post-optimization price and the demand forecast model;
    calculate forecasted post-optimization profit by subtracting post-optimization cost from post-optimization price and multiplying the result by the post-optimization forecasted units;
    generate raw profit benefit by subtracting forecasted pre-optimization profit from the forecasted post-optimization profit; and
    calibrate raw profit benefit by iteratively excluding effects, wherein the demand forecast model include the effects, and further wherein the effects include at least one of promotion effect, ad effect, discount effect, halo effect, cannibalism effect, seasonality effect, holiday effect and event effects; and
  an interface configured to display generated benefit forecasts.

13. The system for merchandising decomposition analysis of claim 12, wherein the optimization engine setting prices of products optimizes profit.

14. The system for merchandising decomposition analysis of claim 13, wherein the optimization engine utilizes the generated demand forecast model.

15. The system for merchandising decomposition analysis of claim 14, wherein the forecasting engine generating benefit analysis includes generating compliance, generating optimization benefit and generating level benefits.

16. The system for merchandising decomposition analysis of claim 15, wherein the forecasting engine generating level benefits includes generating product level benefits, generating category level benefits, generating line level benefits, generating brand level benefits, generating demand group level benefits and generating geographical level benefits.

17. The system for merchandising decomposition analysis of claim 15, wherein forecasting engine generating optimization benefit includes at least one of the differential benefit analyzer, authorized benefit analyzer and testable benefit analyzer.

18. The system for merchandising decomposition analysis of claim 17, wherein the differential benefit analyzer includes a cost handler, and wherein the cost handler includes at least one of a comparative cost analyzer, a cost neutral analyzer, an ignore cost analyzer and a hybrid cost analyzer.

19. The system for merchandising decomposition analysis of claim 18, wherein the cost neutral analyzer is further configured to:
   determining pre-optimization price of the products;
   determining pre-optimization cost of the products;
   determining post-optimization cost of the products;
   generating relative price by multiplying the pre-optimization price by the ratio of post-optimization cost to pre-optimization cost;
   generating pre-optimization forecasted units, wherein the pre-optimization forecasted units are predictions of volume of sales of the products at the relative price, and wherein the pre-optimization forecasted units is generated by utilizing the relative price and the demand forecast model;
   calculating forecasted pre-optimization profit by subtracting post-optimization cost from relative price and multiplying the result by the pre-optimization forecasted units;
   determining post-optimization price of the products;
   generating post-optimization forecasted units, wherein the post-optimization forecasted units are predictions of volume of sales of the products at the post-optimization price, and wherein the post-optimization forecasted units is generated by utilizing the post-optimization price and the demand forecast model;
   calculating forecasted post-optimization profit by subtracting post-optimization cost from post-optimization price and multiplying the result by the post-optimization forecasted units;
   generating raw profit benefit by subtracting forecasted pre-optimization profit from the forecasted post-optimization profit; and
   calibrating raw profit benefit by iteratively excluding effects, wherein the demand forecast model include the effects, and further wherein the effects include at least one of promotion effect, ad effect, discount effect, halo effect, cannibalism effect, seasonality effect, holiday effect and event effects.

20. The system for merchandising decomposition analysis of claim 18, wherein the ignore cost analyzer is further configured to:
   determining pre-optimization price of the products;
   determining post-optimization cost of the products;
   generating pre-optimization forecasted units, wherein the pre-optimization forecasted units are predictions of volume of sales of the products at the pre-optimization price, and wherein the pre-optimization forecasted units is generated by utilizing the pre-optimization price and the demand forecast model;
   calculating forecasted pre-optimization profit by subtracting post-optimization cost from pre-optimization price and multiplying the result by the pre-optimization forecasted units;
   determining post-optimization price of the products;
   generating post-optimization forecasted units, wherein the post-optimization forecasted units are predictions of volume of sales of the products at the post-optimization price, and wherein the post-optimization forecasted units is generated by utilizing the post-optimization price and the demand forecast model;
   calculating forecasted post-optimization profit by subtracting post-optimization cost from post-optimization price and multiplying the result by the post-optimization forecasted units;
   generating raw profit benefit by subtracting forecasted pre-optimization profit from the forecasted post-optimization profit; and
   calibrating raw profit benefit by iteratively excluding effects, wherein the demand forecast model include the effects, and further wherein the effects include at least one of promotion effect, ad effect, discount effect, halo effect, cannibalism effect, seasonality effect, holiday effect and event effects.

21. The system for merchandising decomposition analysis of claim 17, wherein the forecasting engine authorized benefits analyzer is further configured to:
   determining pre-optimization price of the products;
   determining post-optimization cost of the products;
   generating pre-optimization forecasted units, wherein the pre-optimization forecasted units are predictions of volume of sales of the products at the pre-optimization price, and wherein the pre-optimization forecasted units is generated by utilizing the pre-optimization price and the demand forecast model;
   generating authorized product pricing window, wherein the authorized product pricing window is the period of time during which prices are expected to change in order to reflect the setting of prices to optimized prices in stores;
   calculating forecasted pre-optimization profit by subtracting post-optimization cost from pre-optimization price and multiplying the result by the pre-optimization forecasted units;
   determining post-optimization price of the products;
   generating post-optimization forecasted units, wherein the post-optimization forecasted units are predictions of volume of sales of the products at the post-optimization price, and wherein the post-optimization forecasted units is generated by utilizing the post-optimization price and the demand forecast model;
   calculating forecasted post-optimization profit by subtracting post-optimization cost from post-optimization price and multiplying the result by the post-optimization forecasted units;
   generating non compliance effect wherein the non compliance effect is the benefit attributed to the difference between the post-optimization price and the optimized price during the authorized product pricing window;
   generating raw profit benefit by subtracting forecasted pre-optimization profit from the forecasted post-optimization profit; and
   calibrating raw profit benefit by iteratively excluding effects and non compliance effect, wherein the demand forecast model include the effects, and further wherein the effects include at least one of promotion effect, ad effect, discount effect, halo effect, cannibalism effect, seasonality effect, holiday effect and event effects.

22. The system for merchandising decomposition analysis of claim 17, wherein the forecasting engine testable benefits analyzer is further configured to:
   selecting a test store;
   selecting a control store;
   implementing post-optimization price in test store by setting the prices of the products;
   maintaining pre-optimization price of the products in the control store;
   determining post-optimization cost of the products;

generating pre-optimization forecasted units, wherein the pre-optimization forecasted units are predictions of volume of sales of the products at the pre-optimization price, and wherein the pre-optimization forecasted units is generated by utilizing the pre-optimization price and the demand forecast model;

calculating forecasted pre-optimization profit by subtracting post-optimization cost from pre-optimization price and multiplying the result by the pre-optimization forecasted units;

generating post-optimization forecasted units, wherein the post-optimization forecasted units are predictions of volume of sales of the products at the post-optimization price, and wherein the post-optimization forecasted units is generated by utilizing the post-optimization price and the demand forecast model;

calculating forecasted post-optimization profit by subtracting post-optimization cost from post-optimization price and multiplying the result by the post-optimization forecasted units;

generating raw profit benefit by subtracting forecasted pre-optimization profit from the forecasted post-optimization profit; and calibrating raw profit benefit by iteratively excluding effects, wherein the demand forecast model include the effects, and further wherein the effects include at least one of promotion effect, ad effect, discount effect, halo effect, cannibalism effect, seasonality effect, holiday effect and event effects.

* * * * *